US010631039B2

(12) United States Patent
Shin et al.

(10) Patent No.: US 10,631,039 B2
(45) Date of Patent: Apr. 21, 2020

(54) IMAGE DISPLAY DEVICE

(71) Applicant: LG ELECTRONICS INC., Seoul (KR)

(72) Inventors: Byounghyun Shin, Seoul (KR); Changbum Koo, Seoul (KR); Haejung Kim, Seoul (KR); Osung Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,648

(22) PCT Filed: Nov. 18, 2016

(86) PCT No.: PCT/KR2016/013361
§ 371 (c)(1),
(2) Date: Jun. 22, 2018

(87) PCT Pub. No.: WO2017/111321
PCT Pub. Date: Jun. 29, 2017

(65) Prior Publication Data
US 2019/0014373 A1    Jan. 10, 2019

(30) Foreign Application Priority Data

Dec. 24, 2015  (KR) .................. 10-2015-0186631

(51) Int. Cl.
*H04N 21/41*  (2011.01)
*H04N 21/436*  (2011.01)
(Continued)

(52) U.S. Cl.
CPC ........ *H04N 21/436* (2013.01); *H04M 1/7253* (2013.01); *H04N 5/44* (2013.01);
(Continued)

(58) Field of Classification Search
CPC ............. H04N 21/436; H04N 21/4126; H04N 21/422; H04N 21/4825; H04N 21/8173; H04N 5/44; H04M 1/725
See application file for complete search history.

(56) References Cited

U.S. PATENT DOCUMENTS

| 9,736,541 B1* | 8/2017 | Nijim ................. H04N 21/4751 |
| 2011/0131296 A1* | 6/2011 | Lee ....................... H04N 21/488 |
| | | 709/219 |

(Continued)

FOREIGN PATENT DOCUMENTS

| EP | 2682859 | 6/2013 |
| EP | 2629193 | 8/2013 |

(Continued)

OTHER PUBLICATIONS

European Patent Office Application Serial No. 16879188.7, Search Report dated Jul. 9, 2019, 9 pages.

(Continued)

*Primary Examiner* — Randy A Flynn
(74) *Attorney, Agent, or Firm* — Lee, Hong, Degerman, Kang & Waimey PC

(57) ABSTRACT

The present invention relates to an image display device. An image display device according to an embodiment of the present invention comprises: a display; an interface for exchanging data with a mobile terminal; and a controller for performing control such that a device connection application item is displayed, an image including server information is displayed so as to be captured using the mobile terminal, on the basis of the selection of the device connection application item, pairing with the mobile terminal is then performed, and when the pairing is completed, an object representing the paired mobile terminal is displayed. Accordingly, pairing between the mobile terminal and the image display device can be simply and easily performed.

20 Claims, 77 Drawing Sheets

(51) Int. Cl.
*H04N 21/482* (2011.01)
*H04N 21/81* (2011.01)
*H04N 21/422* (2011.01)
*H04M 1/725* (2006.01)
*H04N 5/44* (2011.01)
*G06F 9/451* (2018.01)
*G06F 3/14* (2006.01)

(52) U.S. Cl.
CPC ..... *H04N 21/4122* (2013.01); *H04N 21/4126* (2013.01); *H04N 21/422* (2013.01); *H04N 21/4825* (2013.01); *H04N 21/8173* (2013.01); *G06F 3/1454* (2013.01); *G06F 9/452* (2018.02)

(56) References Cited

U.S. PATENT DOCUMENTS

| | | | | |
|---|---|---|---|---|
| 2011/0273625 | A1* | 11/2011 | McMahon | H04N 21/2407 348/734 |
| 2012/0090007 | A1* | 4/2012 | Xiao | H04N 21/25808 725/46 |
| 2012/0252405 | A1* | 10/2012 | Lortz | H04L 67/34 455/410 |
| 2012/0322384 | A1* | 12/2012 | Zerr | H04W 76/10 455/41.3 |
| 2012/0324076 | A1 | 12/2012 | Zerr et al. | |
| 2013/0088650 | A1* | 4/2013 | Rouady | H04N 21/4432 348/734 |
| 2013/0191757 | A1* | 7/2013 | Smith | H04N 21/4126 715/748 |
| 2013/0210488 | A1* | 8/2013 | Lee | H04N 21/42212 455/557 |
| 2013/0291018 | A1* | 10/2013 | Billings | H04N 21/4122 725/46 |
| 2013/0326557 | A1* | 12/2013 | Kang | H04N 21/25891 725/42 |
| 2013/0347024 | A1* | 12/2013 | Sugiue | H04N 21/25875 725/25 |
| 2014/0032635 | A1* | 1/2014 | Pimmel | H04N 21/4126 709/203 |
| 2014/0196023 | A1* | 7/2014 | Bouthillier | G06F 8/61 717/178 |
| 2014/0280983 | A1* | 9/2014 | Paluch | H04L 67/14 709/227 |
| 2015/0095933 | A1* | 4/2015 | Blackburn | H04N 21/6125 725/25 |
| 2015/0163535 | A1* | 6/2015 | McCarthy, III | H04N 21/4131 725/49 |
| 2016/0080549 | A1* | 3/2016 | Yuan | H04N 21/4314 455/420 |

FOREIGN PATENT DOCUMENTS

| | | |
|---|---|---|
| KR | 10-1133311 | 4/2012 |
| KR | 10-2013-0012467 | 2/2013 |
| KR | 10-2014-0140720 | 12/2014 |
| KR | 10-2015-0108546 | 9/2015 |
| KR | 10-2015-0127533 | 11/2015 |

OTHER PUBLICATIONS

PCT International Application No. PCT/KR2016/013361, International Search Report dated Mar. 10, 2017, 5 pages.

* cited by examiner (a) (b) (c)

000# IMAGE DISPLAY DEVICE

CROSS-REFERENCE TO RELATED APPLICATIONS

This application is the National Stage filing under 35 U.S.C. 371 of International Application No. PCT/KR2016/013361, filed on Nov. 18, 2016, which claims the benefit of earlier filing date and right of priority to Korean Application No. 10-2015-0186631, filed on Dec. 24, 2015, the contents of which are all hereby incorporated by reference herein in their entirety.

TECHNICAL FIELD

The present invention relates to an image display device, and more particularly, to an image display device capable of easily performing pairing with a mobile terminal.

BACKGROUND ART

An image display apparatus is an apparatus having a function to provide images viewable by a user. The user may watch a broadcast program through the image display apparatus. The image display apparatus provides a broadcast program selected by the user among broadcast signals transmitted from broadcast stations, and displays broadcast images on the display. Currently, broadcasting technology is transitioning from analog broadcasting to digital broadcasting around the world.

Digital broadcasting refers to broadcasting for transmitting digital images and voice signals. Compared to analog broadcasting, digital broadcasting is robust to external noise and thus suffers lower data loss. Further digital broadcasting is advantageous in terms of error correction, and provides high definition and clear images. Further, in contrast with analog broadcasting, digital broadcasting enables bidirectional services.

DISCLOSURE

Technical Problem

It is an object of the present invention to provide an image display device capable of easily performing pairing with a mobile terminal.

It is another object of the present invention to provide an image display device capable of easily performing mirroring between a mobile terminal and the image display device.

Technical Solution

In accordance with an aspect of the present invention, the above and other objects can be accomplished by the provision of an image display device including a display, an interface to exchange data with a mobile terminal, and a controller to perform a control operation to display a device connection application item, to display an image including server information based on selection of the device connection application item so as to be captured using the mobile terminal, to perform pairing with the mobile terminal after displaying the image, and to display an object indicating the paired mobile terminal when pairing is completed.

In accordance with another aspect of the present invention, there is provided an image display device including a display, an interface to exchange data with a mobile terminal, and a controller to perform pairing with a mobile terminal when the mobile terminal is positioned within a predetermined distance and to perform a control operation to display an object indicating the paired mobile terminal when pairing is completed.

Advantageous Effects

According to an embodiment of the present invention, an image display device includes a display, an interface to exchange data with a mobile terminal, and a controller to perform a control operation to display a device connection application item, to display an image including server information based on selection of the device connection application item so as to be captured using the mobile terminal, to perform pairing with the mobile terminal after displaying the image, and to display an object indicating the paired mobile terminal when pairing is completed. Thereby, pairing between the mobile terminal and the image display device may be easily performed.

Further, when the object indicating the paired mobile terminal is selected, a list of applications that can be mirrored is displayed. Thus, mirroring may be performed easily in connection with the mobile terminal.

In addition, by displaying a content wish list, the wish list from the mobile terminal may be easily shared and displayed.

In addition, when the mobile terminal is positioned within a predetermined pairing-allowed distance, the image display device may perform pairing. Accordingly, pairing may be easily performed after initial pairing.

In addition, pairing with a plurality of mobile terminals may be allowed. In pairing with a plurality of mobile terminals, a plurality of objects indicating the plurality of paired mobile terminals may be displayed to allow a user to perform mirroring with a desired mobile terminal.

According to another embodiment of the present invention, an image display device includes a display, an interface to exchange data with a mobile terminal, and a controller to perform pairing with a mobile terminal when the mobile terminal is positioned within a predetermined distance and to perform a control operation to display an object indicating the paired mobile terminal when pairing is completed. Thereby, pairing may be easily performed.

BEST MODE

Hereinafter, the present invention will be described in detail with reference to the accompanying drawings.

As used herein, the suffixes "module" and "unit" are added to simply facilitate preparation of this specification and are not intended to suggest special meanings or functions. Therefore, the suffixes "module" and "unit" may be used interchangeably.

Figure 1:
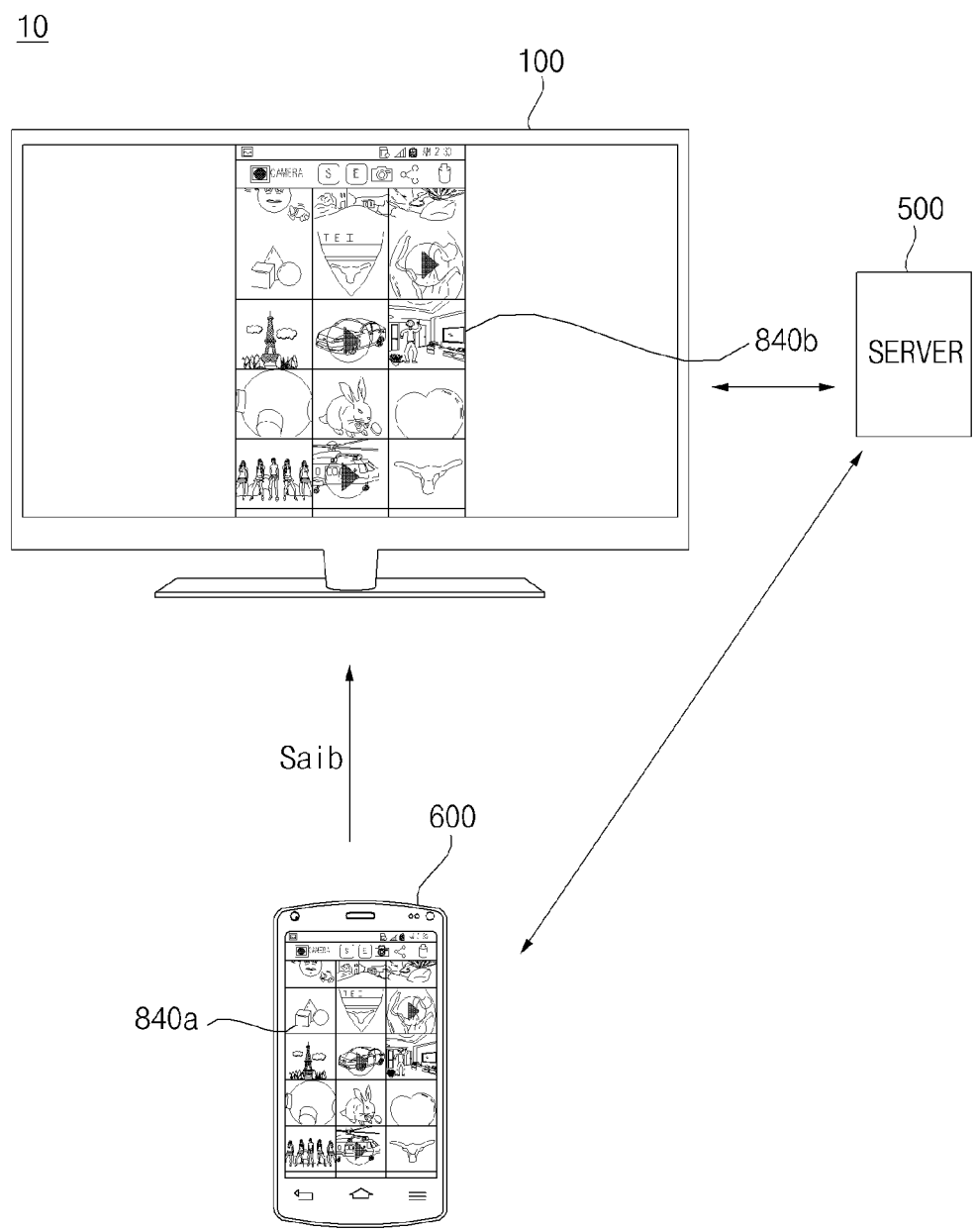
FIG. 1 illustrates an image display system for mirroring according to an embodiment of the present invention.

FIG. 1 illustrates an image display system for mirroring according to an embodiment of the present invention.

Referring to FIG. 1, an image display system 10 for mirroring may include an image display device 100, a mobile terminal 600 and a server 500.

The image display device 100 may perform mirroring with the mobile terminal 600.

To perform mirroring between the image display device 100 and the mobile terminal 600, pairing needs to be performed between the image display device 100 and the mobile terminal 600.

In this embodiment, a method for easily performing pairing between the image display device 100 and the mobile terminal 600 is proposed.

The controller 170 of the image display device 100 may perform a control operation to display a device connection application item according to predetermined input, and display an image including server information such that the image is captured based on selection of the device connection application item using the mobile terminal 600. Thereafter, the controller 170 may perform pairing with the mobile terminal 600. Once pairing is completed, the controller 170 may perform a control operation to display an object indicating the paired mobile terminal 600.

In particular, after displaying the image including the server information such that the image is captured using the mobile terminal 600, the controller 170 of the image display device 100 may perform a control operation to display randomly generated code information. The controller may perform pairing with the mobile terminal 600 after displaying the code information. Thereby, reliable and convenient pairing may be performed. Further, completion of pairing may be easily recognized.

If pairing with the mobile terminal 600 is performed while an image is being displayed on the display 180, the controller 170 of the image display device 100 may perform a control operation to display an object indicating the paired mobile terminal 600 on the image. Thereby, completion of pairing may be easily recognized while the displayed image is viewed.

If pairing with the mobile terminal 600 is performed while a broadcast image based on a broadcast signal received from a broadcast receiver 105 is being displayed on the display, the controller 170 of the image display device 100 may perform a control operation to display an object indicating the paired mobile terminal 600 on the image.

To perform pairing, the image display device 100 may wirelessly transmit a pairing signal, and the mobile terminal 600 may transmit a pairing response signal in response to the pairing signal. Thereby, pairing may be performed and the mobile terminal 600 and the image display device 100 may be connected to each other.

Herein, the pairing signal and the pairing response signal may be Bluetooth-based blooth low energy (BLE) signals. In particular, the image display device 100 may periodically transmit a BLE pairing signal.

In addition to the pairing signal, the image display device 100 may further transmit device information including the device ID of the image display device.

If the object indicating the paired mobile terminal 600 is selected, the controller 170 of the image display device 100 may perform a control operation to display an application list related to the paired mobile terminal 600.

When a first application item is selected in the application list related to the paired mobile terminal 600, the controller 170 may make a request to the mobile terminal 600 for transmission of a screen related to the first application, and perform a control operation to display an image for execution of the first application on the display based on information received from the mobile terminal 600.

That is, when the first application item is selected in the application list related to the paired mobile terminal 600, the controller 170 may perform a control operation to implement mirroring.

The communication scheme for pairing may be different from the communication scheme for mirroring. For example, in mirroring, an application image may be wirelessly transmitted to the image display device 100 through Wi-Fi according to the Miracast scheme.

To improve data transfer rate in performing mirroring, if the source of moving images reproduced in the mobile terminal 600 is a coded video signal, the mobile terminal 600 may transmit the coded video signal to the image display device 100 without decoding and reproducing the coded video signal, and the image display device 100 may decode the coded video signal and reproduce and display the decoded video signal.

When an object indicating the paired mobile terminal 600 is selected, the controller 170 of the image display device 100 may perform a control operation such that an application list related to the paired mobile terminal 600 and a content wish list are displayed together.

In this regard, when paired with the mobile terminal 600, the controller 170 of the image display device 100 may receive the wish list information stored in the mobile terminal 600 and perform a control operation such that the wish list information is displayed in the content wish list.

If the mobile terminal 600 is positioned within a predetermined distance allowing pairing, the controller 170 of the image display device 100 may perform pairing therewith.

The controller 170 may perform a control operation to transmit a pairing signal. If the mobile terminal 600 is positioned within a predetermined distance allowing pairing, the controller 170 may receive a pairing response signal from the mobile terminal 600 and perform pairing therewith based on the pairing response signal.

As described above, the image display device 100 may transmit a pairing signal, and the mobile terminal 600 may transmit a pairing response signal. Alternatively, the mobile terminal 600 may transmit a pairing signal, and the image display device 100 may transmit a pairing response signal.

If the image display device 100 is additionally paired with a second mobile terminal 600 while an object indicating the paired mobile terminal is displayed, the controller 170 of the image display device 100 may perform a control operation to display the second object indicating the paired second mobile terminal 600 together with the first object.

When the second object indicating the paired second mobile terminal is selected, the controller 170 of the image display device 100 may perform a control operation to display a second application list related to the paired second mobile terminal.

If the second object indicating the paired second mobile terminal 600 is selected after the object indicating the mobile terminal 600 is selected and the application list related to the paired mobile terminal 600 is displayed, the controller 170 of the image display device 100 may perform a control operation to display the application list related to the paired mobile terminal 600 and a second application list related to the paired second mobile terminal 600.

If the second object indicating the second paired mobile terminal 600 is selected after the object indicating the mobile terminal 600 is selected and the application list related to the paired mobile terminal 600 is displayed, the controller 170 of the image display device 100 may perform a control operation to display a user change object and a user add object. When the user change object is selected, the controller 170 may perform a control operation to display the second application list related to the paired second mobile terminal 600. When the user add object is selected, the controller 170 may perform a control operation to display the application list related to the paired second mobile terminal and the second application list related to the paired second mobile terminal 600.

A more detailed description of various methods for operating the image display device 100 and the mobile terminal 600 will be given with reference to FIG. 6.

The image display device 100 of FIG. 1 may be a monitor, a TV, a tablet, or the like.

Figure 2:
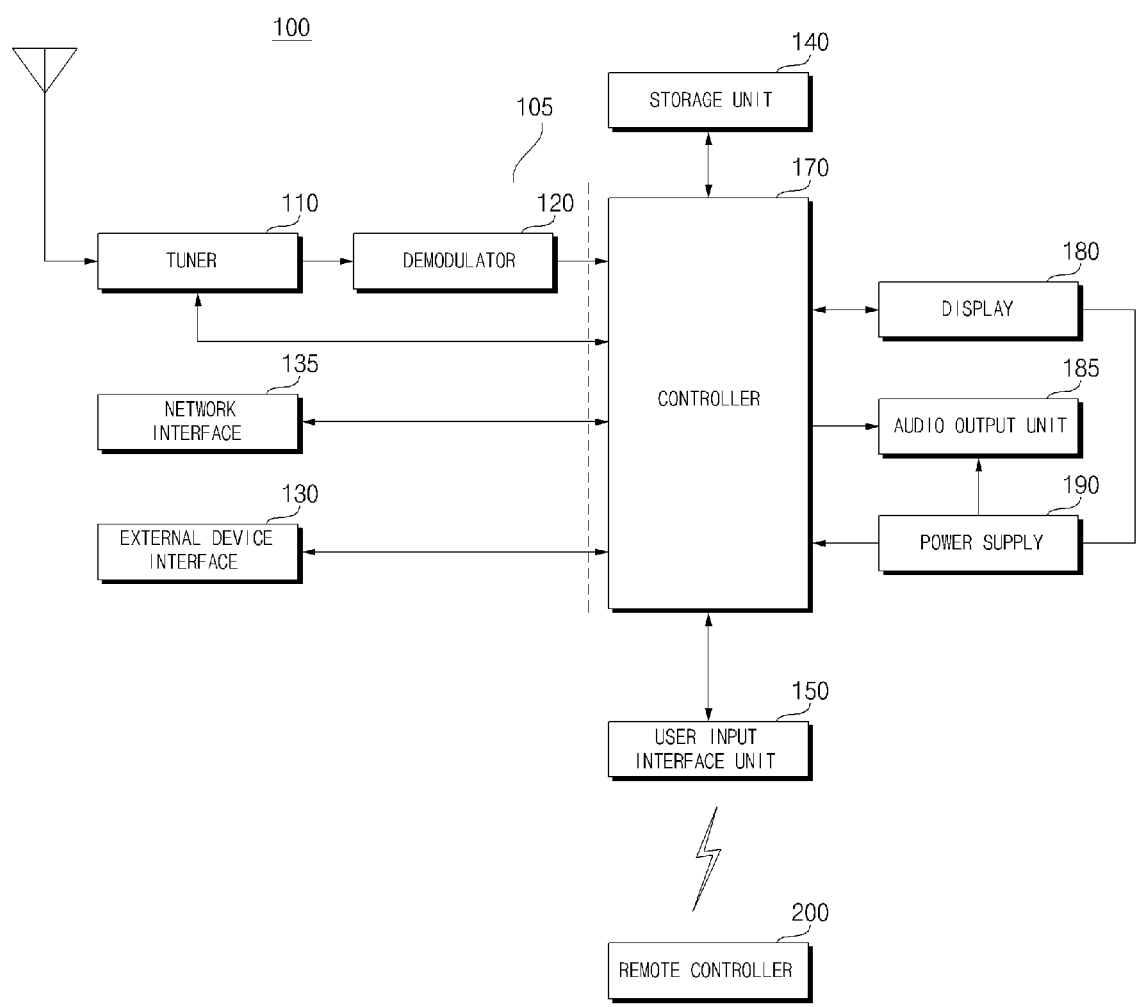
FIG. 2 is an internal block diagram illustrating the image display device of FIG. 1.

FIG. 2 is an internal block diagram illustrating the image display device of FIG. 1.

Referring to FIG. 2, the image display device 100 according to an embodiment may include a broadcast receiver 105, an external device interface 130, a storage unit 140, a user input interface 150, a sensor unit (not shown), a controller 170, a display 180, and an audio output unit 185.

The broadcast receiver 105 may include a tuner 110, a demodulator 120, a network interface 135, and an external device interface 130.

In contrast with the example of the figure, the broadcast receiver 105 may include only the tuner 110, the demodulator 120, and the external device interface 130. That is, the network interface 135 may not be included.

The tuner 110 selects a channel selected by a user from among radio frequency (RF) broadcast signals received through an antenna (not shown) or an RF broadcast signal corresponding to all pre-stored channels. In addition, the tuner 110 converts the selected RF broadcast signal into a middle-frequency signal, a baseband image, or a voice signal.

For example, if the selected RF broadcast signal is a digital broadcast signal, the signal is converted into a digital IF (DIF) signal. If the selected RF broadcast signal is an analog broadcast signal, the signal is converted into a baseband image or a voice signal (CVBS/SIF). That is, the tuner 110 may process a digital broadcast signal or an analog broadcast signal. The analog baseband image or voice signal (CVBS/SIF) output from the tuner 110 may be directly input to the controller 170.

In this embodiment, the tuner 110 may sequentially select an RF broadcast signal for all stored broadcast channels from among RF broadcast signals received through the antenna through the channel memorization function, and convert the same into a middle-frequency signal, baseband image, or voice signal.

To receive broadcast signals of a plurality of channels, a plurality of tuners 110 may be provided. Alternatively, a single tuner to receive a plurality of channels simultaneously may be provided.

The demodulator 120 receives and demodulates the DIF signal converted by the tuner.

After performing demodulation and channel decoding, the demodulator 120 may output a stream signal (TS). Herein, the stream signal may be a signal obtained by multiplexing an image signal, voice signal or data signal.

The stream signal output from the demodulator 120 may be input to the controller 170. After performing demultiplexing and image/voice signal processing, the controller 170 outputs an image to the display 180 and voice to the audio output unit 185.

The external device interface 130 may transmit or receive data to or from a connected external device (not shown), e.g., a set-top box 50. To this end, the external device interface 130 may include an A/V input/output unit (not shown).

The external device interface 130 may be connected to external devices such as a DVD (digital versatile disc) player, a Blu-ray player, a gaming device, a camera, a camcorder, a computer (laptop), and a set-top box in a wired/wireless manner, and perform input/output operations with external devices.

The A/V input/output unit may receive image and voice signals input from an external device. A wireless communication unit (not shown) may perform short-range wireless communication with other electronic devices.

The external device interface 130 may exchange data with a neighboring mobile terminal 600 via the wireless communication unit (not shown). In particular, in the mirroring mode, the external device interface 130 may receive device information, information about an executed application and an application image from the mobile terminal 600.

The network interface 135 provides an interface for connection with a wired/wireless network including the Internet. For example, the network interface 135 may receive content or data provided by a content provider or a network operator over a network.

The network interface 135 may include a wireless communication unit (not shown).

The storage unit 140 may store programs for processing and control of signals in the controller 170, and also store a signal-processed image, voice signal or data signal.

The storage unit 140 may function to temporarily store an image signal, a voice signal or a data signal input through the external device interface 130. In addition, the storage unit 140 may store information about a predetermined broadcast channel through the channel memorization function such as a channel map.

While it is illustrated in FIG. 2 that the storage unit 140 is provided separately from the controller 170, embodiments of the present invention are not limited thereto. The storage unit 140 may be provided in the controller 170.

The user input interface 150 may transmit a signal input by the user to the controller 170 or transmit a signal from the controller 170 to the user.

For example, the user input interface 150 may transmit/receive user input signals such as power on/off, channel selection, and screen setting to/from the remote controller 200, deliver, to the controller 170, user input signals input through local keys (not shown) such as a power key, a channel key, a volume key, or a setting key, deliver, to the controller 170, user input signals input through a sensor unit (not shown) to sense user gestures, or transmit a signal from the controller 170 to the sensor unit (not shown).

The controller 170 may demultiplex streams input through the tuner 110, demodulator 120, network interface 135 or external device interface 130, or process demultiplexed signals. Thereby, the controller 170 may generate an output signal for outputting an image or voice.

An image signal image-processed by the controller 170 may be input to the display 180 and an image corresponding to the image signal may be displayed. In addition, the image signal which is image-processed by the controller 170 may be input to an external output device through the external device interface 130.

A voice signal processed by the controller 170 may be output to the audio output unit 185 in the form of sound. In addition, the voice signal processed by the controller 170 may be input to an external output device through the external device interface 130.

Although not shown in FIG. 2, the controller 170 may include a demultiplexer and an image processor, which will be described with reference to FIG. 3 later.

Additionally, the controller 170 may control overall operation of the image display device 100. For example, the controller 170 may control the tuner 110 to tune to an RF broadcast corresponding to a channel selected by the user or a pre-stored channel.

The controller 170 may control the image display device 100 according to a user command input through the user input interface 150 or an internal program.

The controller 170 may control the display 180 to display an image. Herein, the image displayed on the display 180 may be a still image, a moving image, a 2D image, or a 3D image.

The controller 170 may perform a control operation to display the predetermined 2D object in an image displayed on the display 180. For example, the object may be at least one of an accessed web page (a newspaper, a magazine, etc.), an EPG (electronic program guide), various menus, a widget, an icon, a still image, a moving image and text.

The controller 170 may recognize the location of the user based on an image captured by a capture unit (not shown). For example, the controller 170 may recognize the distance between the user and the image display device 100 (i.e., a z-axis coordinate). Additionally, the controller 170 may recognize an x-axis coordinate and y-axis coordinate corresponding to the location of the user in the display 180.

The display 180 generates drive signals by converting an image signal, data signal, OSD signal, and control signal processed by the controller 170 or an image signal, data signal and control signal received from the external device interface 130.

The display 180 may be a PDP, an LCD, an OLED display, a flexible display, or a 3D display. The 3D display 180 may be divided into a non-glasses type and a glasses type.

The display 180 may be configured by a touchscreen to be used not only as an output device but also as an input device.

The audio output unit 185 receives a voice signal processed by the controller 170 and outputs voice.

The capture unit (not shown) captures an image of the user. The capture unit (not shown) may be implemented using one camera. However, embodiments of the present invention are not limited thereto. The capture unit (not shown) may be implemented using a plurality of cameras. The capture unit (not shown) may be embedded in the upper portion of the display 180 of the image display device or may be separately disposed. Image information captured by the capture unit (not shown) may be input to the controller 170.

The controller 170 may sense user gestures based on an image captured by the capture unit (not shown), a sensed signal from the sensor unit (not shown), or a combination thereof.

The power supply 190 supplies power to all parts of the image display device 100. In particular, the power supply 190 may supply power to the controller 170, which may be implemented in the form of a system on chip (SOC), the display 180 for display of images, and the audio output unit 185 for outputting audio signals.

Specifically, the power supply 190 may include a converter to convert alternating current (AC) power into direct current (DC) power and a DC-DC converter to change the level of the DC power.

The remote controller 200 transmits user input to the user input interface 150. To this end, the remote controller 200 may employ Bluetooth, radio frequency (RF) communication, infrared (IR) communication, ultra-wideband (UWB), or ZigBee. In addition, the remote controller 200 may receive an image signal, a voice signal or a data signal from the user input interface 150, and display or output the same.

The image display device 100 may be a fixed or mobile digital broadcast receiver capable of receiving digital broadcast services.

The block diagram of the image display device 100 shown in FIG. 2 is simply illustrative. Constituents of the block diagram may be integrated, added or omitted according to the specifications of the image display device 100 which is implemented in reality. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present invention.

Figure 3:
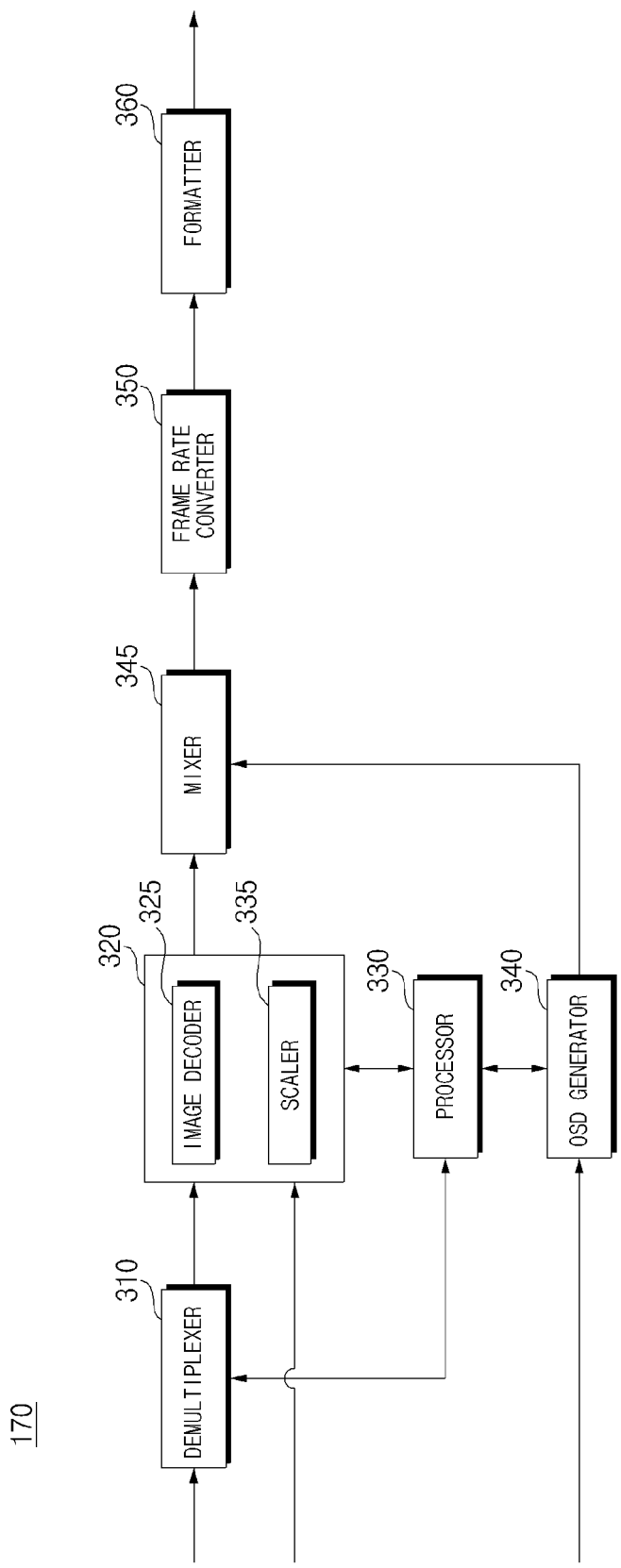
FIG. 3 is an internal block diagram illustrating the controller of FIG. 2.

FIG. 3 is an internal block diagram illustrating the controller of FIG. 2.

Referring to FIG. 3, the controller 170 according to an embodiment of the present invention may include a demultiplexer 310, an image processor 320, a processor 330, an OSD generator 340, a mixer 345, a frame rate converter 350, and a formatter 360. The controller may also include an audio processor (not shown) and a data processor (not shown).

The demultiplexer 310 demultiplexes an input stream. For example, when an MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the external device interface 130.

The image processor 320 may perform image processing on a demultiplexed image signal. To this end, the image processor 320 may include an image decoder 325 and a scaler 335.

The image decoder 325 decodes the demultiplexed image signal, and the scaler 335 scales the resolution of the decoded image signal such that the image signal can be output through the display 180.

The image decoder 325 may include decoders of various standards. For example, the image decoder 325 may include an MPEG-2 decoder, an H.264 decoder, a 3D image decoder for color images and depth images, and a decoder for multi-viewpoint images.

The processor 330 may control overall operation of the image display device 100 or the controller 170. For example, the processor 330 may control the tuner 110 to tune to an RF broadcast corresponding to a channel selected by the user or a pre-stored channel.

In addition, the processor 330 may control the image display device 100 according to a user command input through the user input interface 150 or an internal program.

The processor 330 may also control data communication with the network interface 135 or the external device interface 130.

The processor 330 may also control operations of the demultiplexer 310, image processor 320 and OSD generator 340 in the controller 170.

The OSD generator 340 generates an OSD signal automatically or according to user input. For example, the OSD generator 340 may generate a signal for display of various kinds of information in the form of images or text on the screen of the display 180 based on a user input signal. The generated OSD signal may include various data including the user interface screen window of the image display device 100, various menu screen windows, widgets, and icons. The generated OSD signal may also include a 2D object or a 3D object.

The OSD generator 340 may generate a pointer which can be displayed on the display, based on a pointing signal input via the remote controller 200. In particular, the pointer may be generated by a pointing signal processor (not shown), and the OSD generator 340 may include the pointing signal generator. Of course, it is possible to provide the pointing signal processor (not shown) separately from the OSD generator 340.

The mixer 345 may mix the OSD signal generated by the OSD generator 340 with an image signal processed and decoded by the image processor 320. The mixed image signal is provided to the frame rate converter 350.

The frame rate converter (FRC) 350 may convert the frame rate of an input image. The FRC 350 may output frames without performing separate frame rate conversion.

The formatter 360 may arrange a left image frame and right image frame of a 3D image produced through frame rate conversion. The formatter 360 may output a synchronization signal Vsync to open the left eye glass or right eye glass of a 3D view apparatus (not shown).

The formatter 360 may change the format of an input image signal to a format in which the corresponding image can be displayed on the display.

The formatter 360 may change the format of a 3D image signal. For example, the formatter 360 may change the format of the 3D image signal to one of various 3D formats including a side-by-side format, a top/down format, a frame sequential format, an interlaced format, and a checker box format.

The formatter 360 may convert a 2D image signal into a 3D image signal. For example, the formatter 360 may detect an edge or a selectable object in a 2D image signal, and separate and generate the object according to the detected edge of the selectable object as a 3D image signal. In this case, the generated 3D image signal may be separated into a left image signal L and a right image signal R which are aligned with each other.

Although not shown in the figure, a 3D processor (not shown) for 3-dimensional effect signal processing may be further disposed after the formatter 360. The 3D processor (not shown) may perform processing such as adjustment of brightness, tint and color of an image signal to improve the 3D effect. For example, signal processing of making parts at a close distance clear and making parts at a far distance blurry may be performed. Such function of the 3D processor may be integrated into the formatter 360 or the image processor 320.

An audio processor (not shown) in the controller 170 may process a demultiplexed voice signal. To this end, the audio processor (not shown) may include various decoders.

The audio processor (not shown) in the controller 170 may perform processing such as adjustment of bass, treble, and volume.

The data processor (not shown) in the controller 170 may perform data processing on a demultiplexed data signal. For example, if the demultiplexed data signal is a coded data signal, the data processor (not shown) may decode the data signal. The coded data signal may be electronic program guide information including broadcast information such as a start time and end time of a broadcast program broadcast on each channel.

The block diagram of the controller 170 shown in FIG. 3 is simply illustrative. Constituents of the block diagram may be integrated, added or omitted according to the specifications of the controller 170 which is implemented in reality.

In particular, the frame rate converter 350 and the formatter 360 may not be provided in the controller 170. Instead, they may be provided individually or provided as one separate module.

Figure 4A:
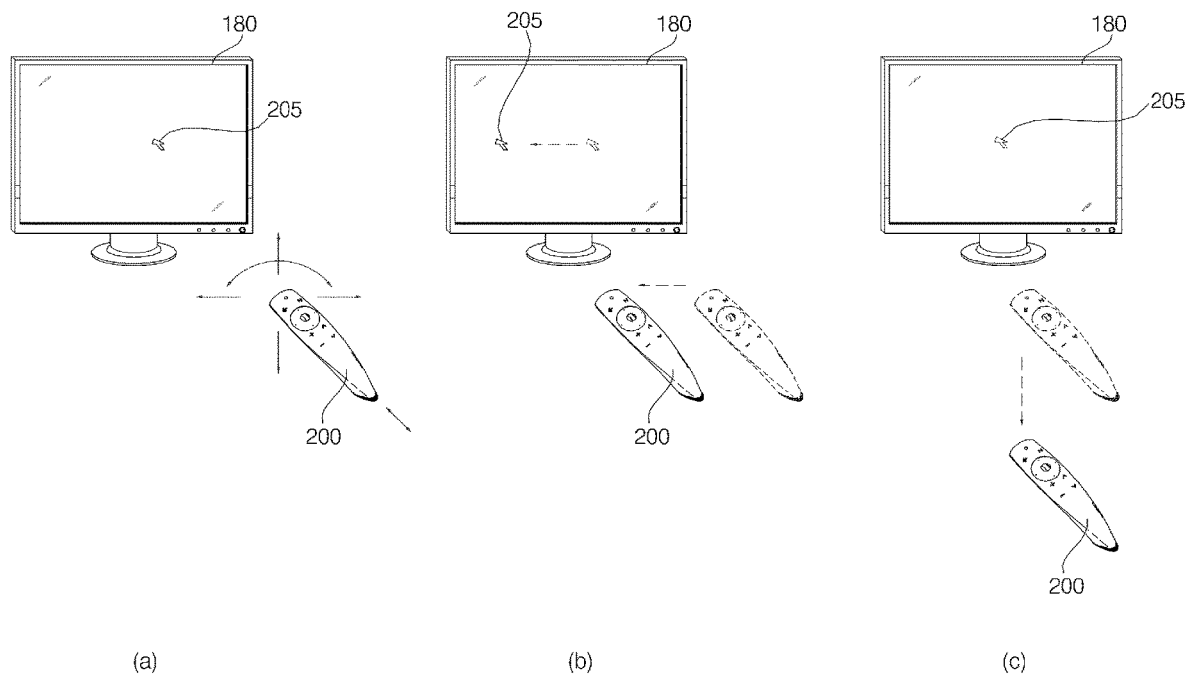
FIG. 4A illustrates a method for controlling the remote controller of FIG. 2.

FIG. 4A illustrates a method for controlling the remote controller of FIG. 2.

As shown in FIG. 4A(a), a pointer 205 corresponding to the remote controller 200 may be displayed on the display 180.

The user may move the remote controller 200 up and down, left and right (FIG. 4A(b)), or back and forth (FIG. 4A(c)) or rotate the same. The pointer 205 displayed on the display 180 of the image display device corresponds to movement of the remote controller 200. As shown in the figure, since the pointer 205 moves according to movement of the remote controller 200 in the 3D space, the remote controller 200 may be referred to as a spatial remote control or a 3D pointing device.

FIG. 4A(b) illustrates a case where the pointer 205 displayed on the display 180 moves to the left when the user moves the remote controller 200 to the left.

Information about movement of the remote controller 200 sensed through a sensor of the remote controller 200 is transmitted to the image display device. The image display device may calculate coordinates of the pointer 205 based on the information about the movement of the remote controller 200. The image display device may display the pointer 205 such that the pointer 205 corresponds to the calculated coordinates.

FIG. 4A(c) illustrates a case where the user moves the controller 170 away from display 180 while pressing down a specific button in the remote controller. In this case, a selected area on the display 180 corresponding to the pointer 205 may be zoomed in and displayed with the size thereof increased. On the other hand, when the user moves the remote controller 200 closer to the display 180, the selected area may be zoomed out and displayed with the size thereof reduced. Alternatively, the selected area may be zoomed out when the remote controller 200 moves away from the display 180, and may be zoomed in when the remote controller 200 moves closer to the display 180.

Vertical and lateral movement of the remote controller 200 may not be recognized while the specific button in the remote controller 200 is pressed down. That is, when the remote controller 200 approaches or moves away from the display 180, vertical and lateral movements thereof may not be recognized, but back-and-forth movement thereof may be recognized. If the specific button in the remote controller 200 is not pressed down, the pointer 205 only moves according to vertical and lateral movements of the remote controller 200.

The speed and direction of movement of the pointer 205 may correspond to the speed and direction of movement of the remote controller 200.

Figure 4B:
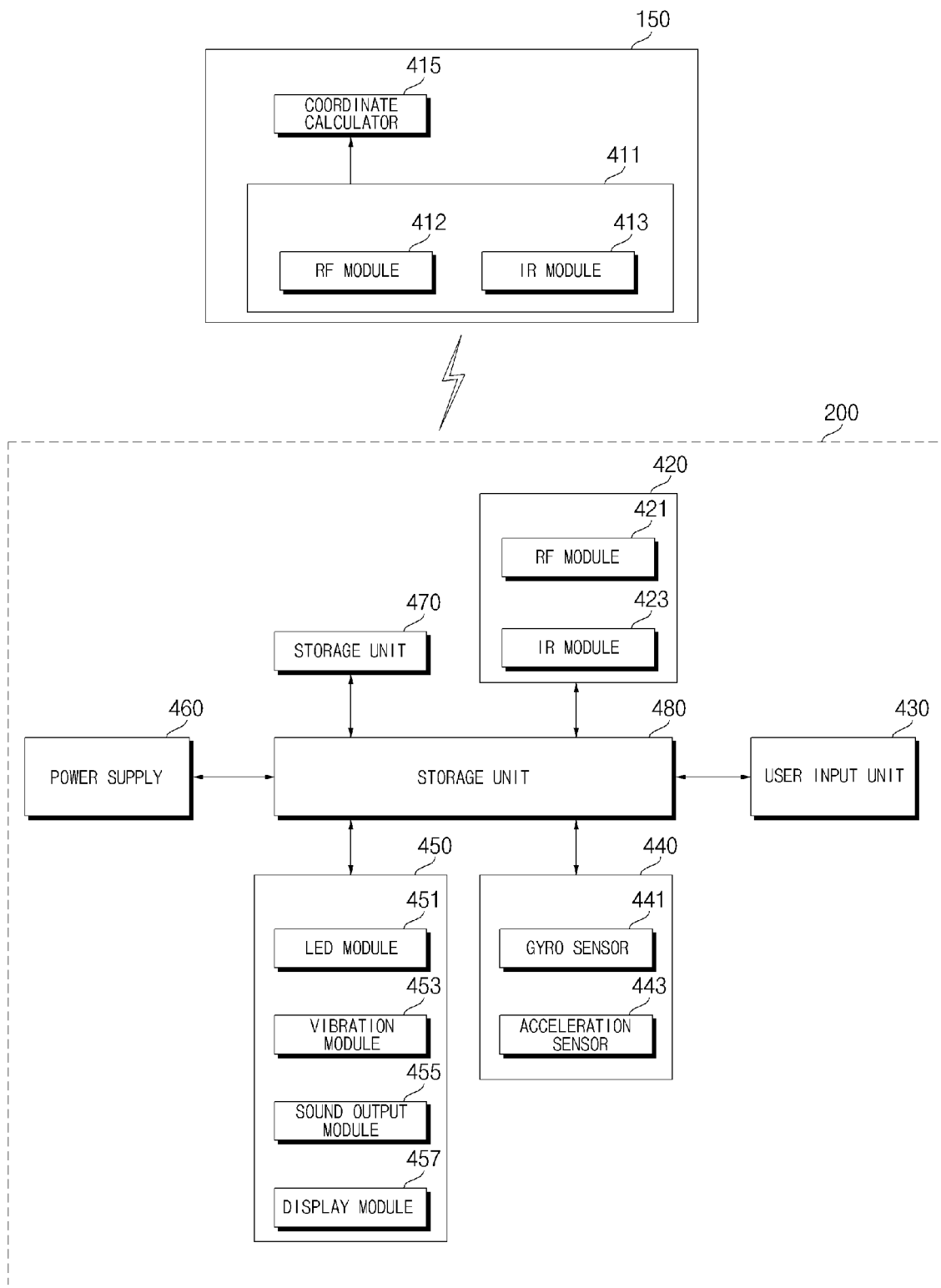
FIG. 4B is an internal block diagram illustrating the remote controller of FIG. 2.

FIG. 4B is an internal block diagram illustrating the remote controller of FIG. 2.

Referring to FIG. 4B, the remote controller 200 may include a wireless communication unit 425, a user input unit 430, a sensor unit 440, an output unit 450, a power supply 460, a storage unit 470, and a controller 480.

The wireless communication unit 425 transmits and receives signals to and from one of the image display devices according to embodiments of the present invention described above. Hereinafter, one image display device 100 according to an embodiment of the present invention will be described.

In this embodiment, the remote controller 200 may include an RF module 421 capable of transmitting and receiving signals to and from the image display device 100 according to an RF communication standard. The remote controller 200 may further include an IR module 423 capable of transmitting and receiving signals to and from the image display device 100 according to an IR communication standard.

In this embodiment, the remote controller 200 transmits a signal including information about movement of the remote controller 200 to the image display device 100 via the RF module 421.

In addition, the remote controller 200 may receive a signal from the image display device 100 via the RF module 421. When necessary, the remote controller 200 may transmit commands related to power on/off, channel change, and volume change to the image display device 100 via the IR module 423.

The user input unit 430 may include a keypad, a button, a touchpad, or a touchscreen. The user may input a command related to the display device 100 with the remote controller 200 by manipulating the user input unit 430. If the user input unit 430 includes a hard key button, the user may input a command related to the image display device 100 with the remote controller 200 by pressing the hard key button. If the user input unit 430 includes a touchscreen, the user may input a command related to the image display device 100 with the remote controller 200 by touching a soft key on the touchscreen. The user input unit 430 may include various kinds of input means such as a scroll key and a jog key which are manipulatable by the user, but it should be noted that this embodiment does not limit the scope of the present invention.

The sensor unit 440 may include a gyro sensor 441 or an acceleration sensor 443. The gyro sensor 441 may sense information about movement of the remote controller 200.

For example, the gyro sensor 441 may sense information about movement of the remote controller 200 with respect to the X, Y and Z axes. The acceleration sensor 443 may sense information about the movement speed of the remote controller 200. The sensor unit 440 may further include a distance measurement sensor to sense a distance to the display 180.

The output unit 450 may output an image signal or voice signal corresponding to manipulation of the user input unit 430 or a signal transmitted from the image display device 100. The user may recognize, via the output unit 450, whether the user input unit 430 is manipulated or the image display device 100 is controlled.

For example, the output unit 450 may include an LED module 451 to be turned on when signals are transmitted to and received from the image display device 100 via the wireless communication unit 425, a vibration module 453 to generate vibration, a sound output module 455 to output sound, or a display module 457 to output an image.

The power supply 460 supplies power to the remote controller 200. If the remote controller 200 does not move for a predetermined time, the power supply 460 may stop supplying power to save power. The power supply 460 may resume supply of power when the predetermined key provided to the remote controller 200 is manipulated.

The storage unit 470 may store various kinds of programs and application data necessary for control or operation of the remote controller 200. When the remote controller 200 wirelessly transmits and receives signals to and from the image display device 100 via the RF module 421, the remote controller 200 and the image display device 100 may transmit and receive signals in a predetermined frequency band. The controller 480 of the remote controller 200 may store, in the storage unit 470, information about, for example, a frequency band enabling wireless transmission and reception of signals to and from the image display device 100 which is paired with the remote controller 200, and reference the same.

The controller 480 controls overall operation related to control of the remote controller 200. The controller 480 may transmit, via the wireless communication unit 425, a signal corresponding to manipulation of a predetermined key in the user input unit 430 or a signal corresponding to movement of the remote controller 200 sensed by the sensor unit 440 to the image display device 100.

The user input interface 150 of the image display device 100 may include a wireless communication unit 151 capable of wirelessly transmitting and receiving signals to and from the remote controller and a coordinate calculator 415 capable of calculating coordinates of the pointer corresponding to operation of the remote controller 200.

The user input interface 150 may wirelessly transmit and receive signals to and from the remote controller 200 via an RF module 412. In addition, the user input interface 150 may receive, via an IR module 413, a signal transmitted from the remote controller 200 according to an IR communication standard.

The coordinate calculator 415 may calculate coordinates (x, y) of the pointer 205 to be displayed on the display 180, by correcting hand tremor or an error in a signal corresponding to operation of the remote controller 200 which is received via the wireless communication unit 151.

The transmitted signal of the remote controller 200 input to the image display device 100 via the user input interface 150 is transmitted to the controller 170 of the image display device 100. The controller 170 may determine information about an operation of the remote controller 200 or manipulation of a key from the signal transmitted from the remote controller 200, and control the image display device 100 according to the information.

As another example, the remote controller 200 may calculate coordinates of the pointer corresponding to movement thereof and output the same to the user input interface 150 of the image display device 100. In this case, the user input interface 150 of the image display device 100 may transmit, to the controller 170, information about the received coordinates of the pointer without separately correcting hand tremor or the error.

As another example, in contrast with the example of the figure, the coordinate calculator 415 may be provided in the controller 170 rather than in the user input interface 150.

Figure 5:
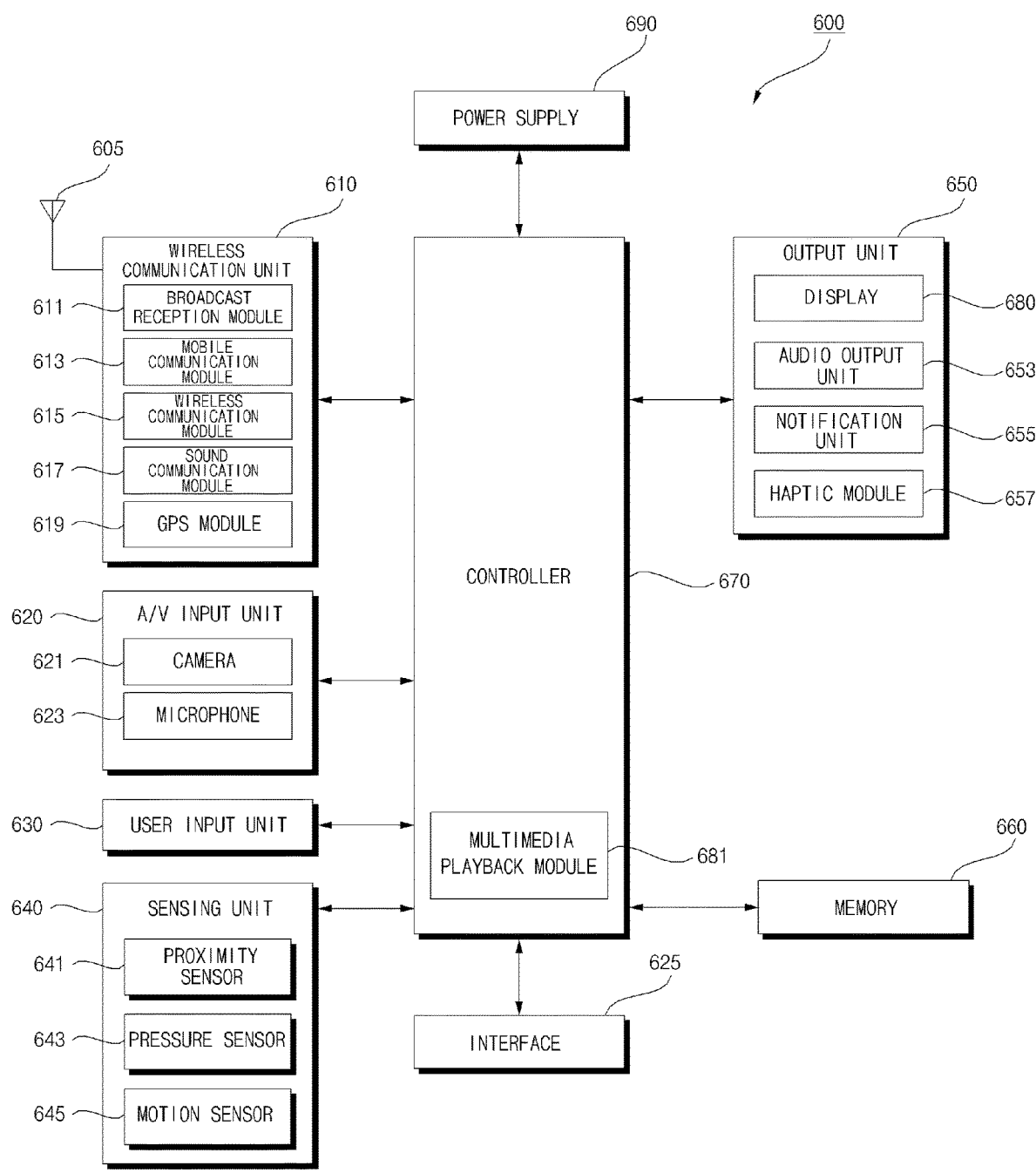
FIG. 5 is an internal block diagram illustrating the mobile terminal of FIG. 1.

FIG. 5 is an internal block diagram illustrating the mobile terminal of FIG. 1.

Referring to FIG. 5, the mobile terminal 600 may include a wireless communication unit 610, an audio/video (A/V) input unit 620, a user input unit 630, a sensing unit 640, and an output unit 650, a memory 660, an interface 625, a controller 670 and a power supply 690.

The wireless communication unit 610 may include a broadcast reception module 611, a mobile communication module 613, a wireless communication module 615, a sound communication unit 617, and a GPS module 619.

The broadcast reception module 611 may receive at least one of a broadcast signal and broadcast-related information from an external broadcast management server over a broadcast channel. Herein, the broadcast channel may include a satellite channel and a terrestrial channel.

The broadcast signal and/or broadcast-related information received through the broadcaster reception module 611 may be stored in the memory 660.

The mobile communication module 613 transmits and receives a radio signal to and from at least one of a base station, an external terminal and a server over a mobile communication network. Herein, the wireless signal may include a voice call signal, a video call signal, or various kinds of data according to transmission and reception of a text/multimedia message.

The wireless communication module 615, which refers to a module for wireless Internet access, may be installed inside or outside the mobile terminal 600. For example, the wireless communication module 615 may perform Wi-Fi-based wireless communication or Wi-Fi Direct-based wireless communication.

The sound communication unit 617 may perform sound communication. In the sound communication mode, the sound communication unit 617 may add data of predetermined information to audio data which is to be output and output sound. In addition, in the sound communication mode, the sound communication unit 617 may extract data of predetermined information from received sound.

Applicable short-range communication technologies may include Bluetooth, RFID (radio frequency identification), IrDA (Infrared Data Association), UWB (Ultra-Wideband) and ZigBee.

The GPS module 619 may receive location information from a plurality of GPS satellites.

The A/V input unit 620 is used for input of an audio signal or a video signal and may include a camera 621 and a microphone 623.

The user input unit 630 generates key input data input by the user to control operation of a terminal of the user. To this end, the user input unit 630 may include a keypad, a dome switch, and a touchpad (resistive touchpad/capacitive touchpad). In particular, the touchpad may form a layered architecture together with the display 180, thereby realizing a touchscreen.

The sensing unit 640 may generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing unit 640 may include a proximity sensor 641, a pressure sensor 643 and a motion sensor 645. The motion sensor 645 may employ an acceleration sensor, a gyro sensor, a gravity sensor and the like to sense movement or the location of the mobile terminal. In particular, the gyro sensor, which is used to measure an angular speed, may sense orientation (angle) of the mobile terminal with respect to a reference direction.

The output unit 650 may include a display 680, an audio output unit 653, a notification unit 655, and a haptic module 657.

The display 680 outputs and displays information processed by the mobile terminal 600.

As described above, if the display 680 forms a layered architecture with the touchpad to implement a touchscreen, the display 680 may be used not only as an output device but also as an input device for input of information according to user touch.

The audio output unit 653 outputs audio data received from the wireless communication unit 610 or stored in the memory 660. The audio output unit 653 may include a speaker and a buzzer.

The notification unit 655 outputs a signal for reporting occurrence of an event in the mobile terminal 600. For example, the notification unit 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 670, and functions to temporarily store input data or output data (e.g., a phonebook, a message, a still image, a moving image, etc.).

The interface 625 serves as an interface for all devices connected to the mobile terminal 600. The interface 625 may serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 may perform control or processing related to voice communication, data communication, video communication, and the like. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 when external power or internal power is applied thereto.

The block diagram of the mobile terminal 600 shown in FIG. 5 is simply illustrative. The respective constituents of the block diagram may be integrated, added or omitted according to the specifications of the mobile terminal 600. That is, two or more constituents may be combined into one constituent, or one constituent may be subdivided into two or more constituents, when necessary. In addition, the function performed in each block is simply illustrative, and it should be noted that specified operations or devices of the blocks do not limit the scope of the present invention.

Figure 6:
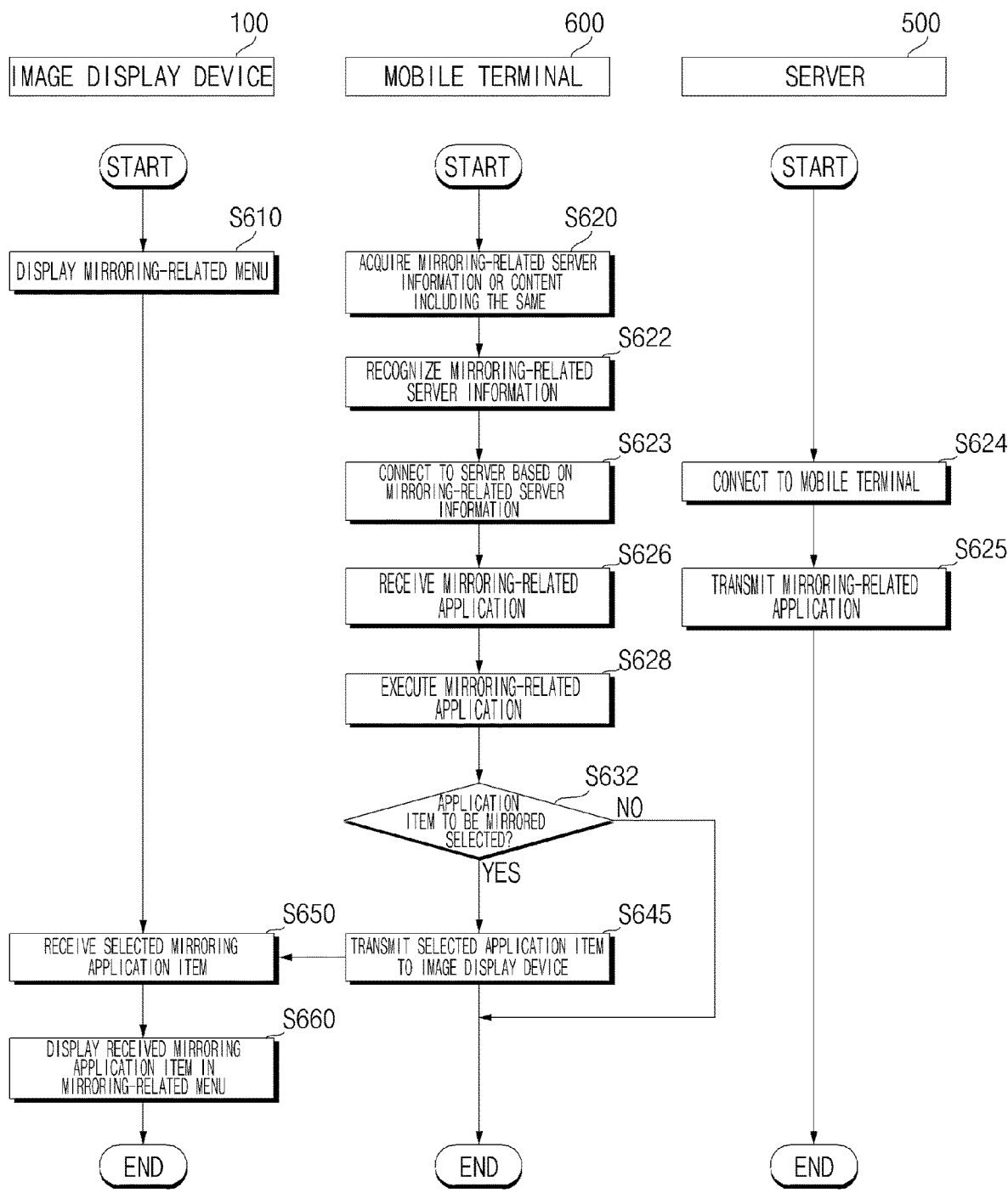
FIG. 6 is a flowchart illustrating operation of an image display device and mobile terminal according to an embodiment of the present invention.

FIG. 6 is a flowchart illustrating operation of an image display device and mobile terminal according to an embodiment of the present invention, and FIGS. 7A to 11E illustrate the operation method of FIG. 6.

Referring to FIG. 6, the controller 170 of the image display device 100 may perform a control operation based on user input to display mirroring-related server information or content related to the server information (S610).

For example, when an input is provided through a specific key of the remote controller 200, the controller 170 of the image display device 100 may perform a control operation to display a mirroring-related menu including content related to mirroring-related server information or content related to the server information.

For example, the content related to the server information may include a code image including the server information. More specifically, the content may include a QR code image including the server information.

As another example, the content related to the server information may be output as predetermined sound.

Next, the controller 670 of the mobile terminal 600 may acquire the mirroring-related server information or the content related to the server information displayed on the image display device 100 (S620). Then, the controller 670 of the mobile terminal 600 may recognize the mirroring-related server information (S625).

For example, the mobile terminal 600 may capture a code image displayed on the image display device 100 through the camera 621 of the mobile terminal 600. Then, the controller 670 of the mobile terminal 600 may extract server information from the captured code image and recognize the extracted server information.

As another example, the mobile terminal 600 may extract server information from sound received through the microphone 623 and recognize the extracted server information.

Next, the controller 670 of the mobile terminal 600 may control the mobile terminal 600 to be connected to the corresponding server based on the recognized mirroring-related server information (S623). Thereby, the server 500 may be connected to the mobile terminal 600 (S624).

For example, the server 500 may be a server operated by the manufacturer of the image display device 100. The server 500 may be a server corresponding to mirroring-related server information installed when the image display device 100 was manufactured.

The user of the mobile terminal 600 may easily access the server 500 through the content related to the mirroring-related server information or content related to the server information displayed on the image display device 100.

The server 500 may transmit a mirroring-related application to the mobile terminal 600 when connected with the mobile terminal 600 (S625).

The controller 670 of the mobile terminal 600 may receive the mirroring-related application from the server 500 through the communication unit 610 (S626), and install the mirroring-related application. Then, the controller 170 may execute the mirroring-related application (S628).

Thereby, the mirroring-related application may be easily installed on and executed by the mobile terminal 600.

Next, the controller 670 of the mobile terminal 600 may determine whether an application item for which mirroring is to be performed has been selected (S632). When the application item for which mirroring is to be performed is selected, the controller 670 may perform a control operation to transmit the selected application item to the image display device 100 (S645).

For example, the controller 670 of the mobile terminal 600 may select an application item for which mirroring is to be performed with the image display device 100 among a plurality of applications installed in the mobile terminal 600, through the mirroring-related application.

At least one application item may be selected, and the controller 670 of the mobile terminal 600 may transmit information about the selected application item to the image display device 100.

In particular, the controller 670 of the mobile terminal 600 may transmit name information, application image information, user information, and application version information about the selected application item to the image display device 100.

Next, the controller 170 of the image display device 100 may receive the selected mirroring application item from the mobile terminal 600 via the network interface 135 or 145 (S650).

Then, the controller 170 of the image display device 100 may install the received mirroring application item in the image display device 100, and particularly, performs a control operation to display the received mirroring application item in a mirroring-related menu (S660). Thereby, the mirroring application item from the mobile terminal may be easily installed in and displayed on the image display device 100.

Hereinafter, the operation method of FIG. 6 will be described with reference to FIGS. 7A to 11E.

Figure 7A:
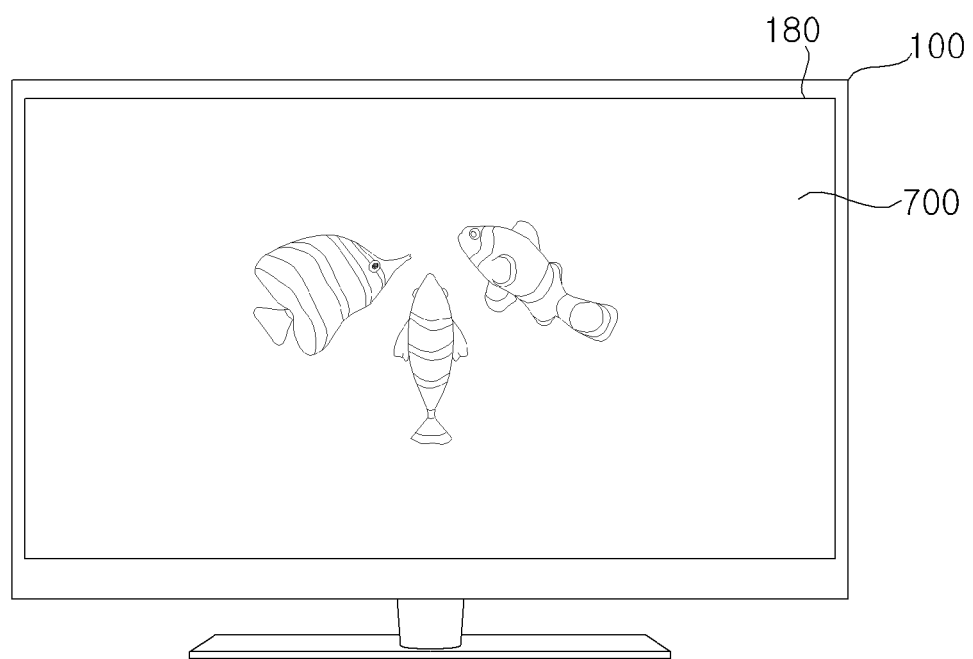
FIGS. 7A to 11E illustrate the operation method of FIG. 6.

The controller 170 of the image display device 100 may perform a control operation to display, on the display 180, a broadcast image 700 based on a broadcast signal received by a broadcast receiver 105, as shown in FIG. 7A.

Figure 7B:
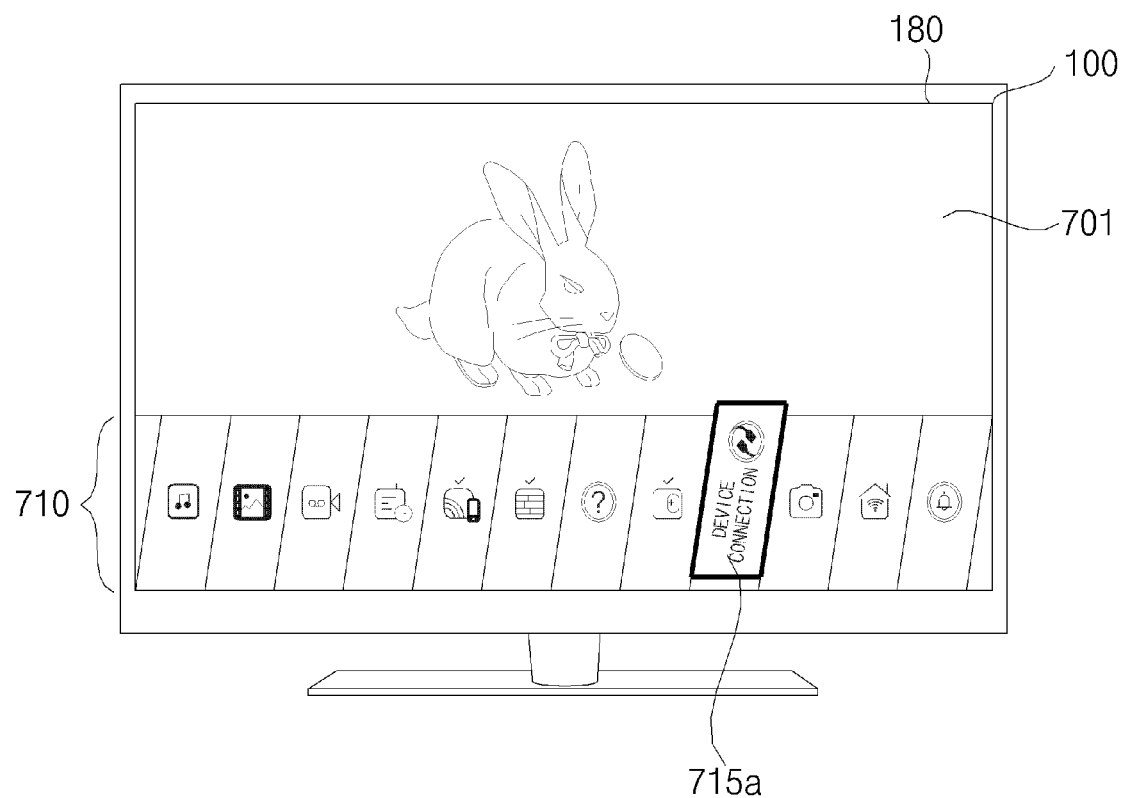

Herein, when an input is provided through of a specific key of the remote controller 200 or a predetermined item in a displayed menu is selected, the controller 170 of the image display device 100 may perform a control operation to display a broadcast image 701 corresponding to a broadcast signal and an application list 710, as shown in FIG. 7B.

The controller 170 of the image display device 100 may perform a control operation to display the application list 710 and the broadcast image 701 in an overlapping manner, as shown in FIG. 7B.

The application list 710 may include various application items including a device connection application item 715a. Additionally, the application list 710 may include an additional view item for viewing an additional application.

The device connection application item 715a may be referred to as a mirroring application item.

When the device connection application item 715a is focused on by the pointer of the remote controller 200, the controller 170 of the image display device 100 may control the device connection application item 715a to be highlighted in contrast with the other items when the device connection application item 715a is displayed, as shown in FIG. 7B.

In the example of the figure, the size of the device connection application item 715a is increased over the other application items.

Figure 7C:
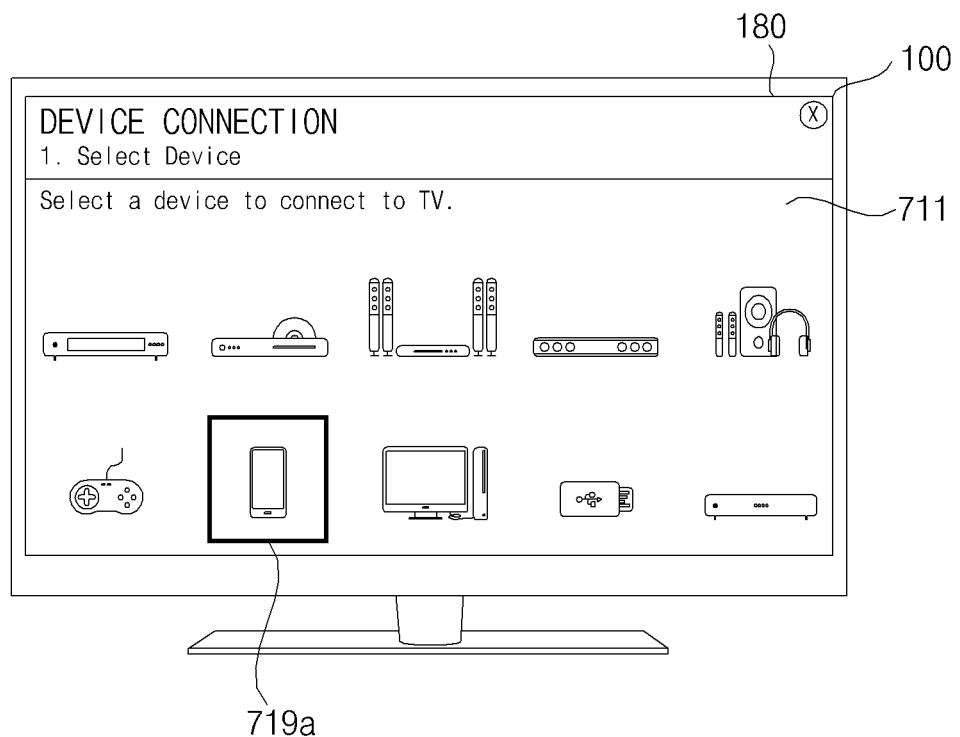

If the device connection application item 715a is selected by the pointer of the remote controller 200, the controller 170 of the image display device 100 may perform a control operation to display a device list screen window 711 including a plurality of device items for mirroring connection on the display 180, as shown in FIG. 7C.

In the example of FIG. 7C, the displayed image 701 is caused to disappear, and the device list screen window 711 is displayed. Alternatively, the device list screen window 711 may be overlaid on the displayed image 701.

The device list screen window 711 may include a set-top box item, a Blu-ray/DVD player item, a home theater item, a sound bar item, a speaker/headphone item, a game console item, a mobile terminal item, a computer item, an external storage device item such as a USB item, and other device items.

Figure 7D:
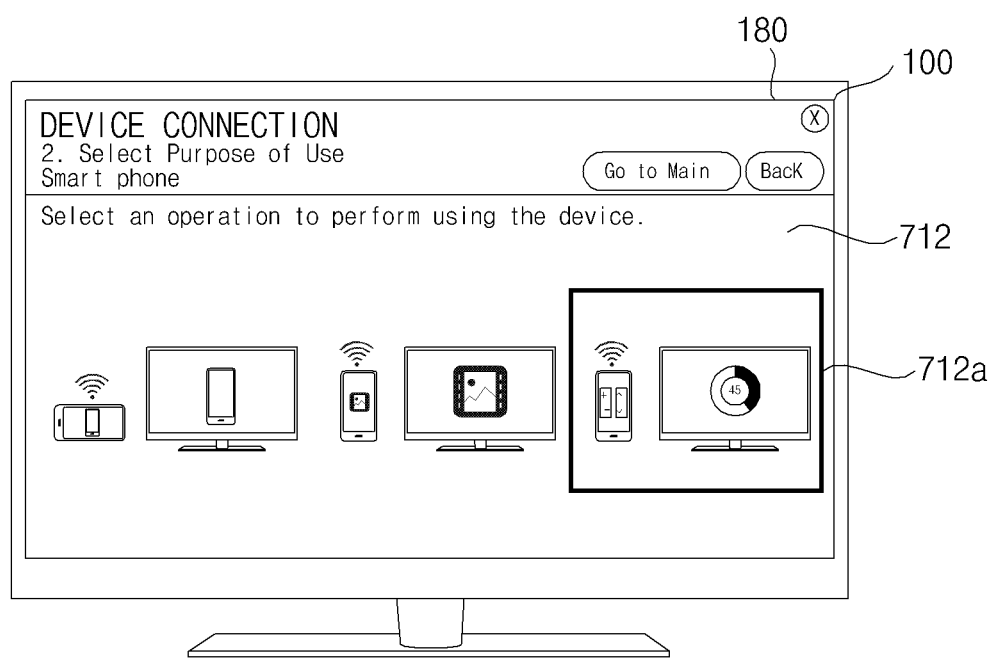

When the mobile terminal item 719a in the device list screen window 711 is selected by, for example, the pointer of the remote controller 200, the controller 170 of the image display device 100 may perform a control operation to display, on the display 180, a device control list screen window 712 including a plurality of items to be controlled through the mobile terminal, as shown in FIG. 7D.

The device control list screen window 712 may include a remote control item from remotely controlling the image display device 100 using the mobile terminal 600, a Share Content item for sharing content between the mobile terminal 600 and the image display device 100, and a mirroring item for mirroring between the mobile terminal 600 and the image display device 100.

Figure 7E:
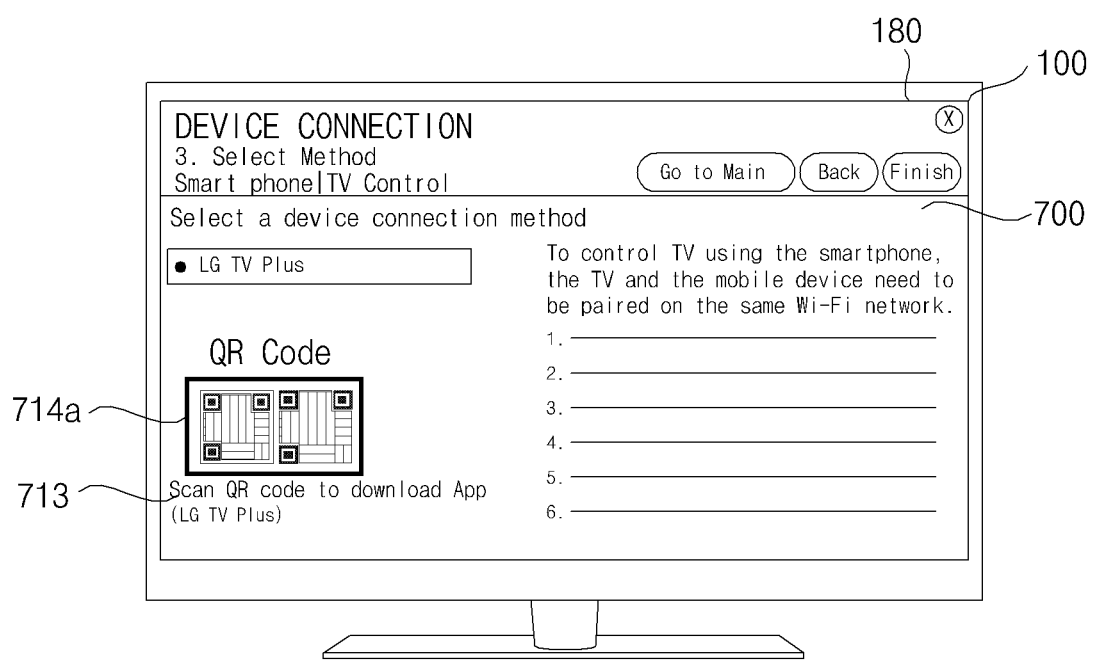

When a mirroring item 712a in the device control list screen window 712 is selected by, for example, the pointer of the remote controller 200, the controller 170 of the image display device 100 may perform a control operation to display the device control list screen window 712 including a plurality of items to be controlled through the mobile terminal and a device connection method screen window 700 indicating a device connection method, as shown in FIG. 7E.

The device connection method screen window 700 may include a code image 714a including server information and relevant information 713.

Figure 7F:
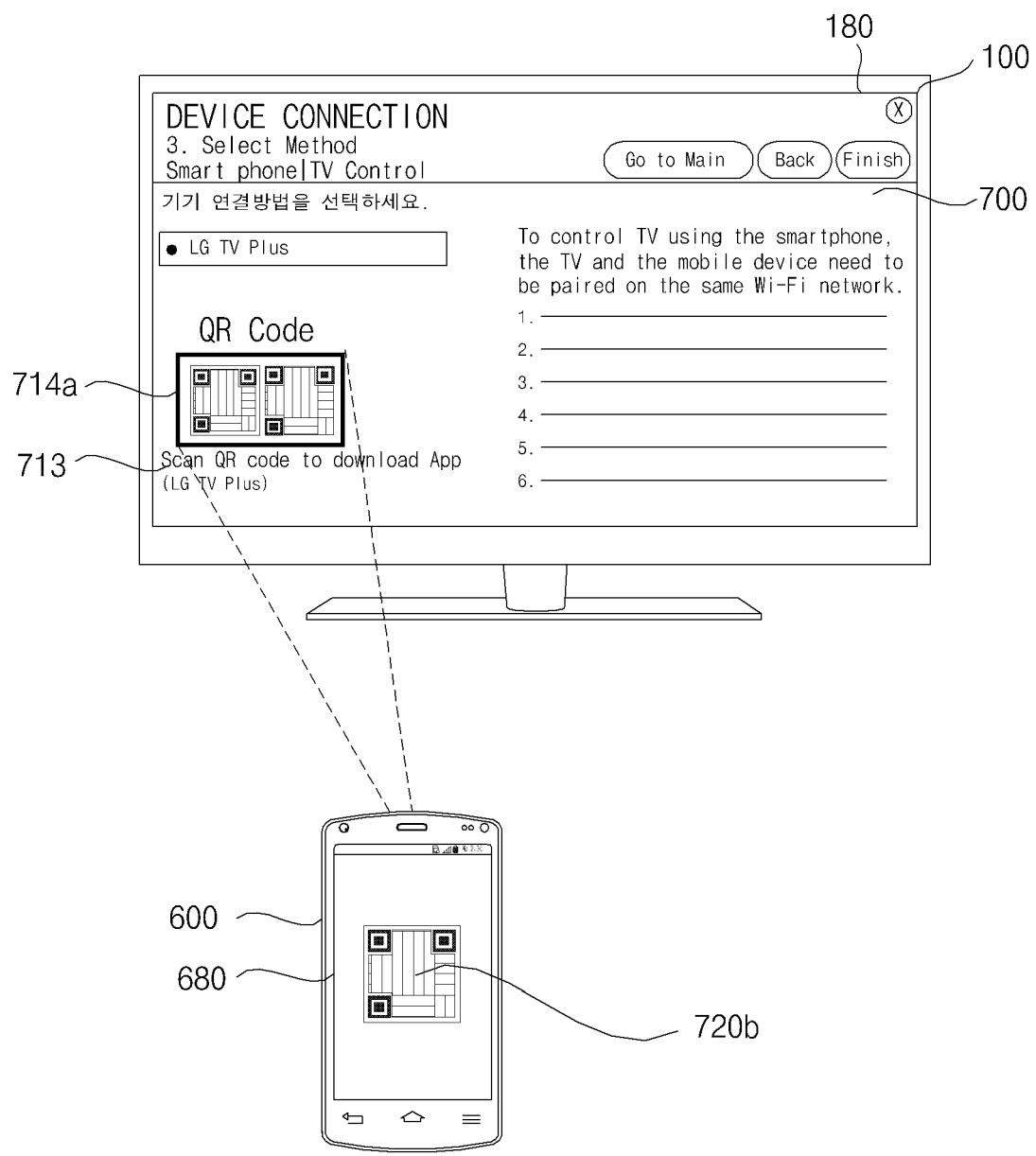
Figure 7G:
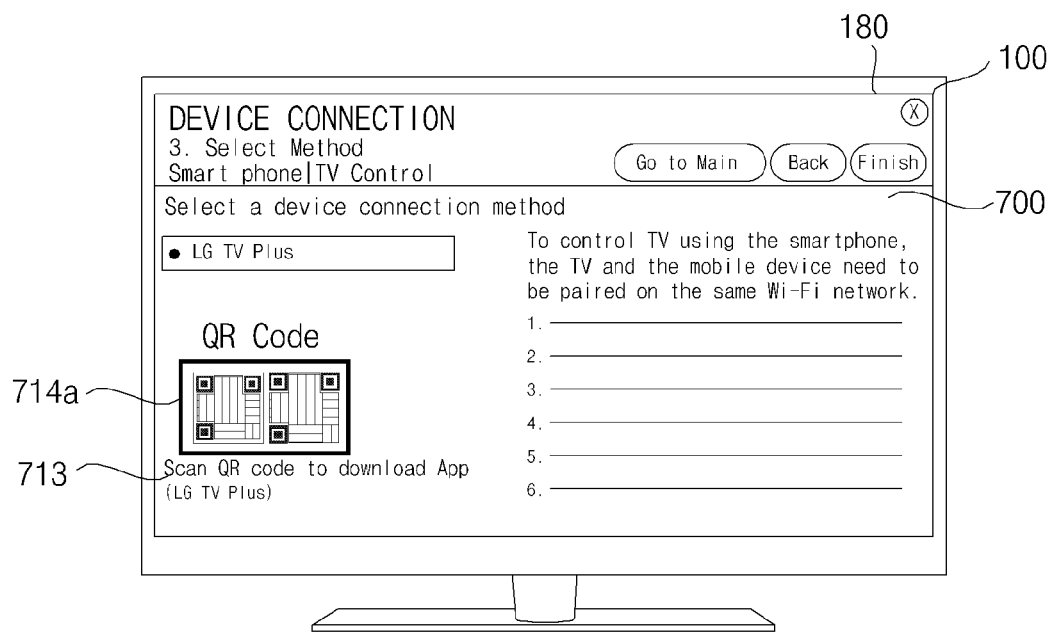
Figure 7G:
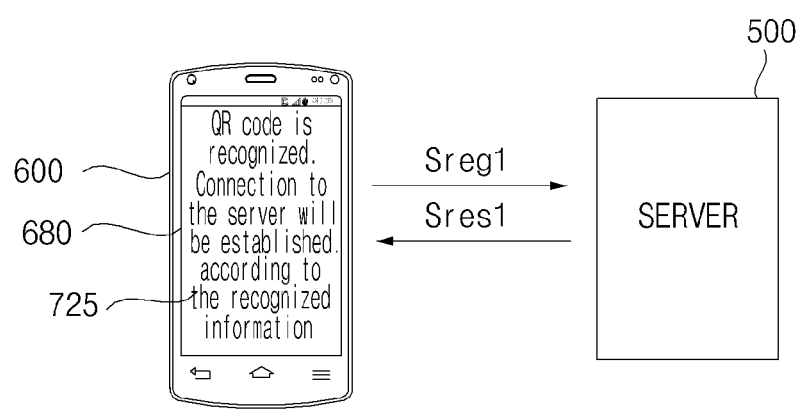

For example, the code image 714a including the server information may include a QR code image including the server information, as shown in FIG. 7G.

While the code image 714a including the server information is displayed on the image display device 100, the camera 621 of the mobile terminal 600 may capture the code image 714a including the server information, as shown in FIG. 7F.

Then, the controller 670 of the mobile terminal 600 may receive and recognize the captured image 720b. In this case, the controller 670 of the mobile terminal 600 may perform a control operation to display the image 720b related to the captured server information on the display 180.

The controller 670 of the mobile terminal 600 may extract server information from the captured image 720b.

Then, the controller 670 of the mobile terminal 600 may control connection to the server 500 based on the extracted server information.

For example, the controller 670 of the mobile terminal 600 may transmit a connection request signal Sreg1 to the server 500 to connect to the server 500, and receive a connection response signal Sres1 from the server 500, as shown in FIG. 7G.

Figure 7H:
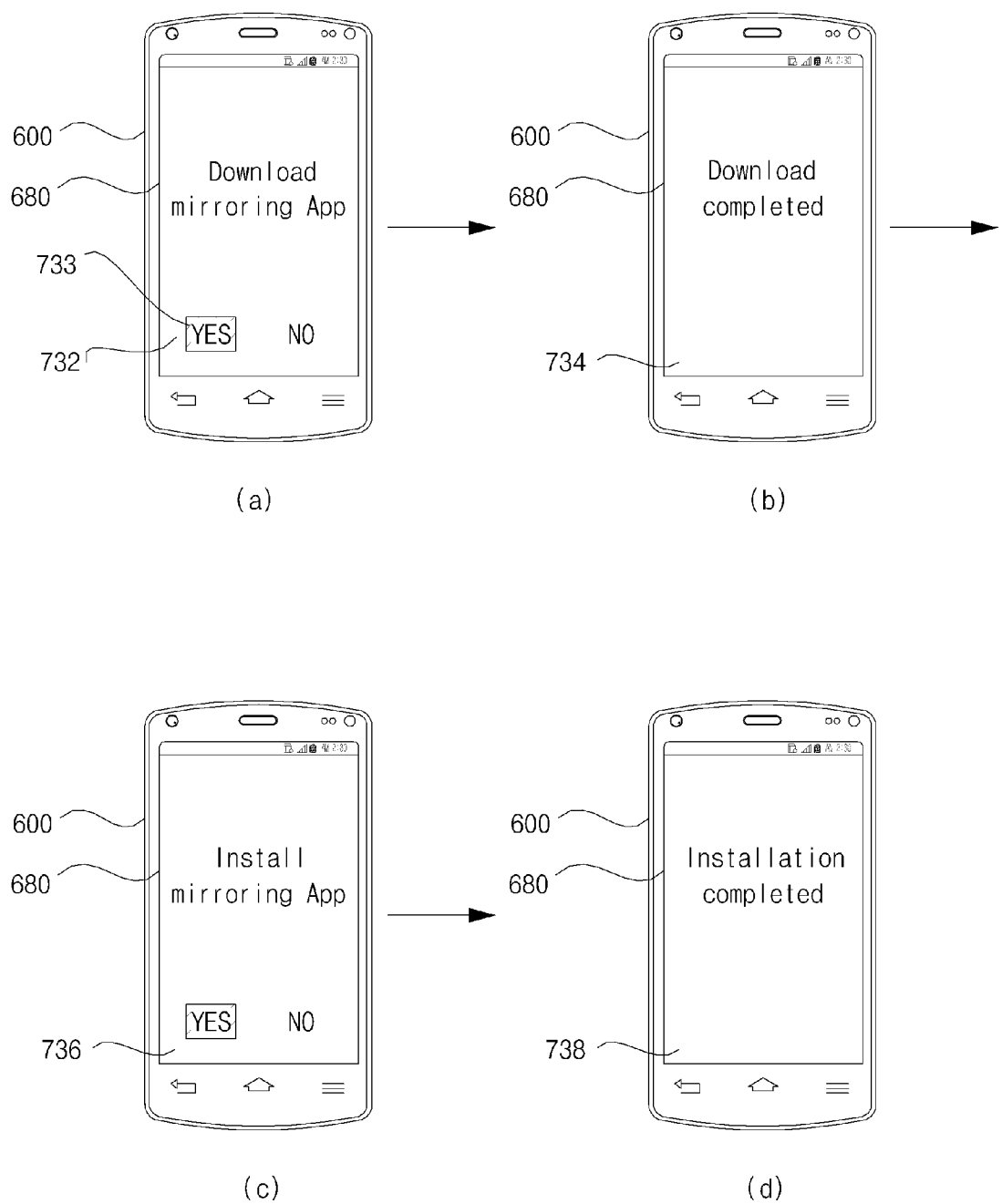

Next, the controller 670 of the mobile terminal 600 may receive a mirroring-related application from the server 500, as shown in FIG. 7H.

More specifically, the controller 670 of the mobile terminal 600 may perform a control operation to display a screen window 732 for downloading a mirroring application, as shown in FIG. 7H(a).

In this case, when the download item 732 is selected by, for example, touch input from the user, the controller 670 of the mobile terminal 600 may download a mirroring application. When downloading is completed, the controller 670 of the mobile terminal 600 may perform a control operation to display a download complete screen window 734, as shown in FIG. 7H(b).

Next, the controller 670 of the mobile terminal 600 may install the downloaded mirroring setting application. In this case, the controller 670 of the mobile terminal 600 may perform a control operation to display an installation screen window 736 as shown in FIG. 7H(c).

When the installation is completed, the controller 670 of the mobile terminal 600 may perform a control operation to display an installation completed screen window 738 as shown in FIG. 7H(d).

Next, the controller 670 of the mobile terminal 600 may execute the installed mirroring setting application.

This operation will be described with reference to FIGS. 8A to 8K or FIGS. 9A to 10J.

Figure 8A:
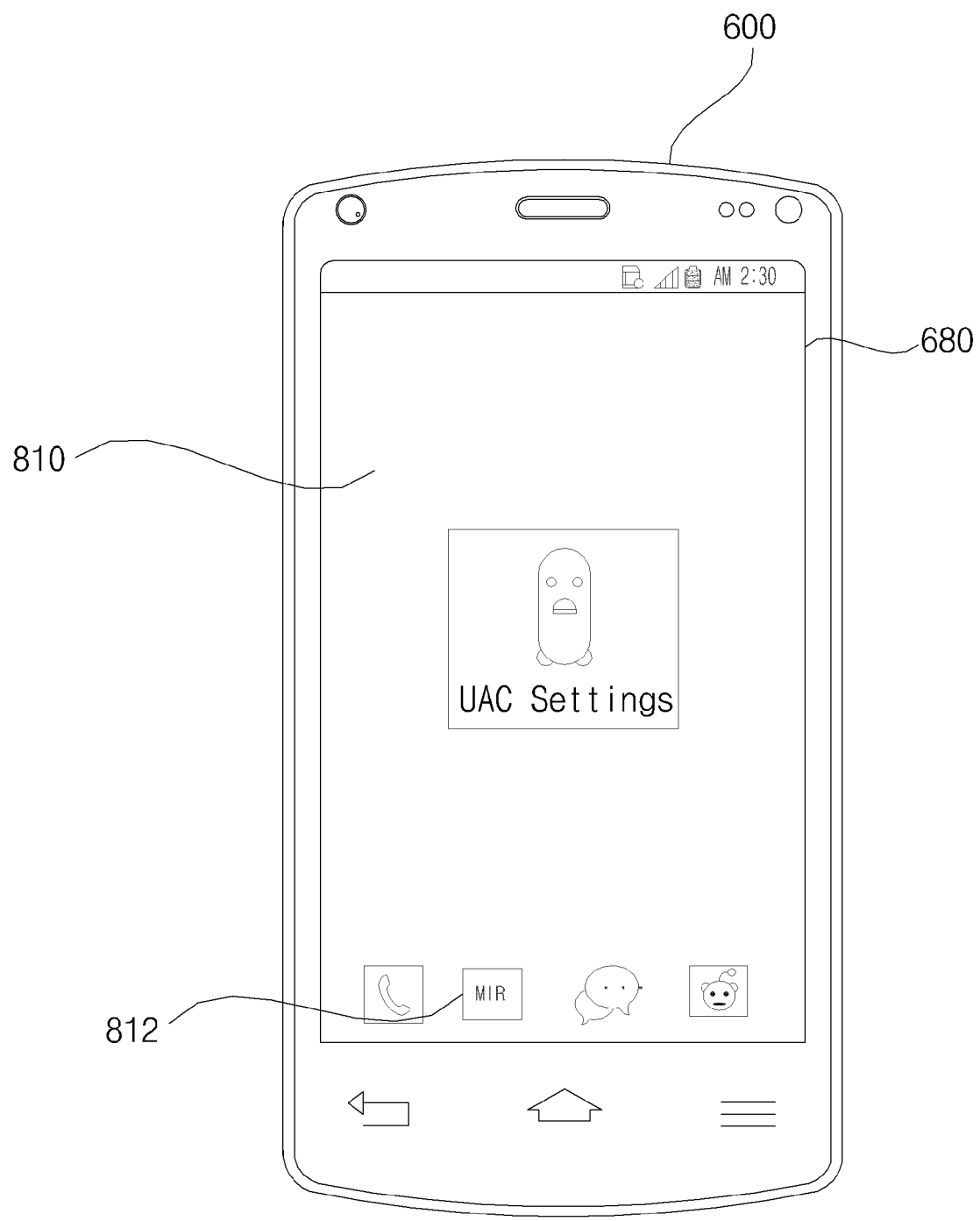

FIG. 8A illustrates an idle-mode screen 810 or home screen 810 of the mobile terminal 600. The idle-mode screen 810 or the home screen 810 may be displayed on the display 680. A plurality of application items may be displayed at the lower end of the screen window. In the figure, the mirroring application item 812 is displayed among a plurality of application items.

When the mirroring application item 812 is selected in the idle-mode screen 810 or home screen 810 of the mobile terminal 600 of FIG. 8A, or downloading of the mirroring application in FIG. 7H is completed, the mirroring application may be automatically executed.

Figure 8B:
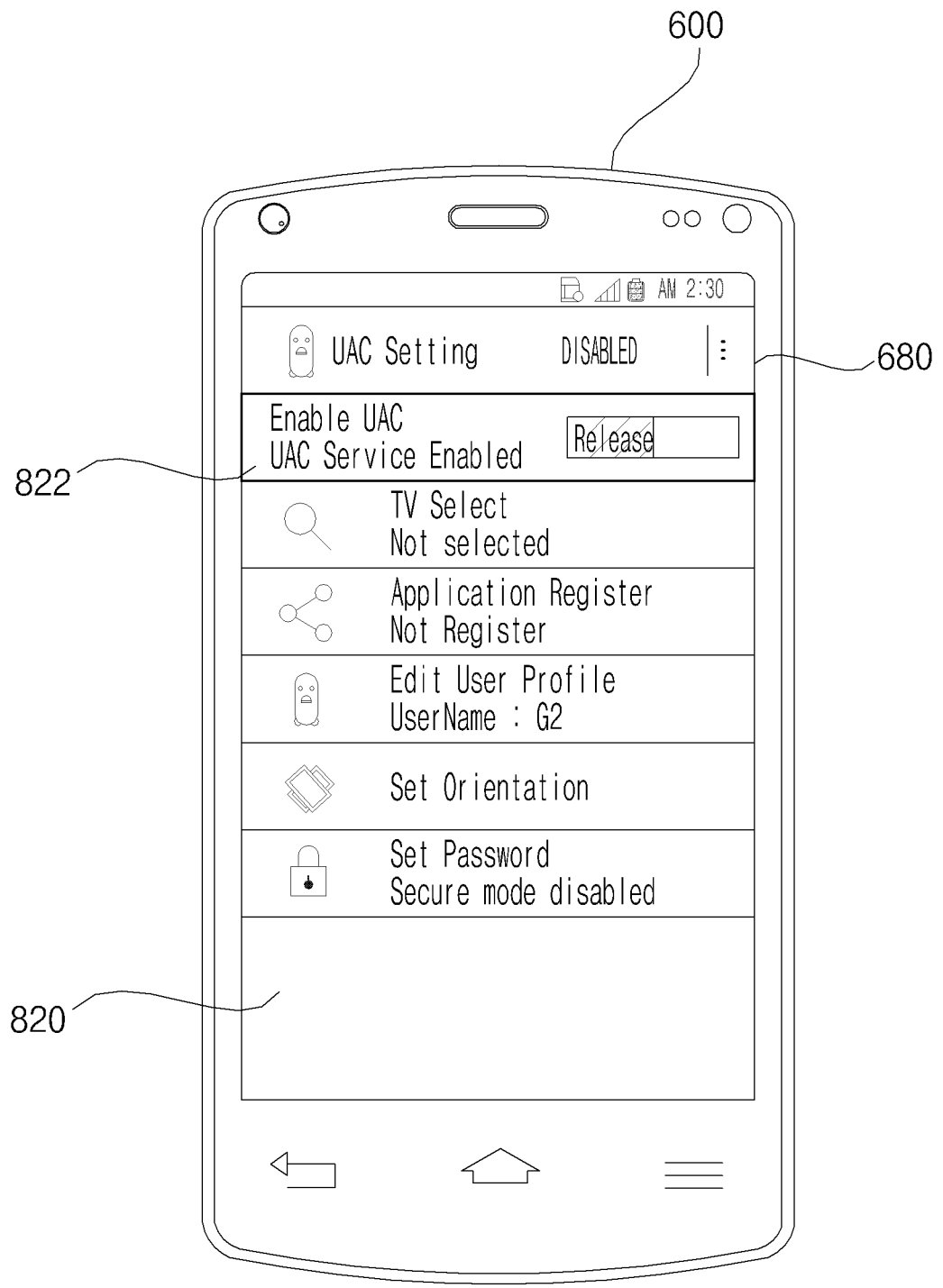

In executing the mirroring application, the controller 670 of the mobile terminal 600 may perform a control operation to display a mirroring setting application screen window 820, as shown in FIG. 8B.

The mirroring setting application screen window 820 may include a Enable item 822, a TV Select item 824, an Application Register item 826, an Edit User Profile item 823, a Set Orientation item 813, and a Set Password item 814.

Figure 8C:
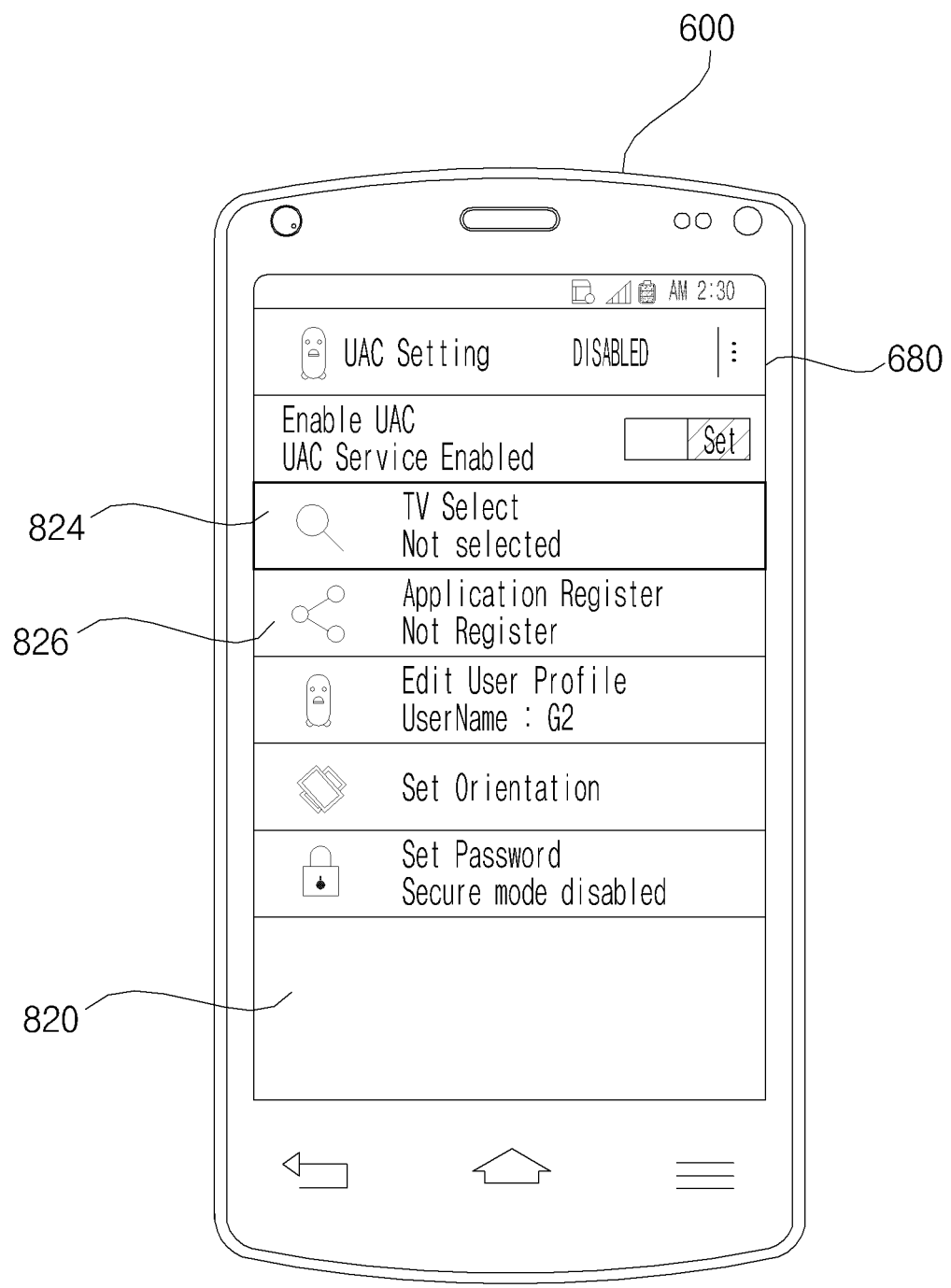

When the Enable item 822 is selected and activated, the controller 670 of the mobile terminal 600 may perform a control operation to activate and display the TV Select item 824, the Application Register item 826, the Edit User Profile item 823, the Set Orientation item 813, and the Set Password item 814, as shown in FIG. 8C. Thereby, various kinds of settings may be implemented.

Figure 8D:
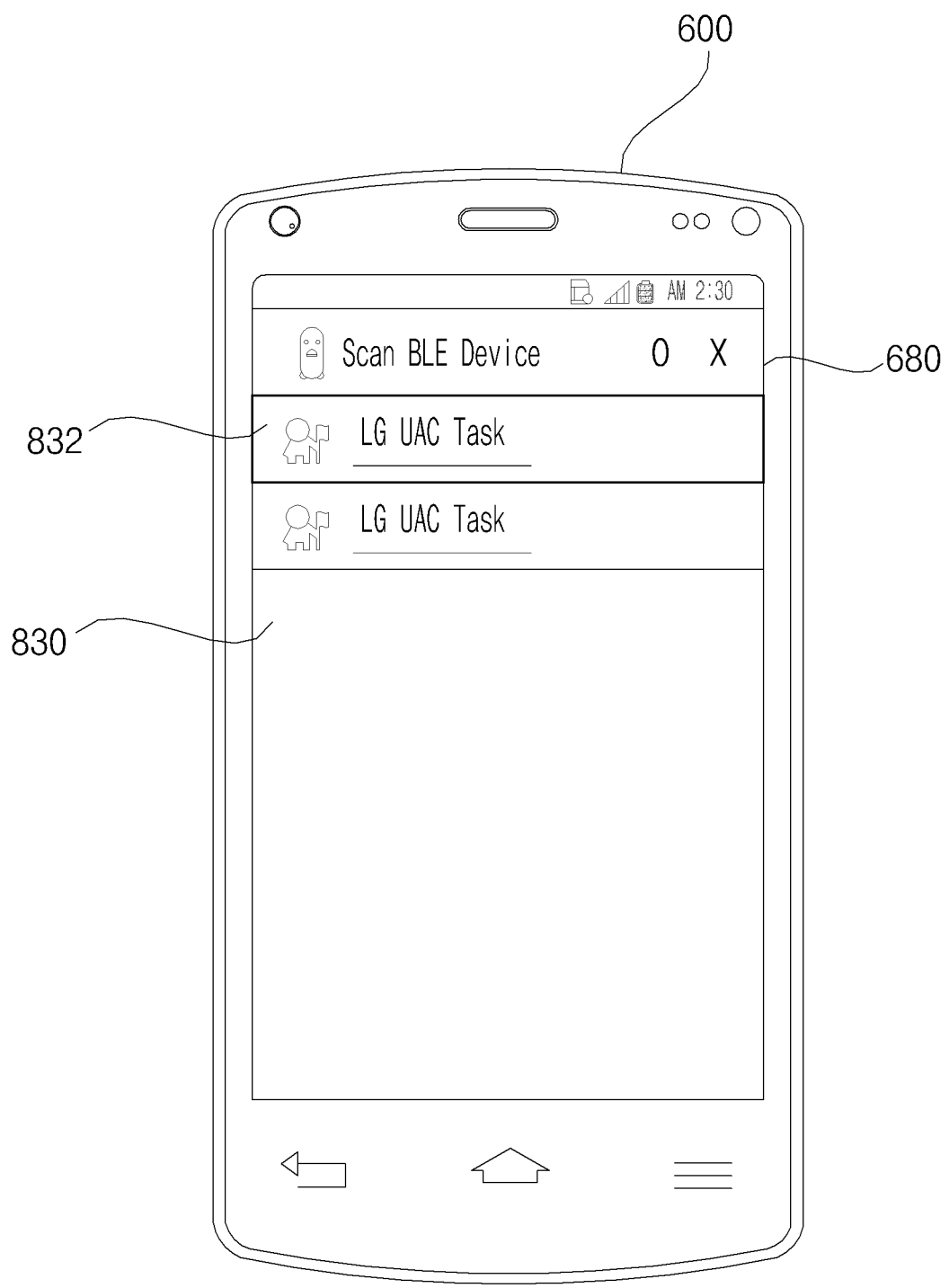

When the TV Select item 824 is selected, the controller 670 of the mobile terminal 600 may search for a TV around the mobile terminal 600. When the search is terminated, the controller 670 may perform a control operation to display a TV list screen window 830 including at least one TV item, as shown in FIG. 8D. In the illustrated example, two TV items are listed.

Figure 8E:
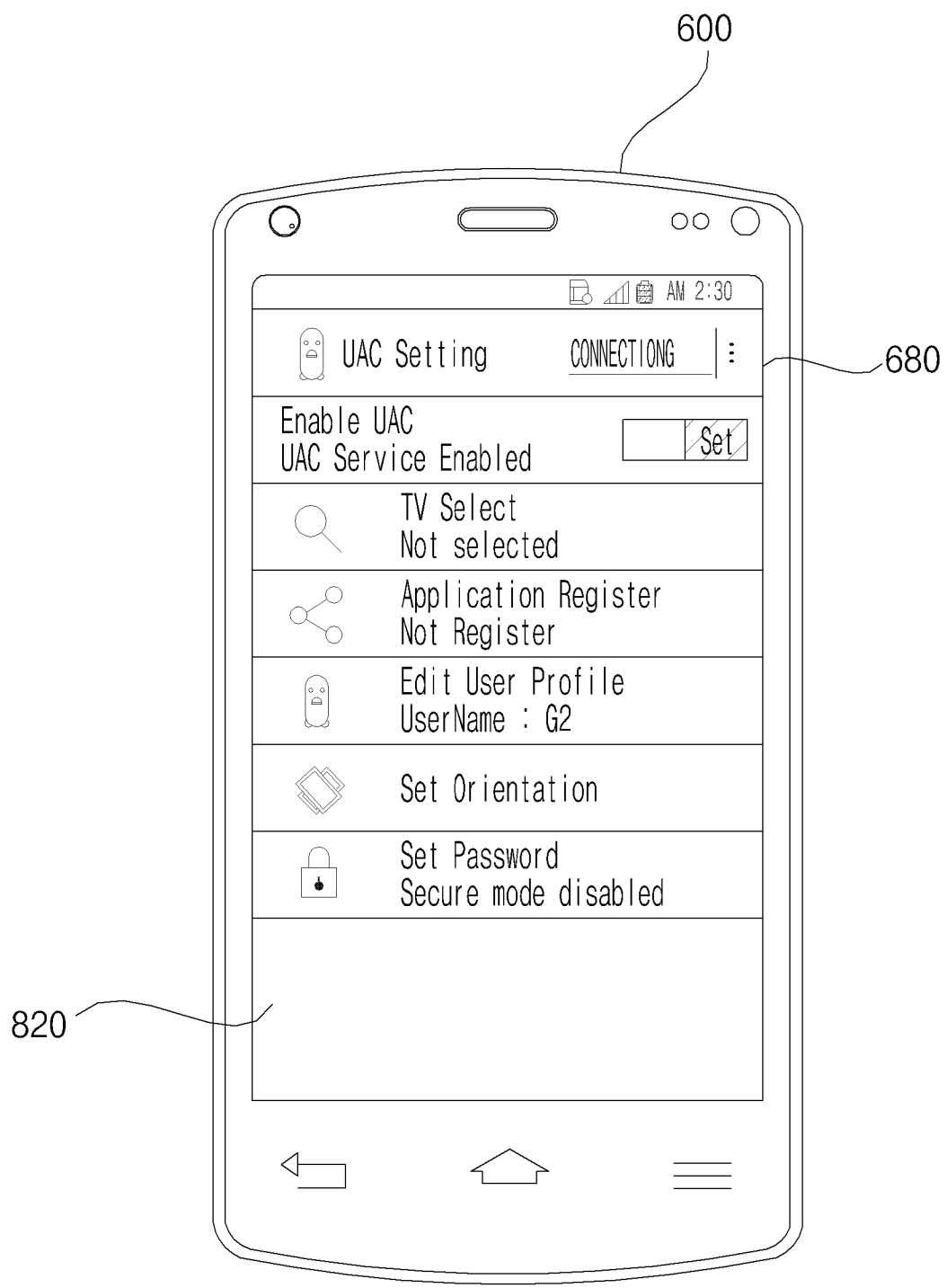

When a first TV item 832 of the two TV items is selected, the controller 670 of the mobile terminal 600 may complete setting for mirroring with the selected first TV item 832. After the setting is completed, the controller 670 of the mobile terminal 600 may perform a control operation to display the mirroring setting application screen window 820 again, as shown in FIG. 8E.

Figure 8F:
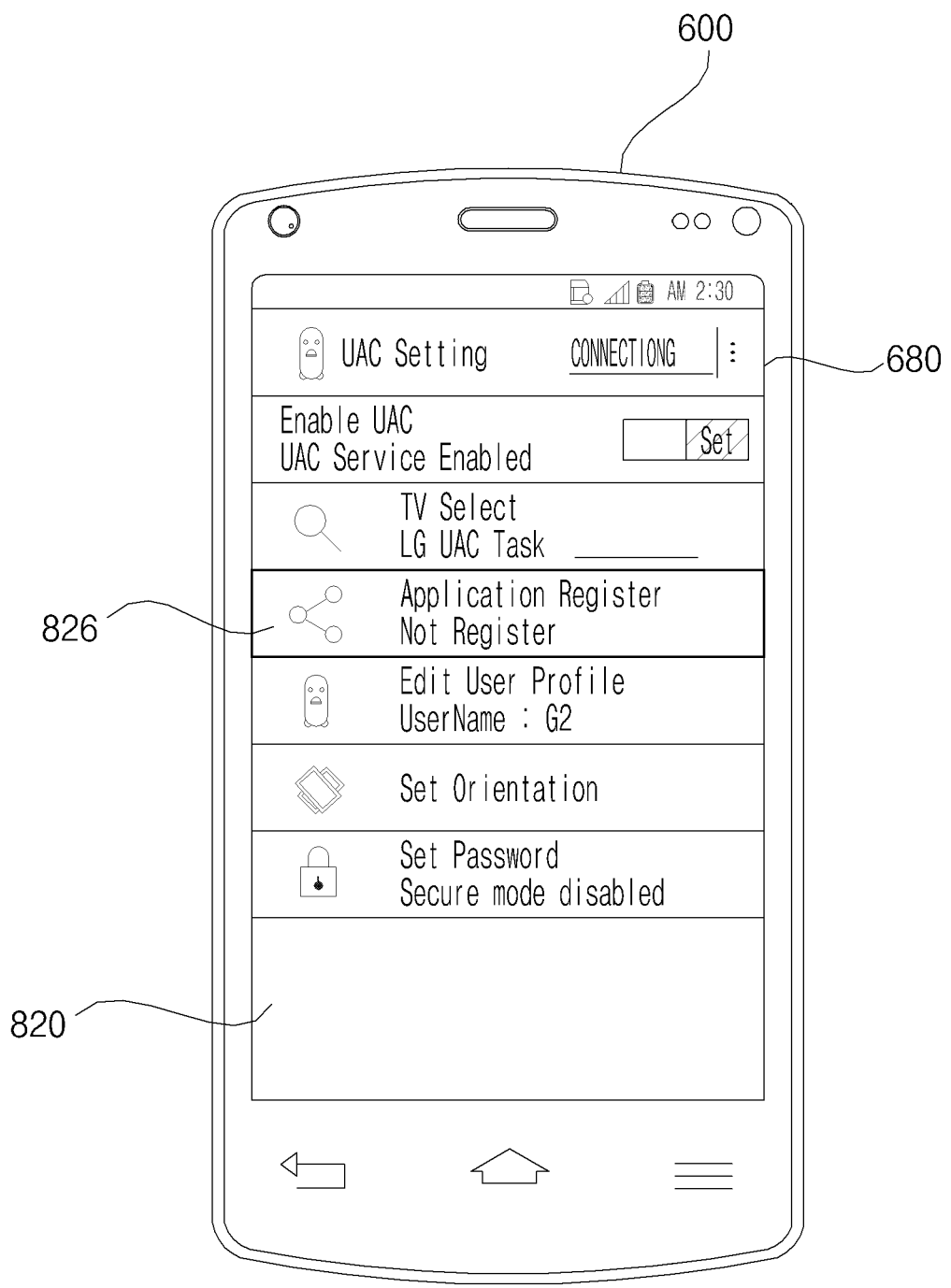
Figure 8G:
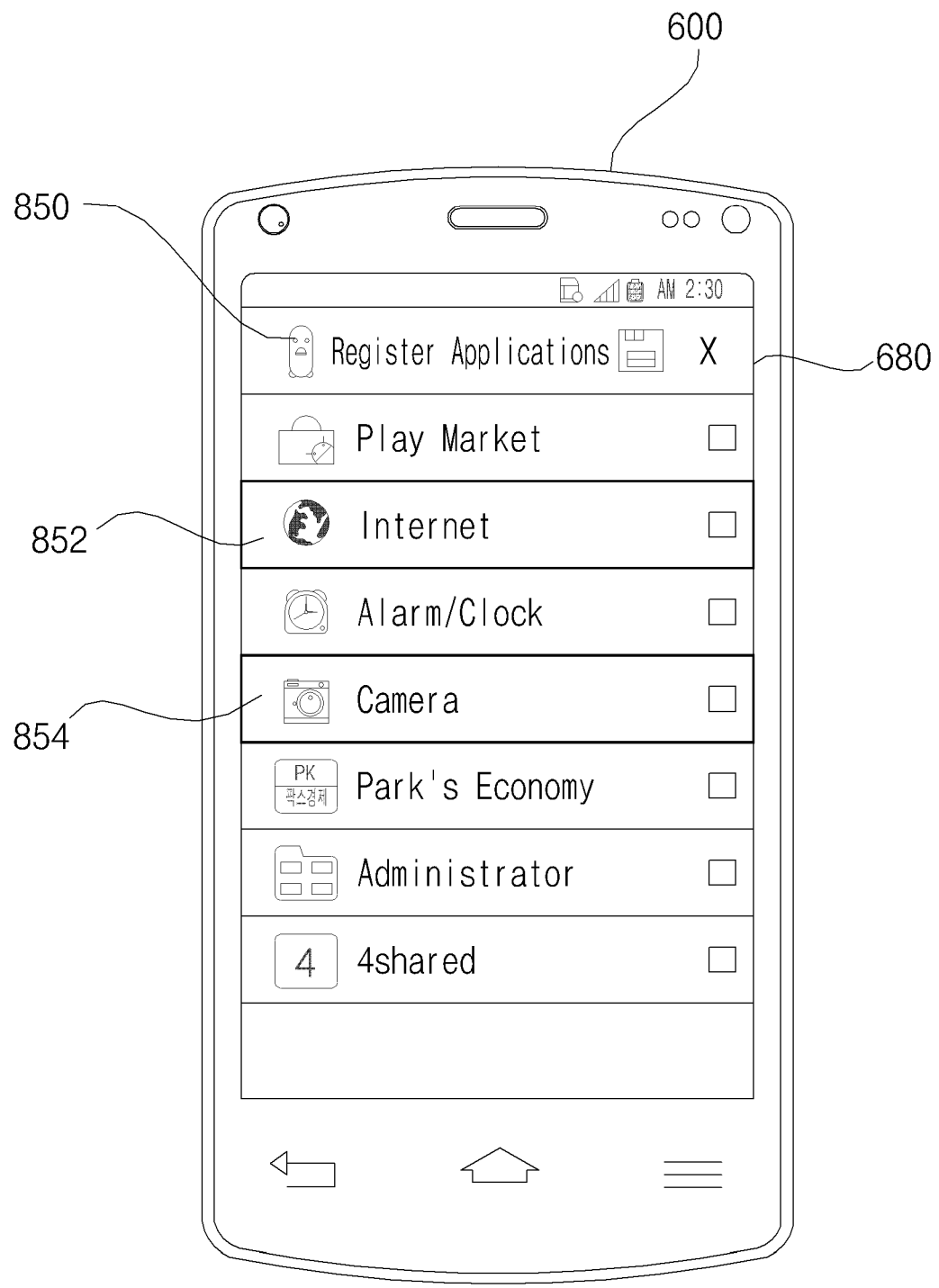

Next, when the Application Register item 826 is selected in the mirroring setting application screen window 820 displayed as shown in FIG. 8F, the controller 670 of the mobile terminal 600 may perform a control operation to display an application list 850 including application items installed in the mobile terminal 600, as shown in FIG. 8G.

Figure 8H:
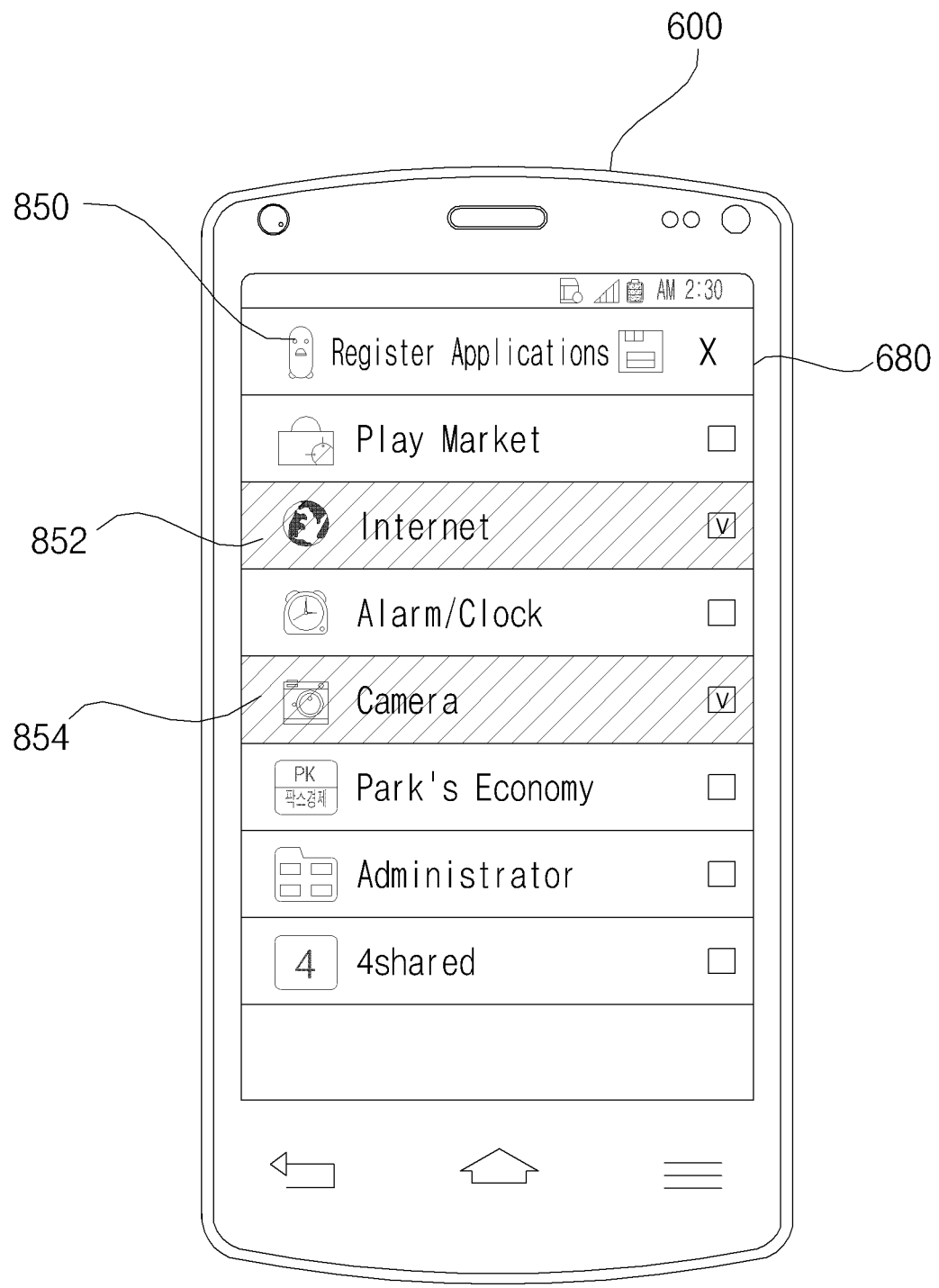

Next, when a plurality of application items in the application list 850, for example, an Internet application item 852 and a camera application item 854, is selected, the controller 670 of the mobile terminal 600 may perform a control operation to highlight the Internet application item 852 and the camera application item 854, as shown in FIG. 8H.

Figure 8I:
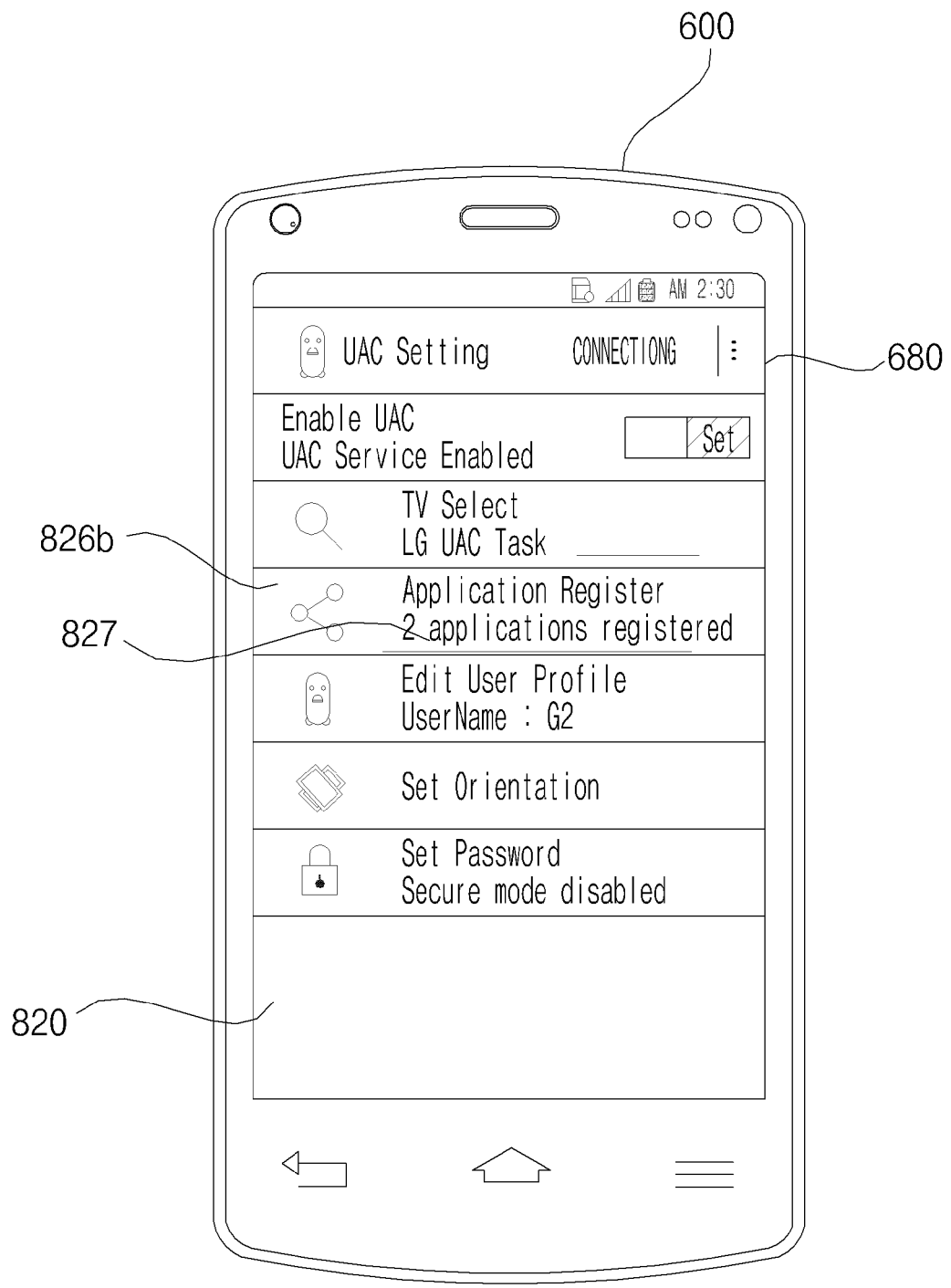

Then, when a Save item is selected, for example, the controller 670 of the mobile terminal 600 may perform a control operation to display the mirroring setting application screen window 820 again as shown in FIG. 8I. Herein, the Application Register item 826b may include information 827 related to the two selected applications.

Figure 8J:
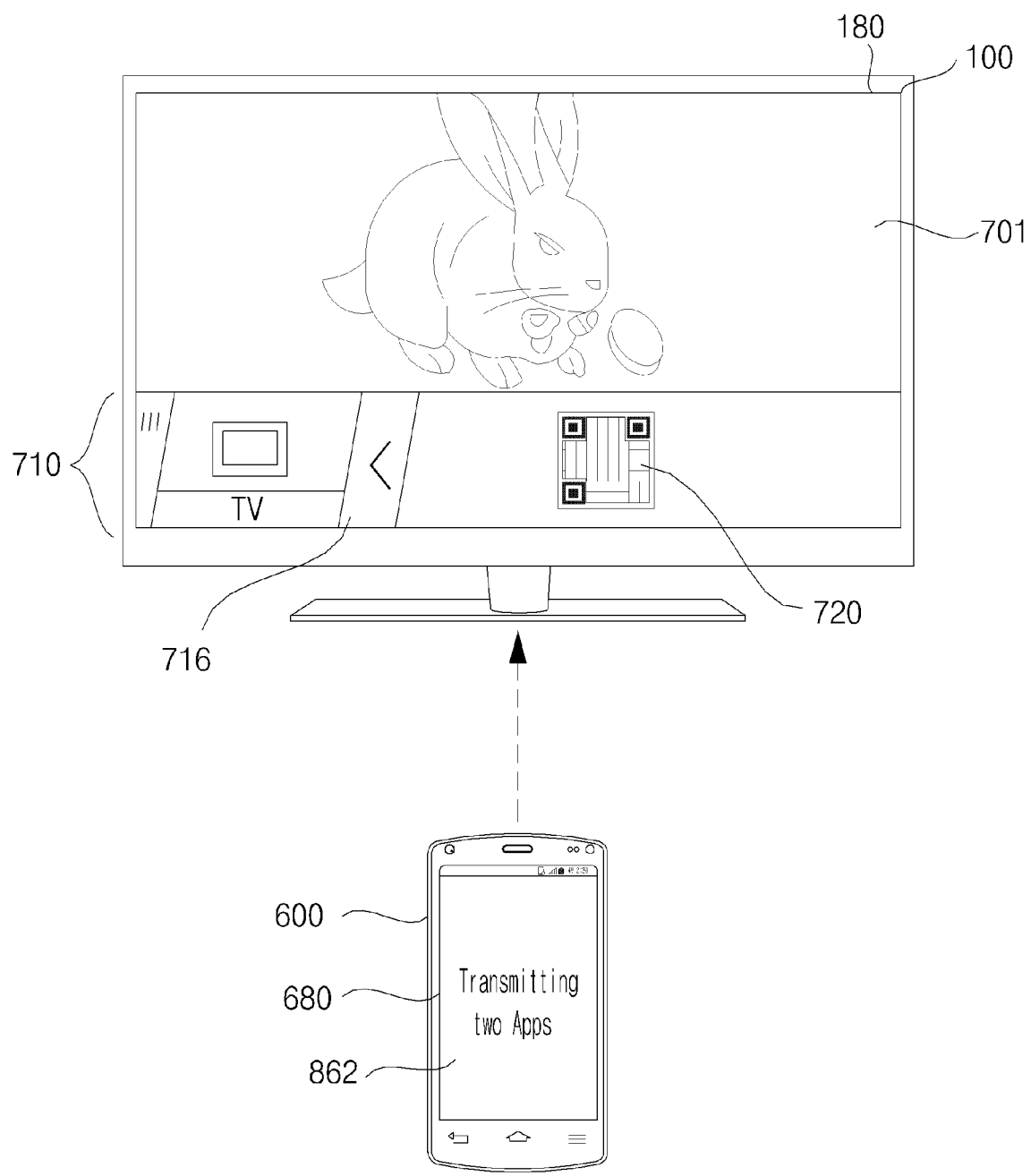

Next, the controller 670 of the mobile terminal 600 may perform a control operation to transmit information related to the two selected application items to the image display device 100 as shown in FIG. 8J. In this case, the controller 670 of the mobile terminal 600 may perform a control operation to display the transmitted information about the applications on the display 680.

The image display device 100 may receive, through the interface 130 or 135, the information related to the two applications for which mirroring is to be performed.

Figure 8K:
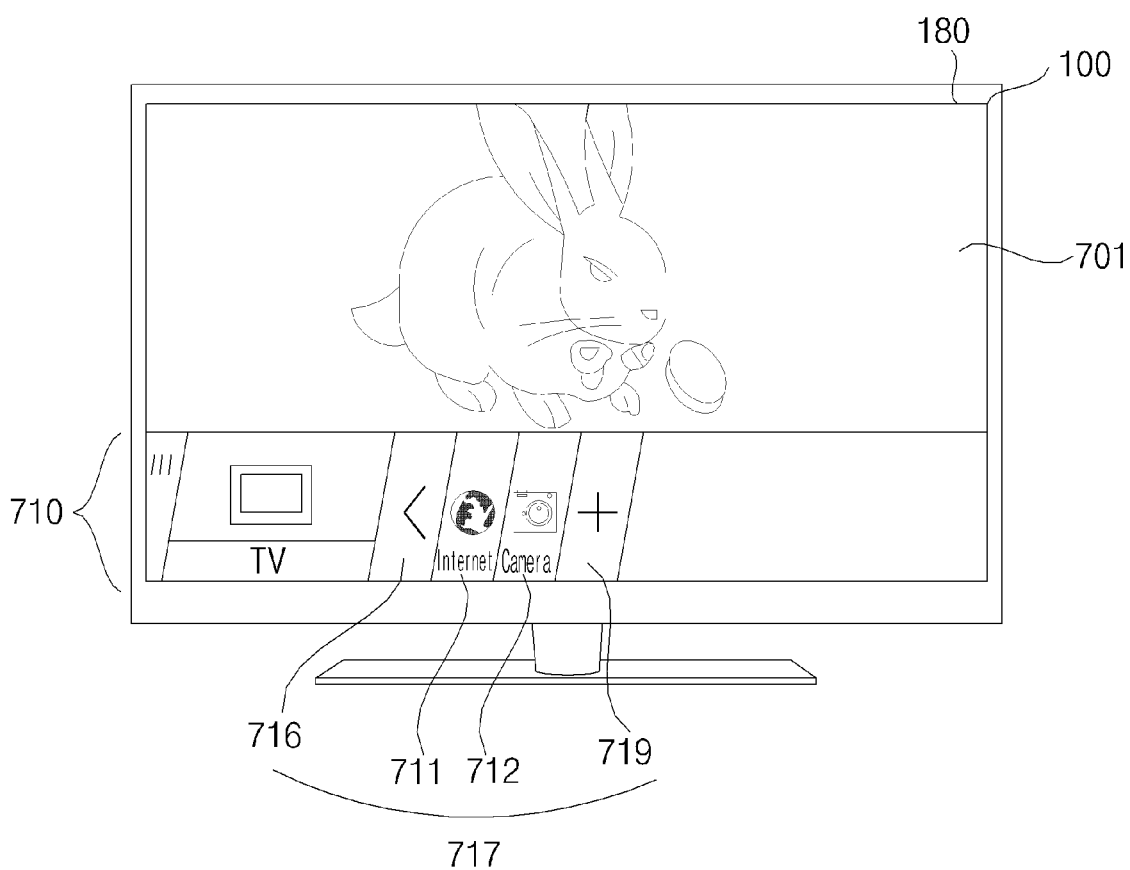

The controller 170 of the image display device 100 may perform a control operation to install the received mirroring application items on the image display device 100, particularly, may perform a control operation to display the mirroring application items in the mirroring-related menu 717, as shown in FIG. 8K.

The controller 170 of the image display device 100 may select a first mirroring application item of the mirroring application items displayed in the mirroring-related menu 717.

For example, the controller 170 may select the first mirroring application item using an arrow key and an OK key of the remote controller 200.

As another example, a pointer may be displayed based on a pointing signal included in an RF signal of the remote controller 200, and the first mirroring application item may be selected by the pointer.

When the first mirroring application item is selected from among the mirroring application items displayed in the mirroring-related menu 717, the controller 170 of the image display device 100 may perform a control operation to transmit, to the mobile terminal 600, pairing information or information for request for execution of the first mirroring application, to receive a first mirroring application execution image from the mobile terminal 600 through the network interface 135 or 135, and to display the received first mirroring application execution image on the display 180.

FIGS. 9A to 10J illustrate a method for executing a mirroring application different from the mirroring applications of FIGS. 8A to 8K.

Figure 9A:
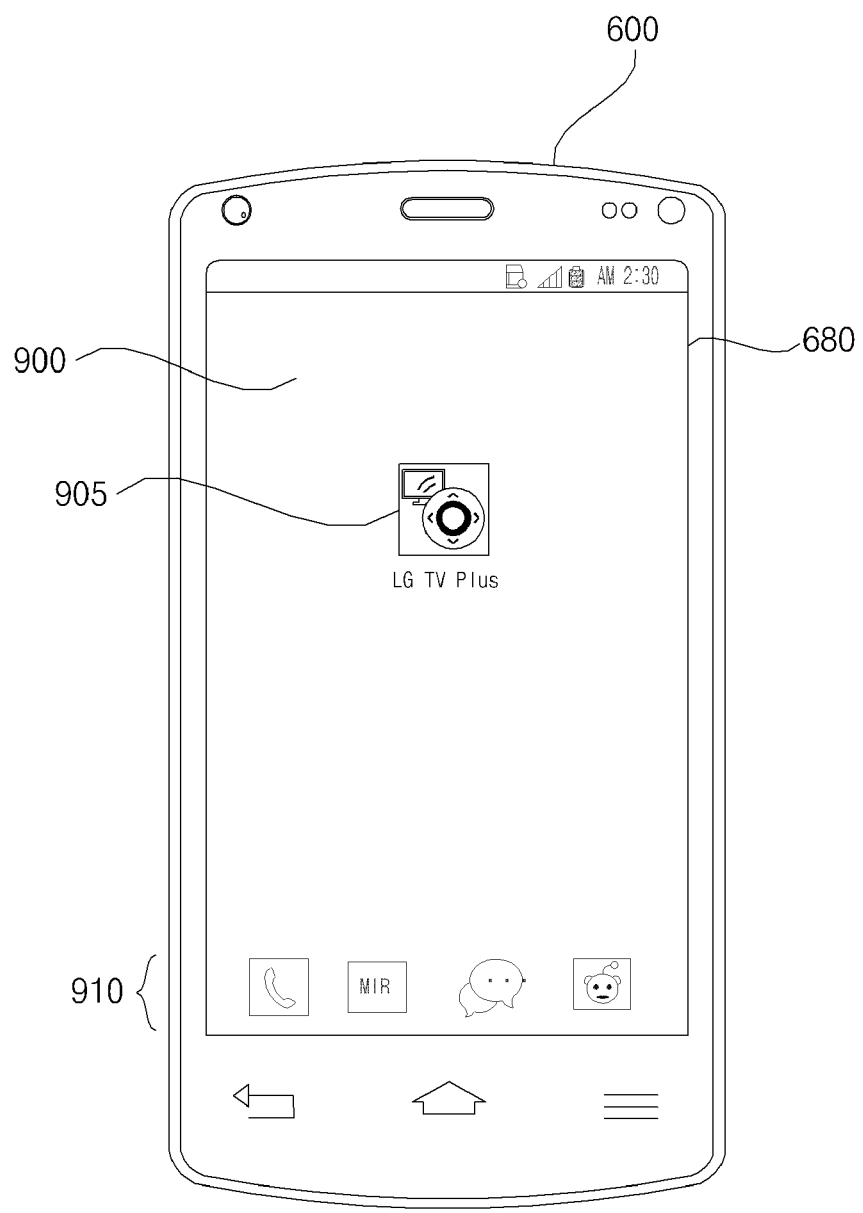

FIG. 9A illustrates the idle-mode screen 810 or home screen 810 of the mobile terminal 600. The idle-mode screen 810 or the home screen 810 may be displayed on the display 680. A plurality of application items may be displayed at the lower end of the screen.

In the figure, a TV-related application item 905 is displayed in the home screen 810 of the mobile terminal 600. The TV-related application may be referred to as an image display device-related application.

The TV-related application item 905 may be installed as illustrated in FIGS. 7A to 7H. The TV-related application may conceptually include a TV remote control application and a mirroring application.

Figure 9B:
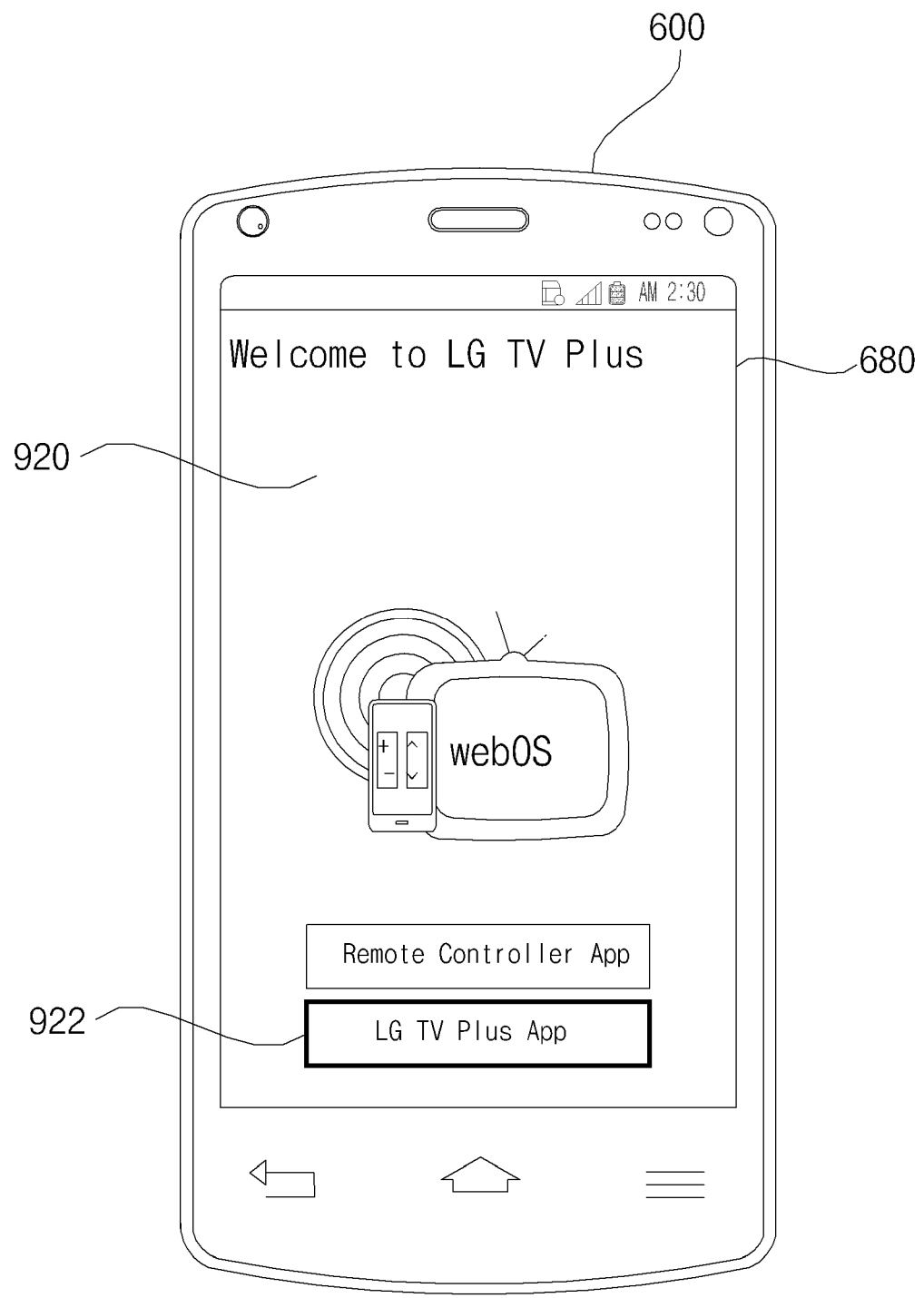

When the TV-related application item 905 is executed for the first time, the controller 670 of the mobile terminal 600 may perform a control operation to display the TV-related application item 905 as shown in FIG. 9B.

The TV-related application item may include a remote control item and a mirroring item 922.

Figure 9C:
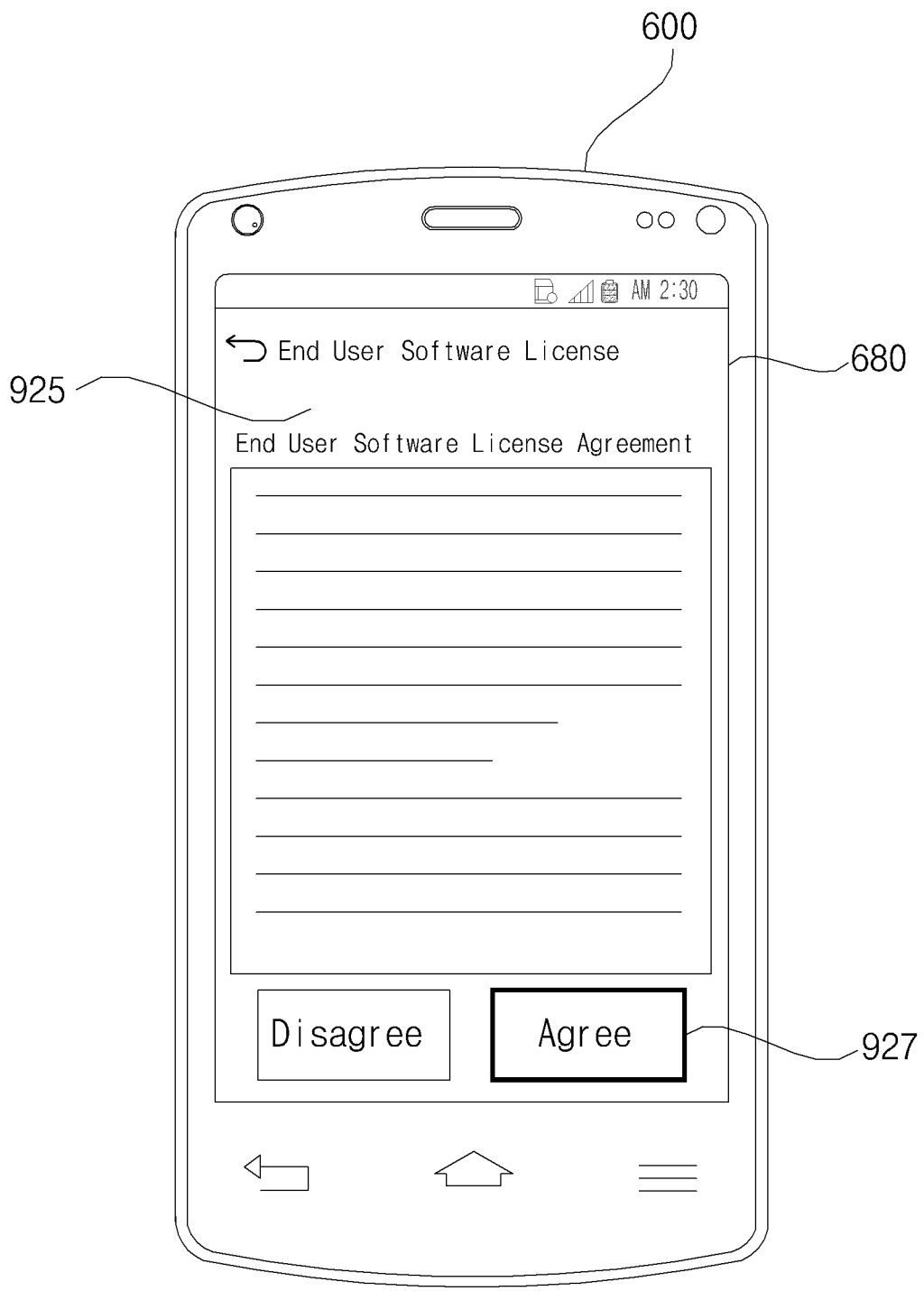

When the mirroring item 922 is selected, the controller 670 of the mobile terminal 600 may perform a control operation to display a screen window 925 for installation of a mirroring application as shown in FIG. 9C.

When the "Agree" item 927 in the screen window 925 for installation of the mirroring application is selected, the controller 670 of the mobile terminal 600 may connect to the server 500 to request transmission of the mirroring application, download the mirroring application from the server 500 and install the same.

Figure 9D:
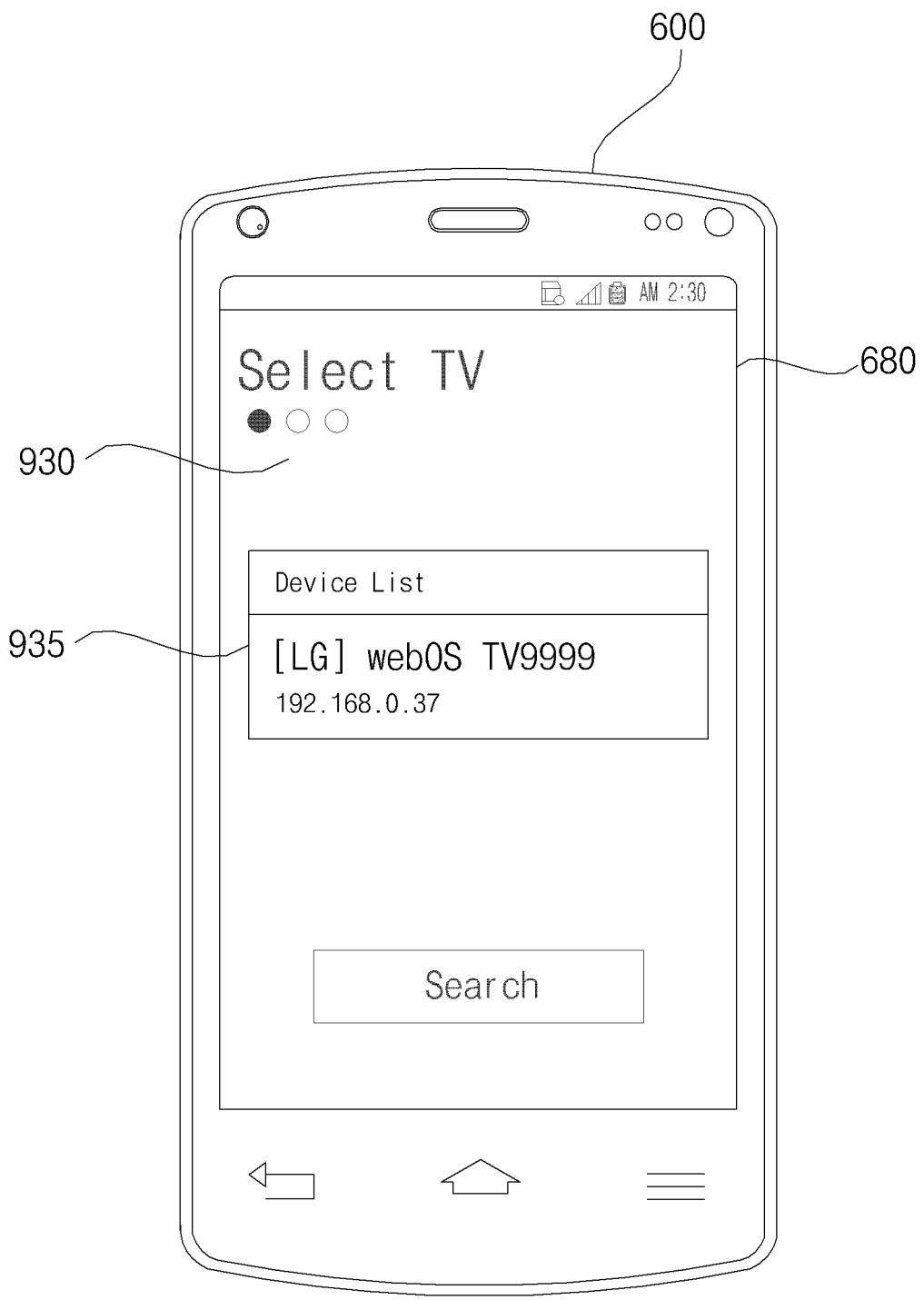

If an execution input is provided automatically or separately after installation of the mirroring application is completed, the controller 670 of the mobile terminal 600 may perform a control operation to display a mirroring application setting screen window 930 as shown in FIG. 9D.

In particular, the mirroring application setting screen window 930 may include a list 935 including an image display device item for an image display device which connected to the same AP device or is located around the mobile terminal 600.

While it is illustrated in the figure that only one image display device item is displayed, it is also possible to display image display device items for a plurality of image display devices located around the mobile terminal.

When an image display device item is selected in the list 935, the controller 670 of the mobile terminal 600 may perform a control operation to transmit a relevant signal for the selected image display device.

For example, the controller 670 of the mobile terminal 600 may perform a control operation to transmit a signal for display of code information related to the mirroring application.

Figure 9E:
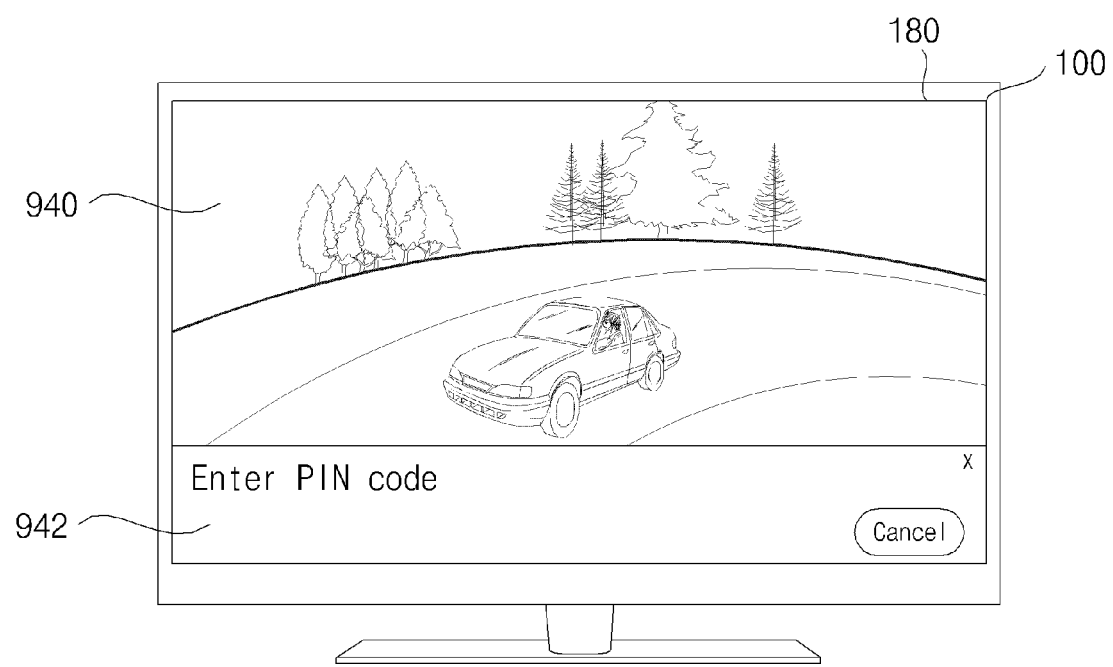

The controller 170 of the image display device 100 may receive, through the network interface 135, a signal for display of the code information related to the mirroring application, and perform a control operation to display the code information 942 on the display 180 in response to the received signal as shown in FIG. 9E.

Here, the displayed code information may be a random code generated by the controller 170 of the image display device 100.

In this case, the controller 170 of the image display device 100 may perform a control operation to display the code information 942 in addition to the displayed image 940, as shown in FIG. 9E.

Figure 9F:
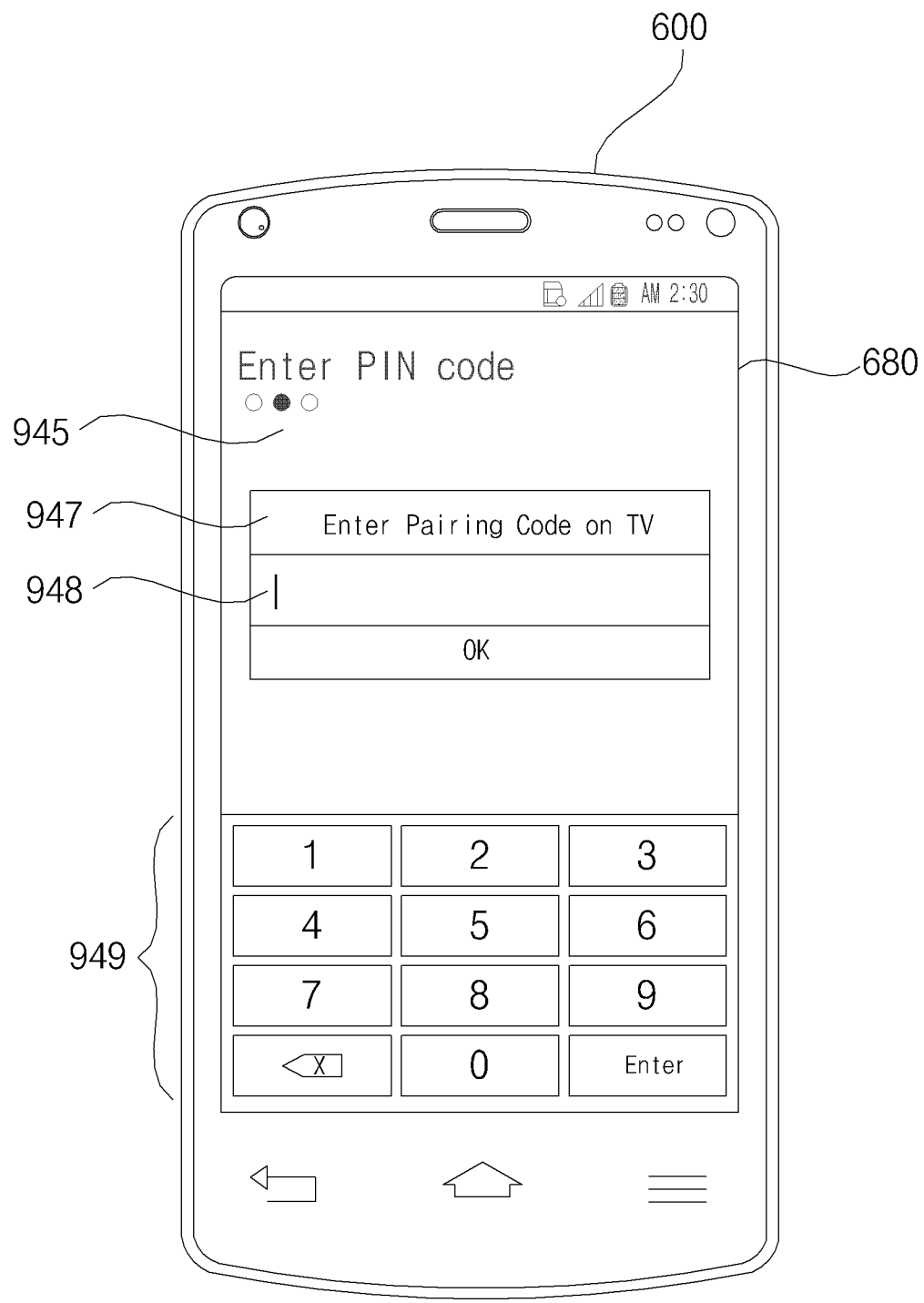

When an image display device item in the list 935 is selected, the controller 670 of the mobile terminal 600 may perform a control operation to display, on the display 680 of the mobile terminal 600, an input window 948 for the code information displayed on the image display device and a keyboard 949, as shown in FIG. 9F.

If a code corresponding to the code information displayed on the image display device is input through the keyboard 949, the controller 670 of the mobile terminal 600 may perform a control operation to transmit the code information to the image display device 100. Then, the controller 670 of the mobile terminal 600 may receive the authentication complete information from the image display device 100.

Figure 9G:
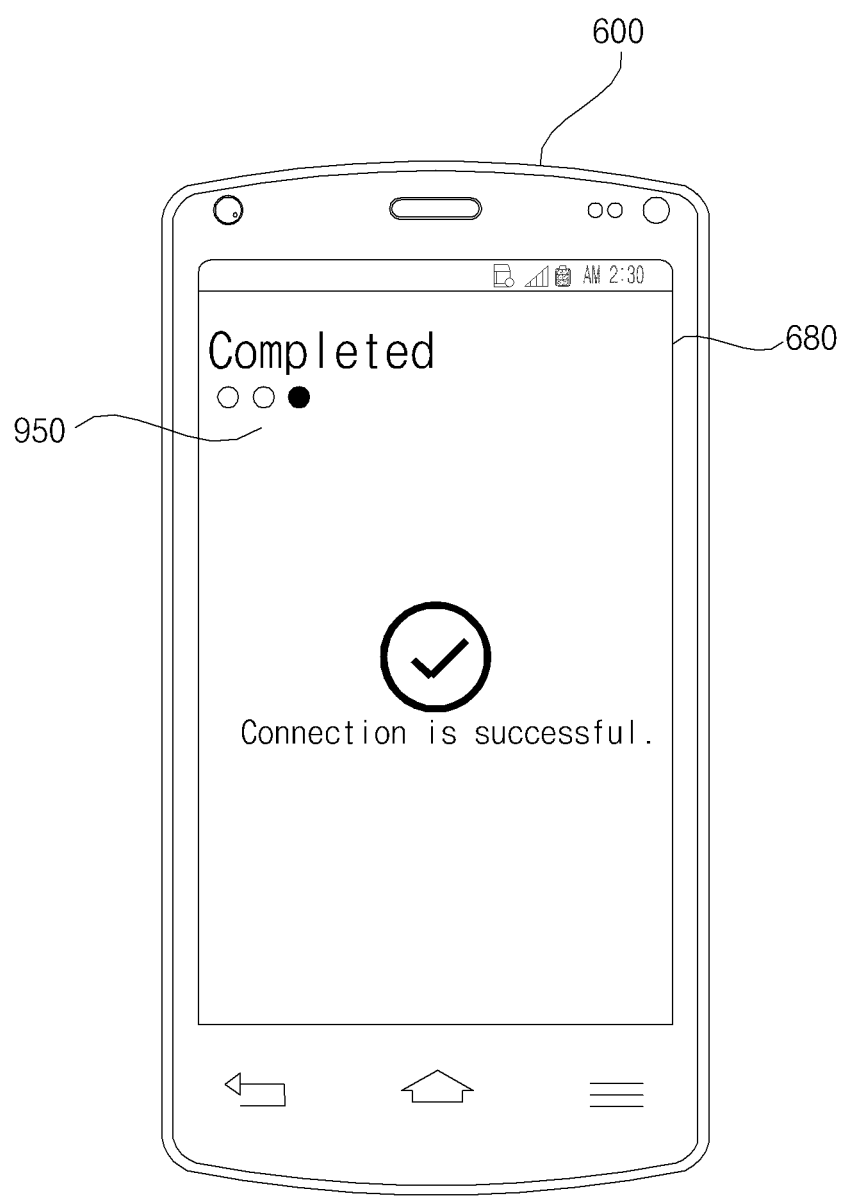

After authentication is completed, the controller 670 of the mobile terminal 600 may perform a control operation to display an authentication complete screen window 950 as shown in FIG. 9G.

Through the steps of FIGS. 9A to 9G, setting for mirroring between the mobile terminal 600 and the image display device 100 may be completed.

When setting for mirroring between the mobile terminal 600 and the image display device 100 is completed in the mobile terminal 600 through the steps of FIGS. 9A to 9G, information related to a server connected with the mobile terminal 600 may be transmitted to the image display device 100, and thus a mirroring application may be received by and installed on the image display device 100.

Alternatively, the steps of FIGS. 9A to 9G may be performed in the mobile terminal 600 with the mirroring application pre-installed on the image display device 100.

Once setting for mirroring between the mobile terminal 600 and the image display device 100 is completed through the steps of FIGS. 9A to 9G, the mobile terminal 600 and the image display device 100 will remain connected to each other.

Figure 9H:
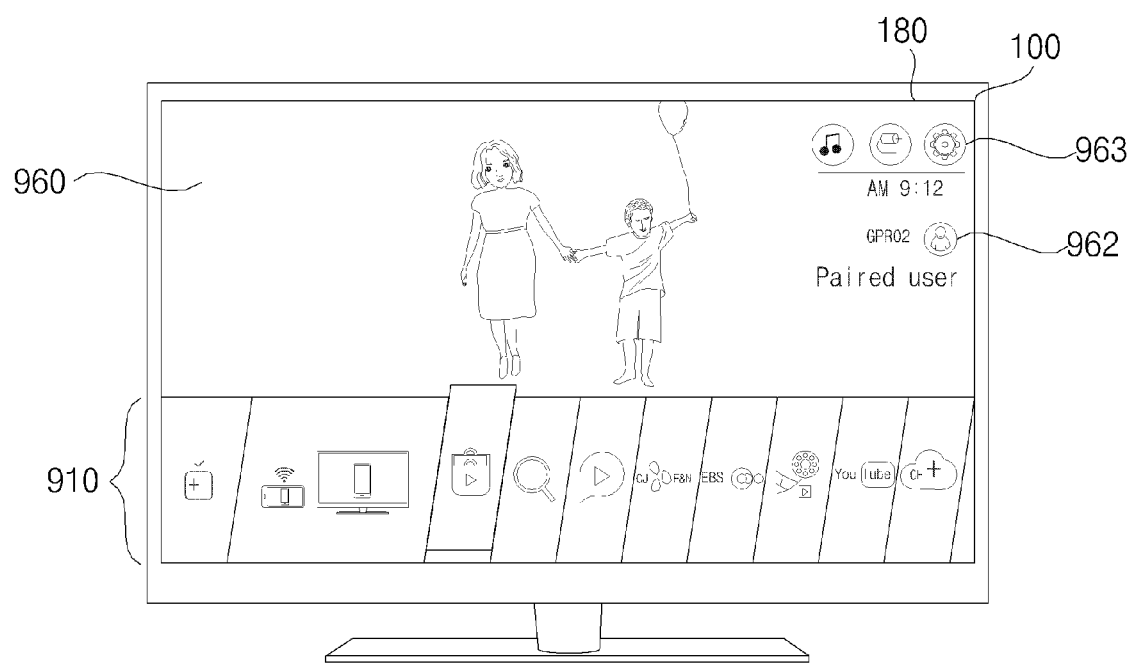

When the mobile terminal 600 and the image display device 100 are wirelessly connected to each other, the controller 170 of the image display device 100 may perform a control operation to display an object 962 indicating the paired mobile terminal on the display 962 as shown in FIG. 9H.

In particular, the controller 170 of the image display device 100 may perform a control operation to display the object 962 indicating the paired mobile terminal on the displayed image 960. Thereby, while viewing the image 960 of the image display device 100, the user of the mobile terminal or another user may recognize that the mobile terminal is paired with and connected to the image display device.

The object 962 indicating the paired mobile terminal may include name information and image information. The image information may be edited through user selection of the paired mobile terminal. The name information may also be edited through user selection of the paired mobile terminal.

FIG. 9H illustrates display of an application list 910 and a setting object 963 in addition to the image 960 and the object 962 indicating the paired mobile terminal.

Figure 9I:
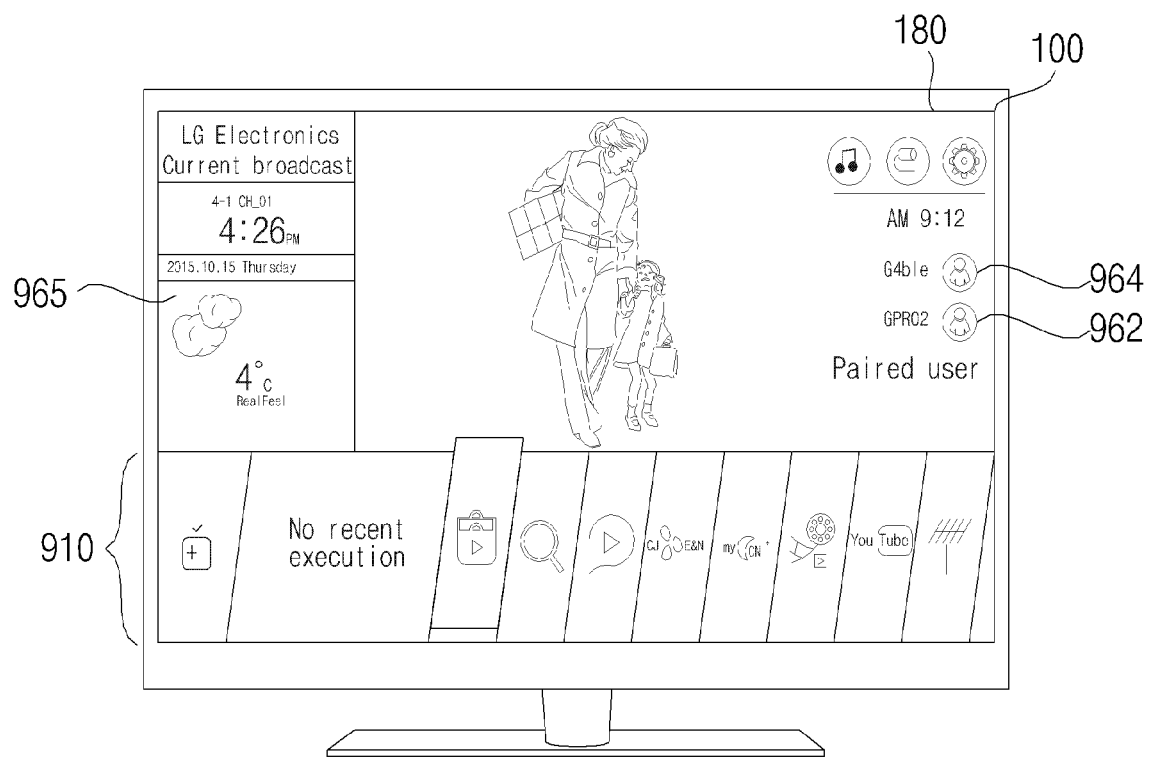

In the case where a plurality of mobile terminals is paired and connected with the image display device, the controller 170 of the image display device 100 may perform a control operation to display objects 962 and 964 indicating the plurality of mobile terminals as shown in FIG. 9I.

FIG. 9I illustrates an object 962 indicating the paired mobile terminal and a second object 964 indicating a paired second mobile terminal on an image 965.

If the number of displayed objects is greater than an allowed number of objects, the controller 170 of the display device 100 may perform a control operation to delete objects from the oldest object and display objects corresponding to the most recently connected mobile terminals.

Figure 9J:
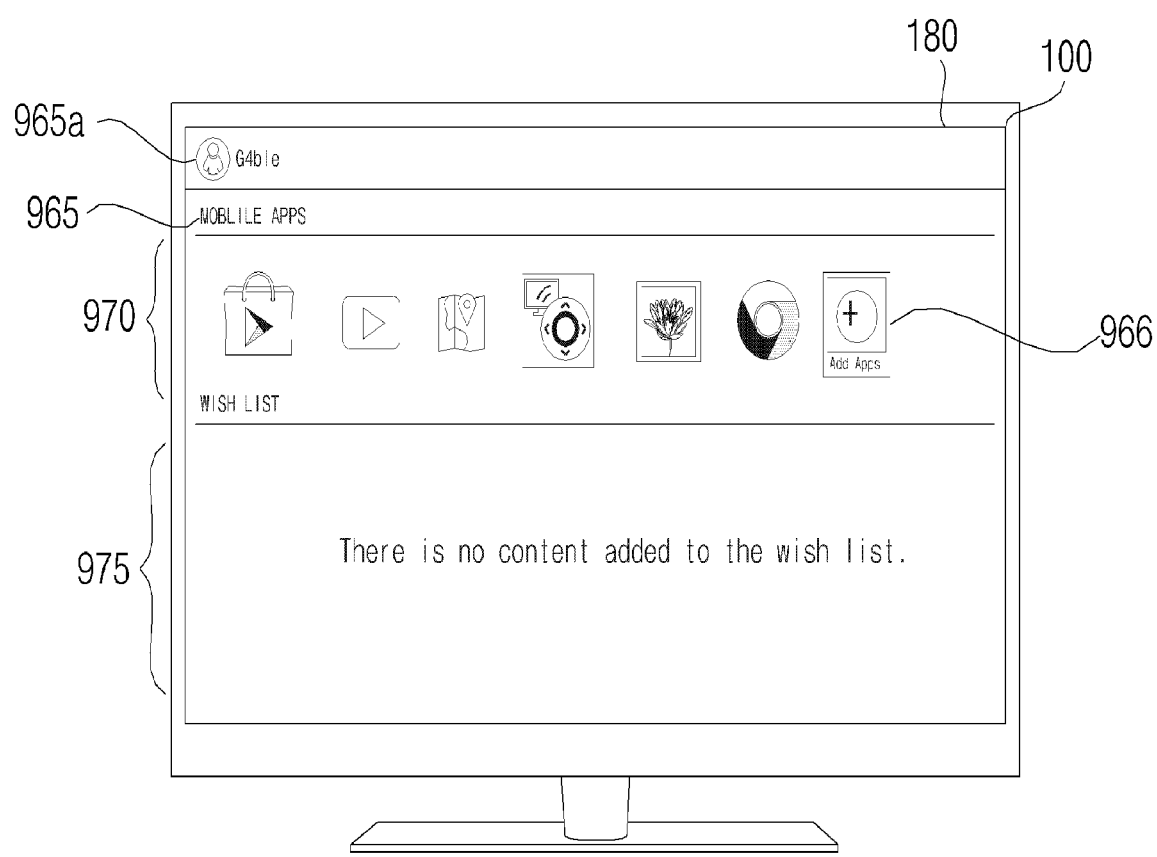

In FIG. 9H or 9I, when the object 962 indicating a paired mobile terminal is selected, the controller 170 of the display device 100 may perform a control operation to display an application list 970 and a wish list 975 related to the paired mobile terminal, as shown in FIG. 9J.

The application list 970 related to the paired mobile terminal may include an application item which can be subjected to mirroring between the mobile terminal 600 and the image display device 100 and an Add item 966.

In the figure, an App Store item, a moving image playback item, a map item, an image viewer item and an Internet item are provided as an example of application items which can be subjected to mirroring.

Figure 9K:
Figure 9L:
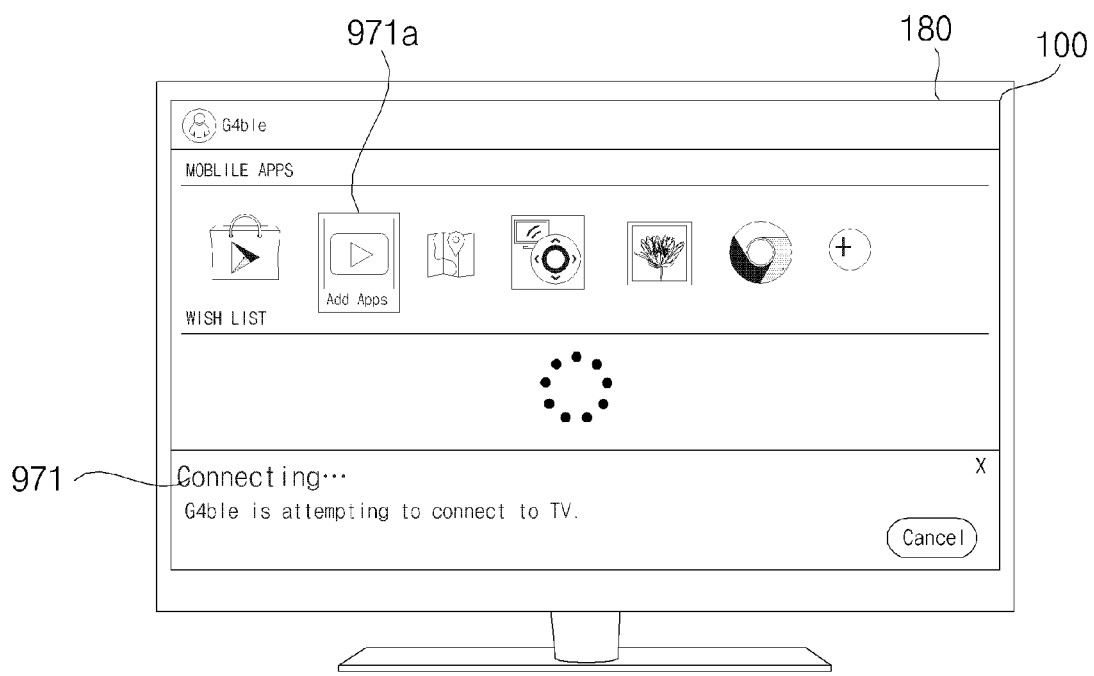

If the Add item 966 is selected in the application list 970 related to the paired mobile terminal as shown in FIG. 9K, the controller 170 of the image display device 100 may perform a control operation to display a list 977 of applications to be added as shown in FIG. 9L.

The list 977 of applications to be added may be a mirrored image identical to the image displayed on the mobile terminal 600.

That is, when the Add item 966 is selected in the application list 970 related to the paired mobile terminal as shown in FIG. 9K, the controller 170 of the image display device 100 may transmit an application list execution request to the mobile terminal 600. Then, the controller 170 of the image display device 100 may perform a control operation to receive and display a list of applications which are being executed on the mobile terminal 600.

When predetermined items 977a, 977b and 977c are selected, by, for example, the remote controller 200, in the list 977 of applications to be added which is displayed in FIG. 9L, the controller 170 of the image display device 100 may transmit information related to the selected items to the mobile terminal 600, receive applications related to the selected items from the mobile terminal 600 or the server 500, and install the same.

Figure 9M:
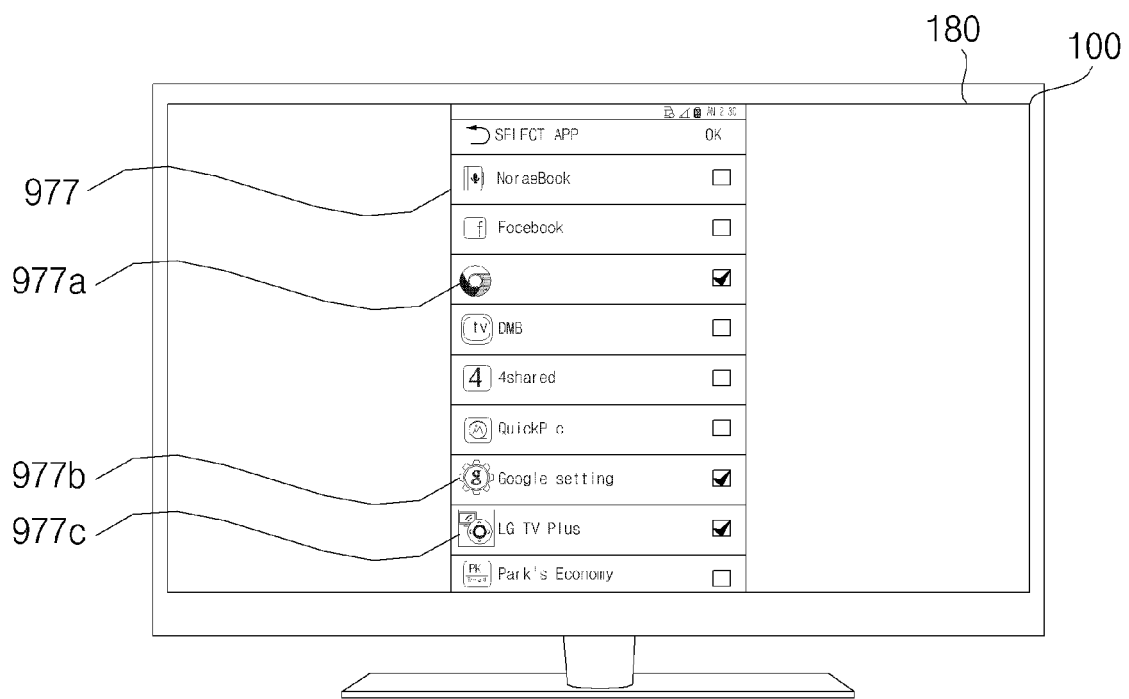

Thereby, the controller 170 of the image display device 100 may perform a control operation to display a new application list 970 including the added application items 978a, 978b and 978c, as shown in FIG. 9M.

Figure 9N:
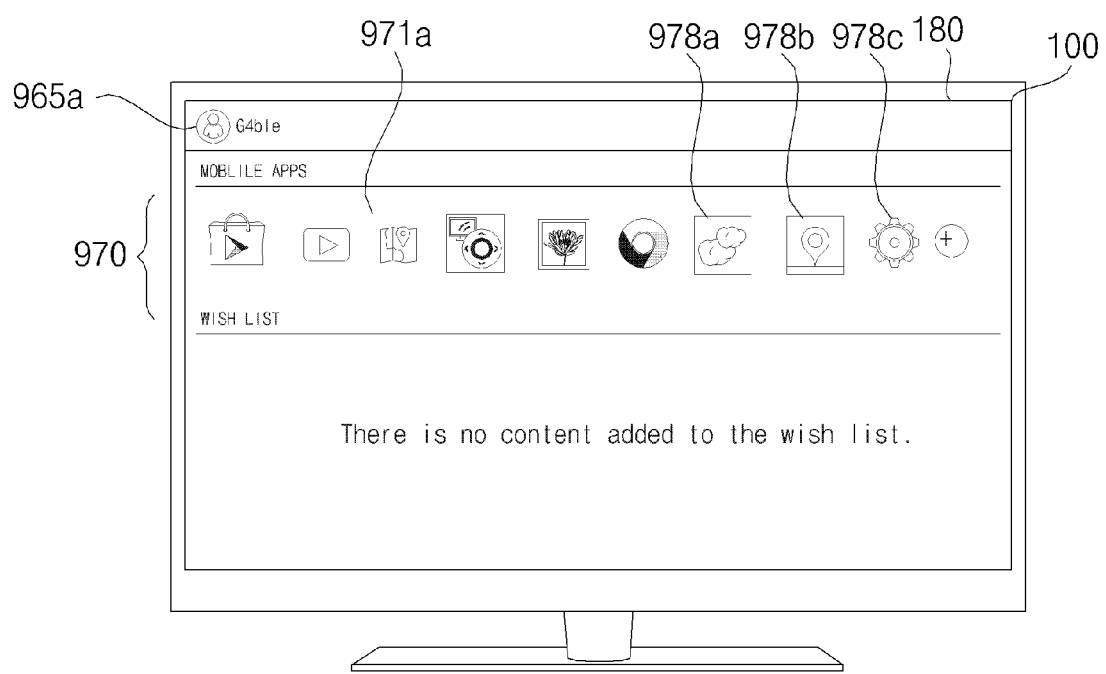

When a moving image playback item 971a is selected in the application list 970 as shown in FIG. 9N, the controller 170 of the image display device 100 may perform a control operation to display an object 971 indicating that connection to the mobile terminal is being executed, and attempt to connect to the mobile terminal 600.

That is, the controller 170 of the image display device 100 may transmit, to the mobile terminal 600, an application execution request related to the moving image playback item. Then, when the application related to the moving image playback item of the mobile terminal 600 is executed, the controller 170 of the image display device 100 may perform a control operation to implement mirroring.

Figure 9O:
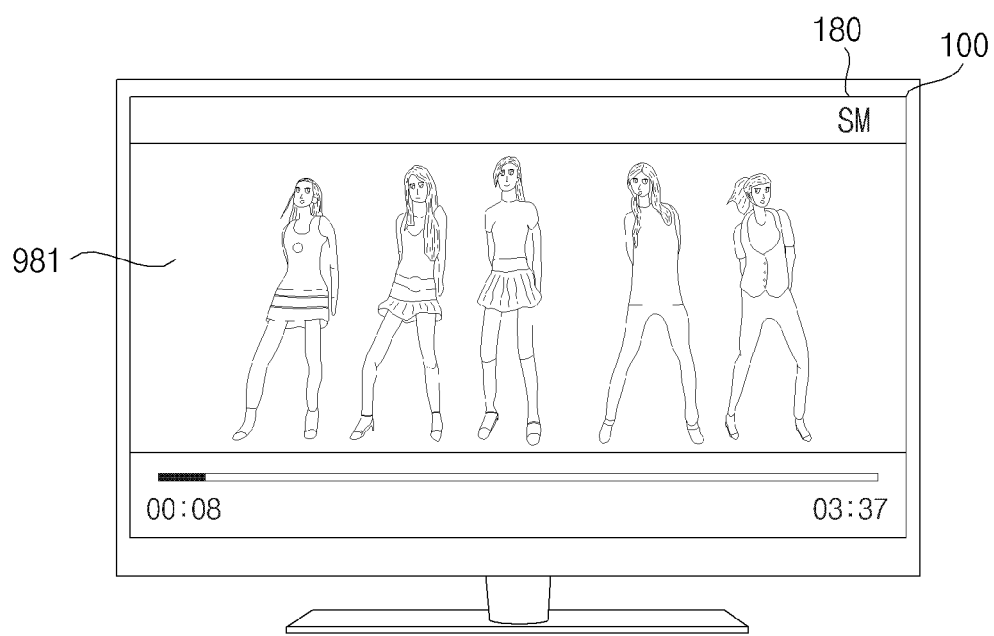

Then, when mirroring connection is completed, the controller 170 of the image display device 100 may perform a control operation to display, on the display 180, a screen window 981 of a moving image playback application which is being executed in the mobile terminal 600, as shown in FIG. 9O.

Figure 9P:
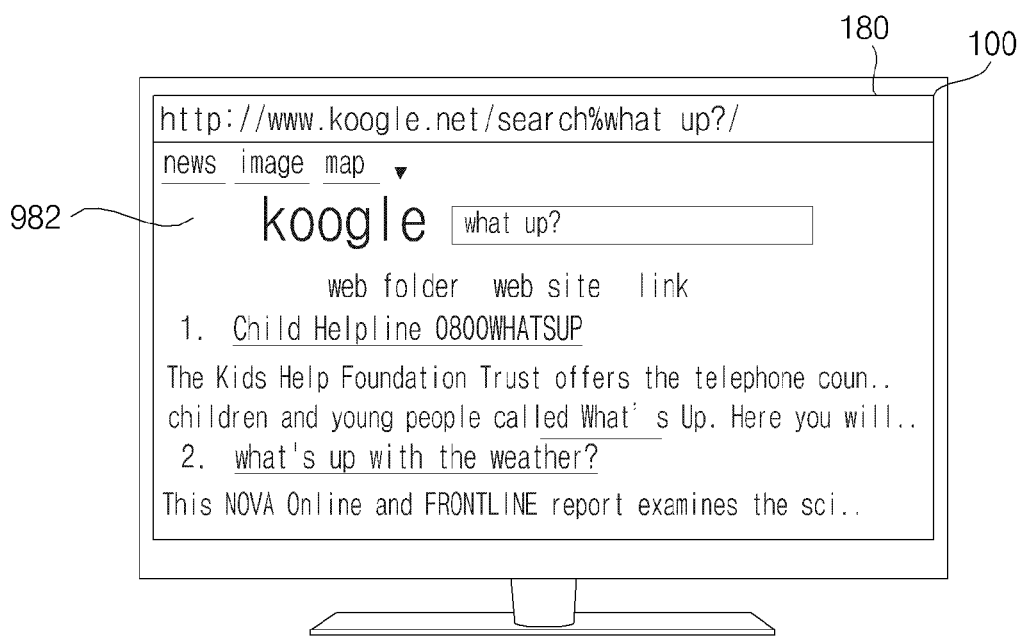

When the Internet item of FIG. 9N is selected, the controller 170 of the image display device 100 may perform a control operation to display, on the display 180, an Internet screen window 982 displayed on the mobile terminal 600, as shown in FIG. 9P.

Figure 9Q:
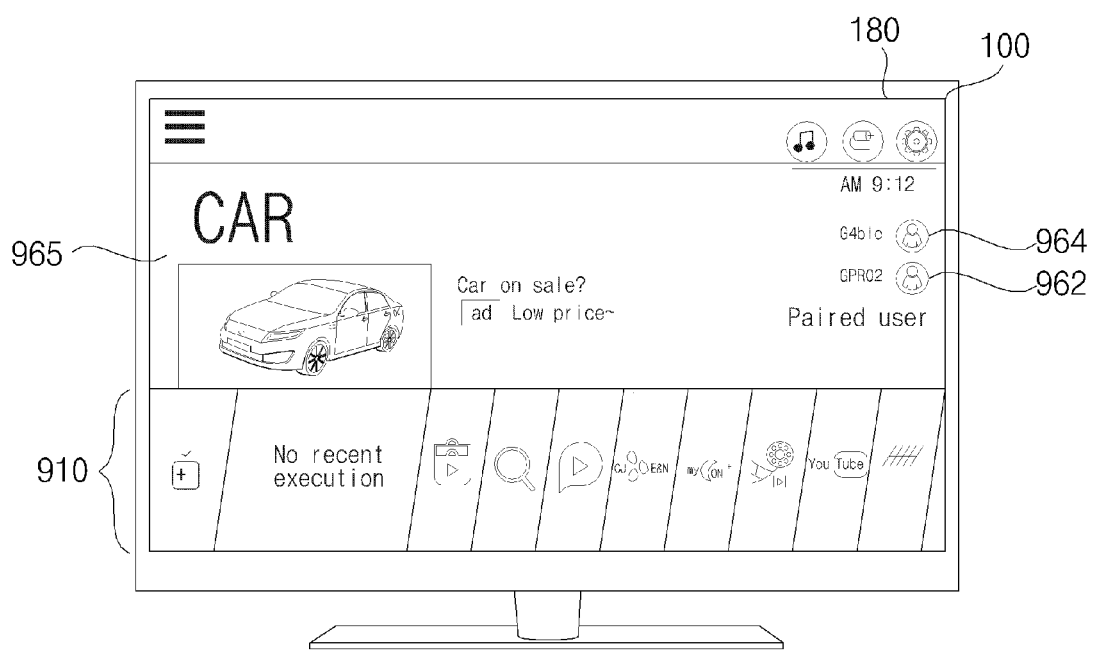
Figure 9R:

When the second object 964 indicating the paired second mobile terminal is selected with the object 962 and the second object 964 displayed as shown in FIG. 9Q, the controller 170 of the image display device 100 may perform a control operation to display an application list 990 related to the paired second mobile terminal as shown in FIG. 9R.

Although FIGS. 9Q and 9R illustrate change of users, addition of a user may also be implemented using a screen division technique.

Figure 9S:
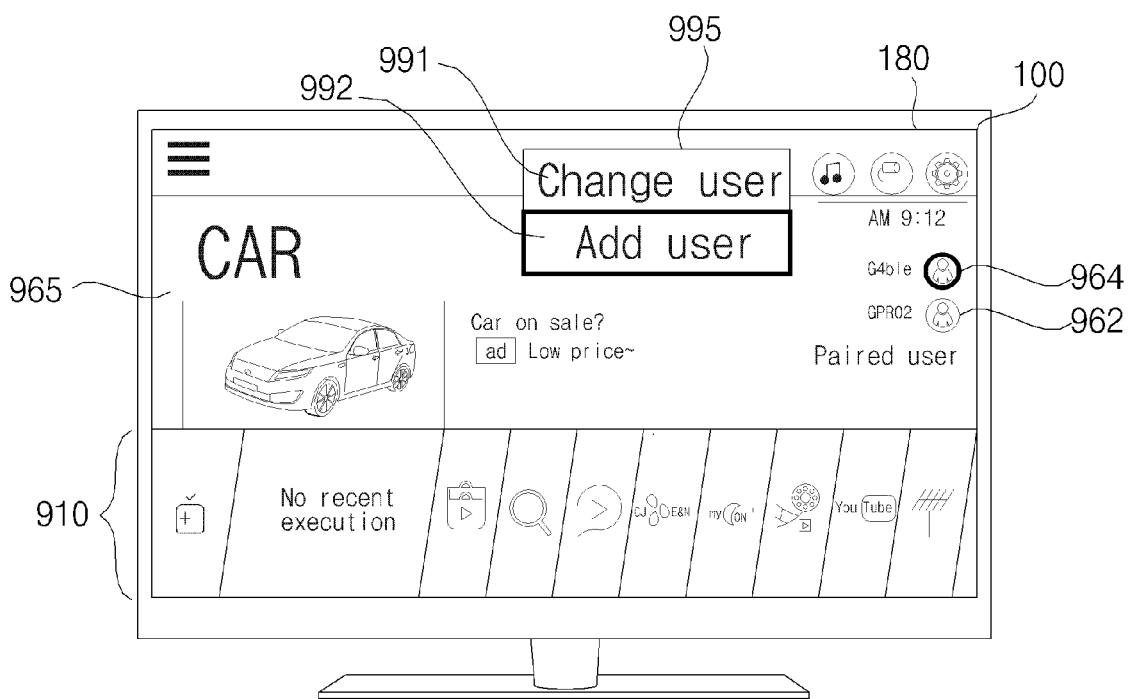

When the second object 964 indicating the paired second mobile terminal is selected by the back key after the controller 170 of the image display device 100 displays the application list 970 related to the paired mobile terminal according to selection of the object 962 indicating the paired mobile terminal through the steps of FIGS. 9I and 9J, the controller 170 of the image display device 100 may perform a control operation to display a Change User object 991 and an Add User object 992, as shown in FIG. 9S.

If the Change User object 991 is selected, the controller 170 of the image display device 100 may perform a control operation to display an application list 990 related to the paired second mobile terminal as shown in FIG. 9R.

Figure 9T:
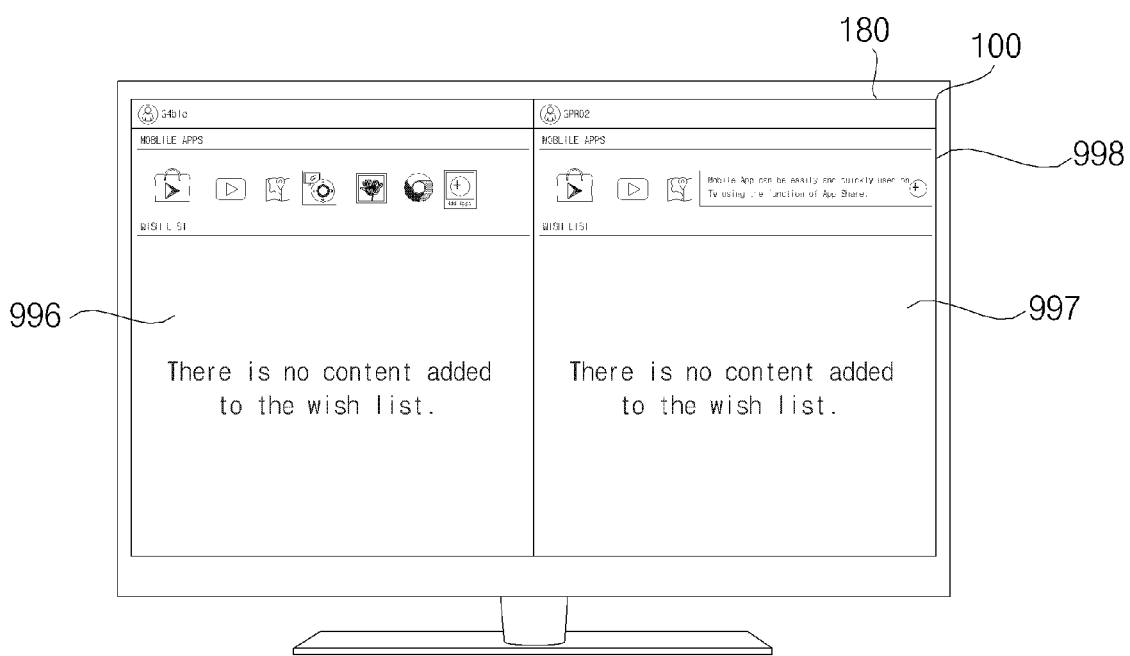

When the Add User object 992 is selected, the controller 170 of the image display device 100 may perform a control operation to display an application list 996 related to the paired mobile terminal and an application list 997 related to the paired second mobile terminal on the display 180, as shown in FIG. 9T.

That is, as shown in the figure, the screen may be divided to display the application list 996 related to the paired mobile terminal and the application list 997 related to the paired second mobile terminal together on the display 180. Thereby, mirroring may be implemented using a plurality of mobile terminals.

The name information and image information about the object indicating the paired mobile terminal may be edited through the mobile terminal 600. Details will be described below with reference to FIG. 10A.

Figure 10A:
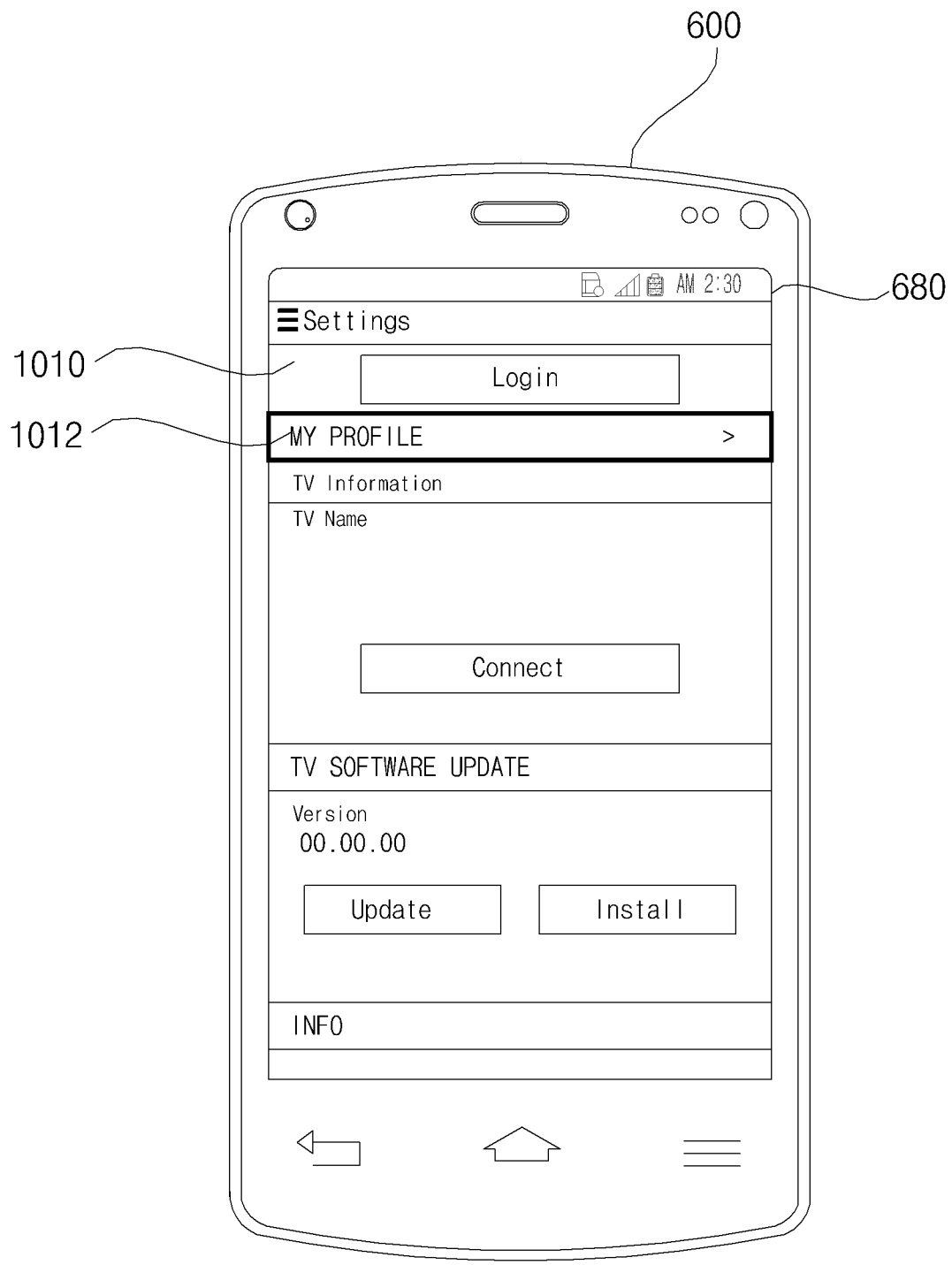

FIG. 10A illustrates a profile setup screen 1010 in executing the mirroring application.

Figure 10B:
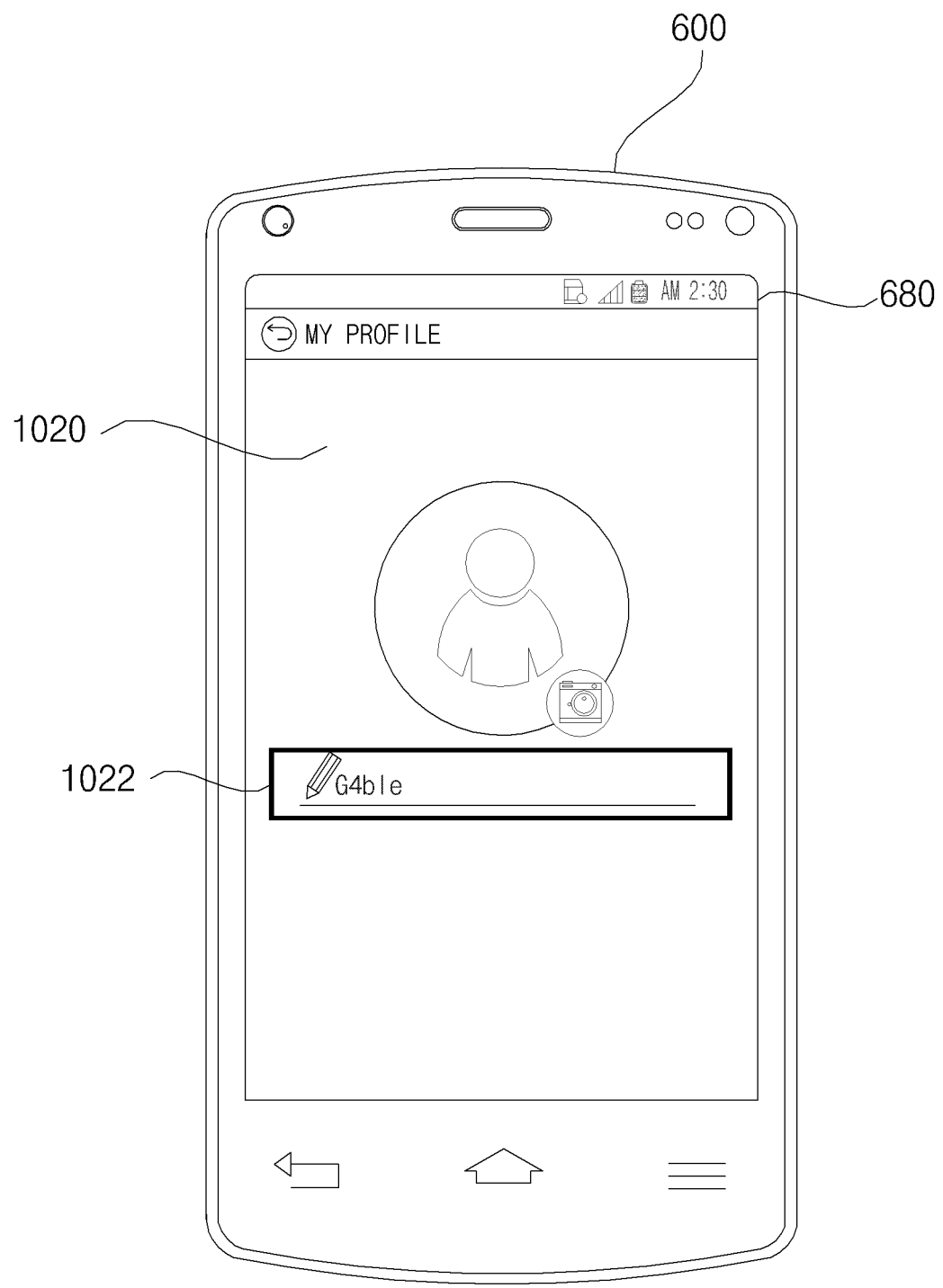

When a profile item 1012 is selected in the profile setup screen 1010, the controller 670 of the mobile terminal 600 may perform a control operation to display a screen 1020 including an image and a name input window 1022 as shown in FIG. 10B.

Figure 10C:
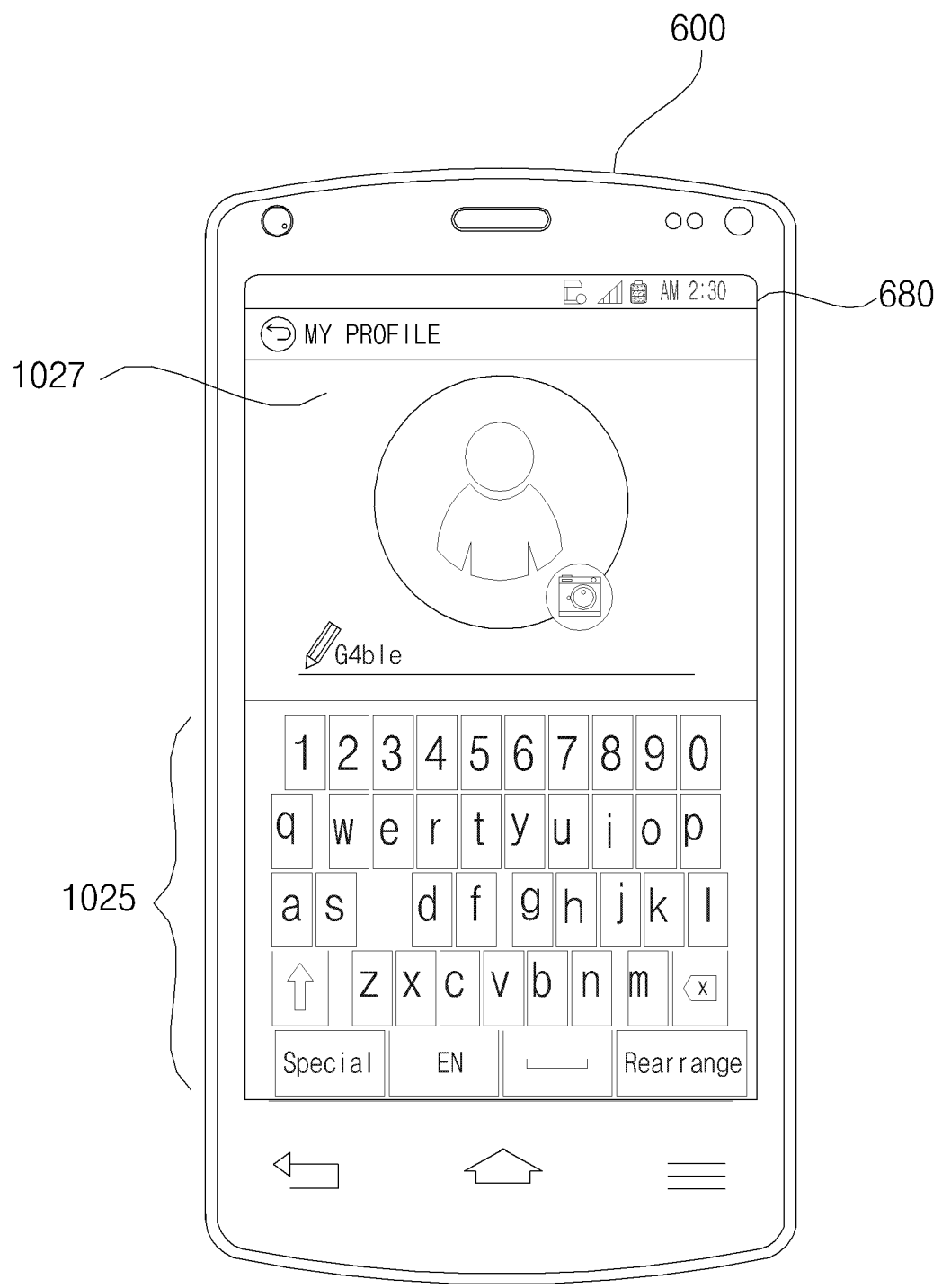

When the name input window 1022 is selected, the controller 670 of the mobile terminal 600 may control a keyboard 1025 to be further displayed as shown in FIG. 10C. Characters selected through the keyboard 1025 are input in the input window 1022.

Figure 10D:
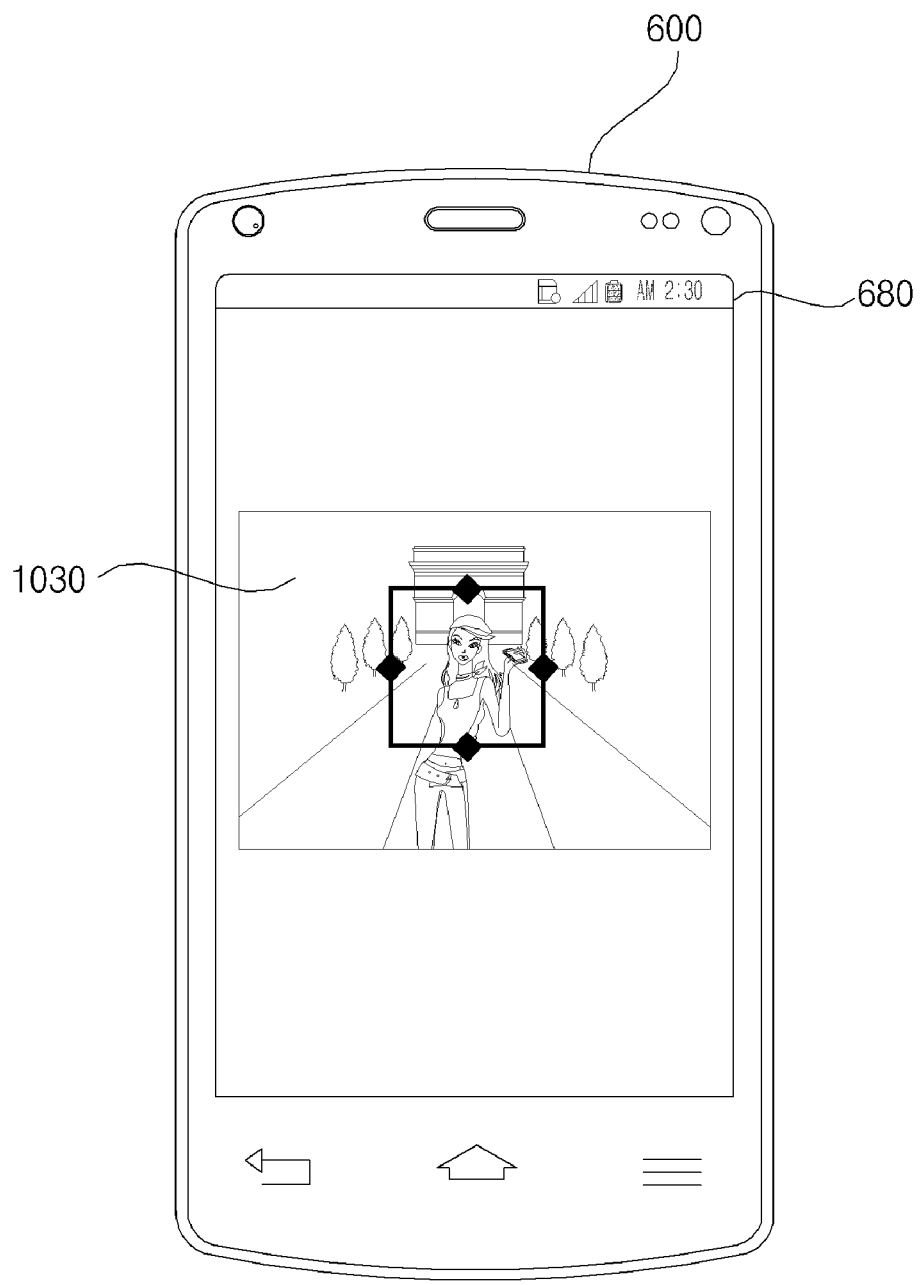
Figure 10E:
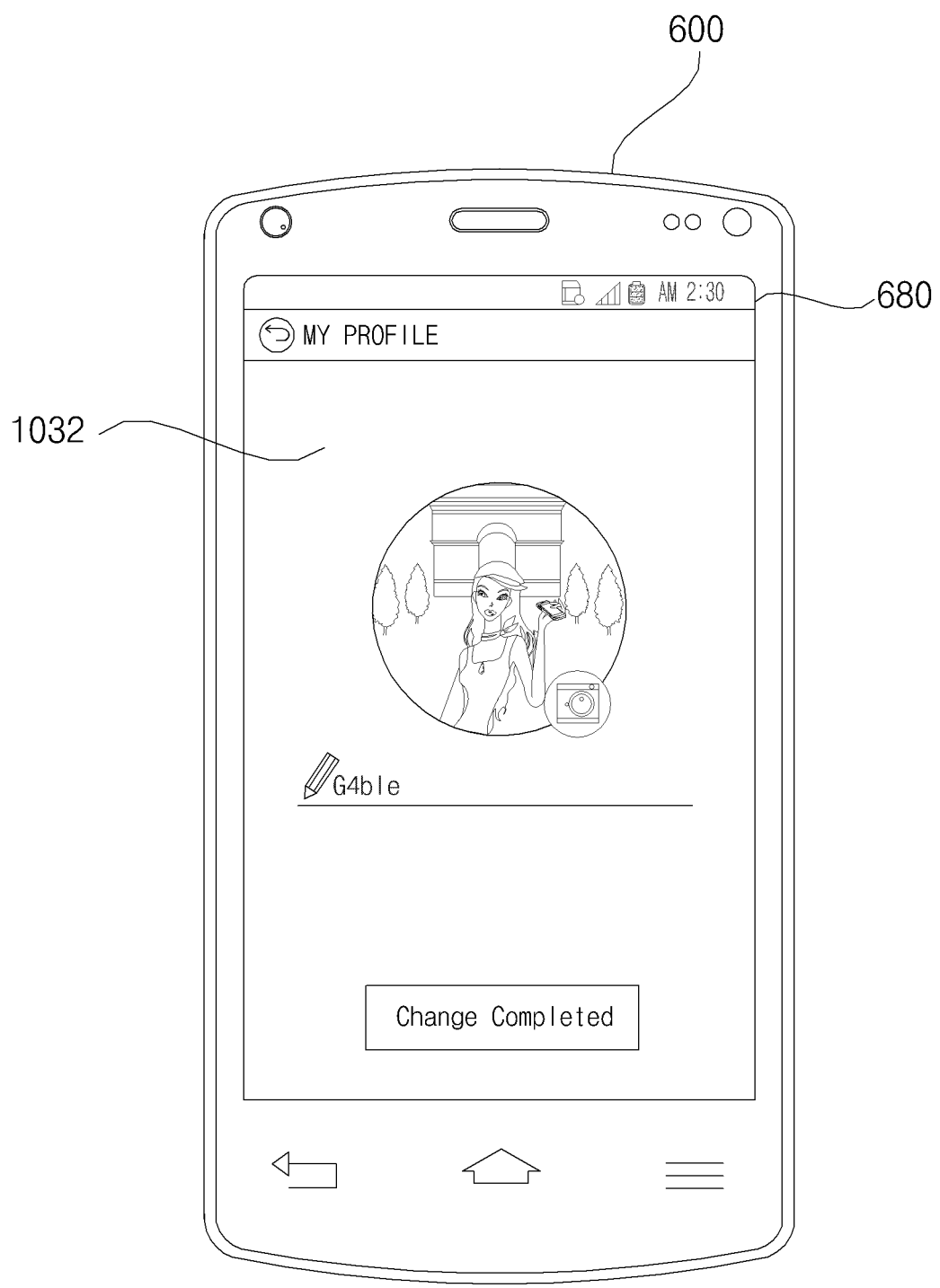

The controller 670 of the mobile terminal 600 may control an image captured through a camera or a stored image so as to be displayed as shown in FIG. 10D, and may crop an image 1030 as a selected area center according to an area designation input. Then, an edited image 1032 may be displayed as shown in FIG. 10E.

Figure 10F:
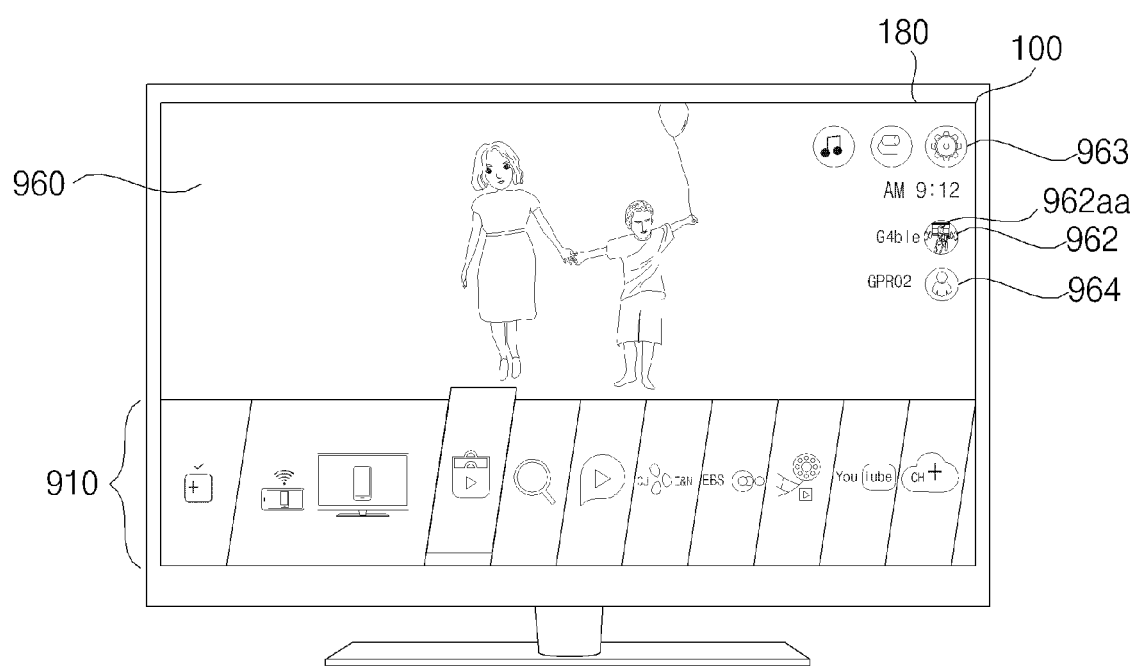
Figure 10G:
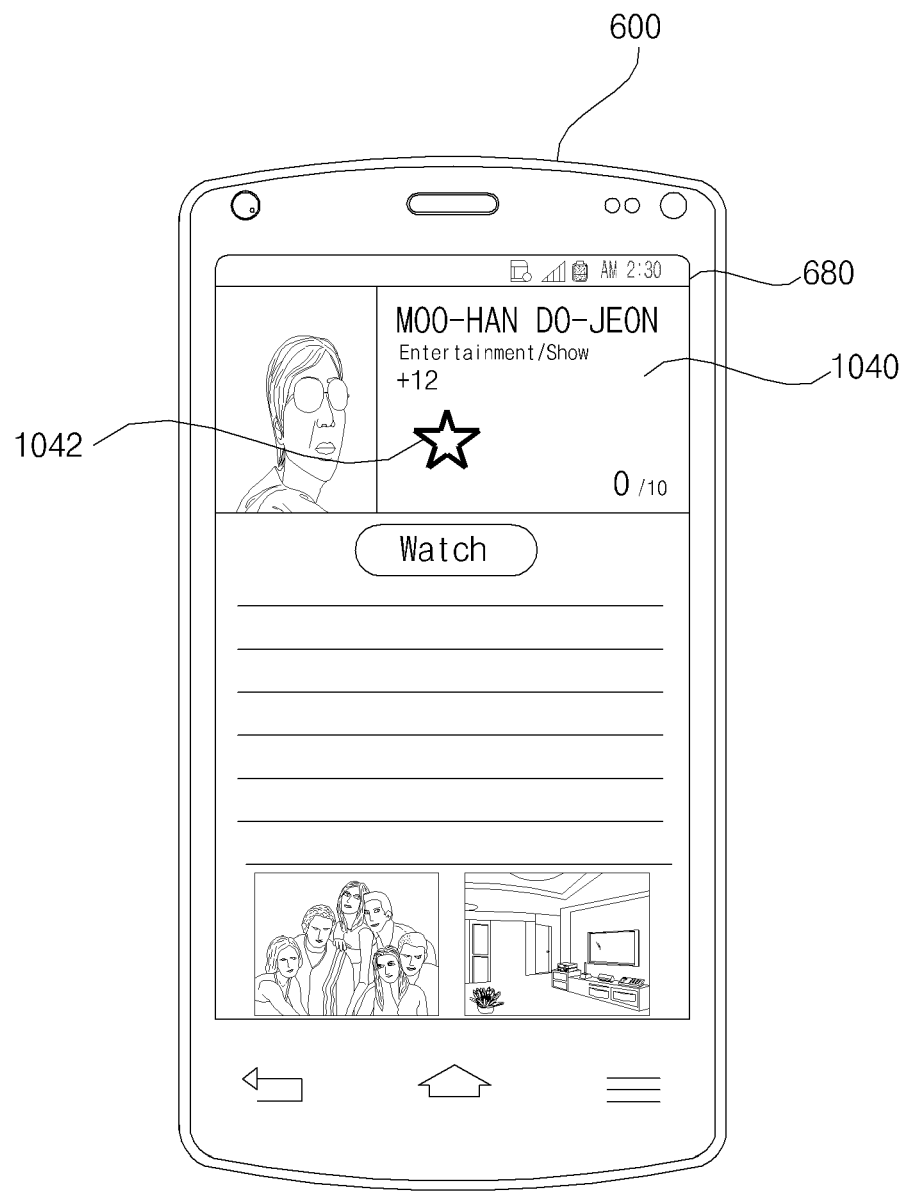

When profile setup is completed, the controller 670 of the mobile terminal 600 may transmit the name information and image information about the edited object to the image display device 100. When the controller 170 of the image display device 100 receives the name information and image information about the object and is paired with the mobile terminal 600, it may control an object 962 including the name information about the edited object and an image 962aa to be displayed as shown in FIG. 10F.

When a wish list is added through the mobile terminal 600, the mobile terminal may be synchronized with the image display device 100. Details will be described with reference to FIGS. 10G to 10J.

Figure 10H:
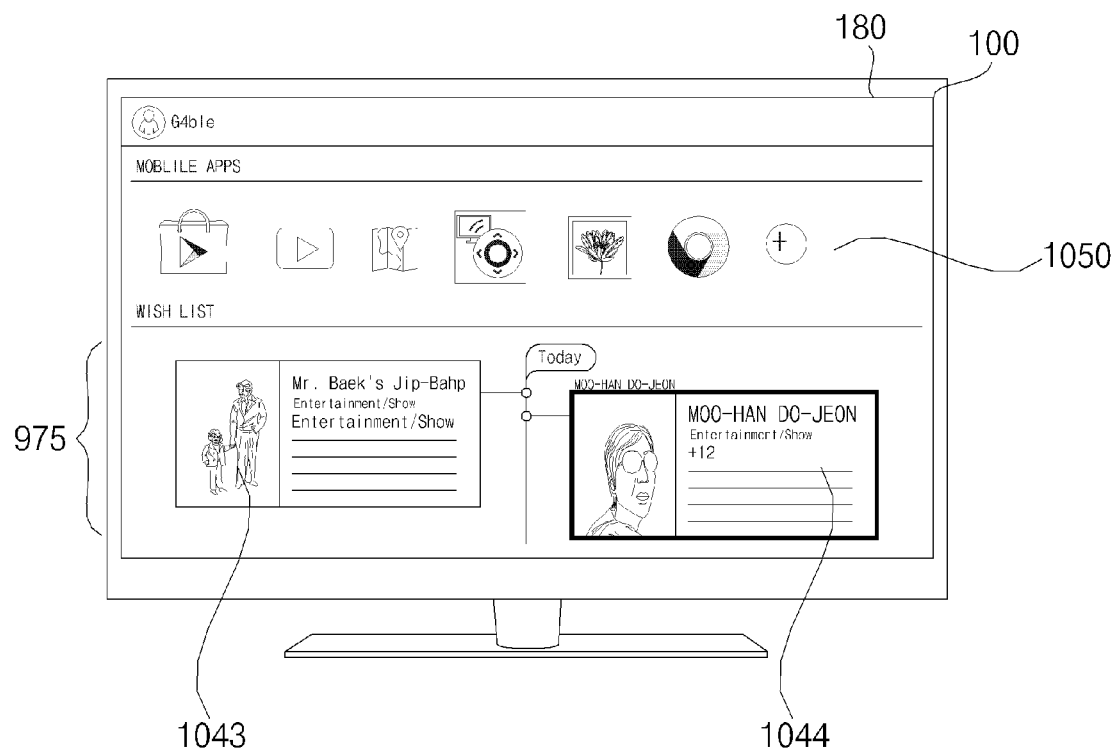
Figure 10I:
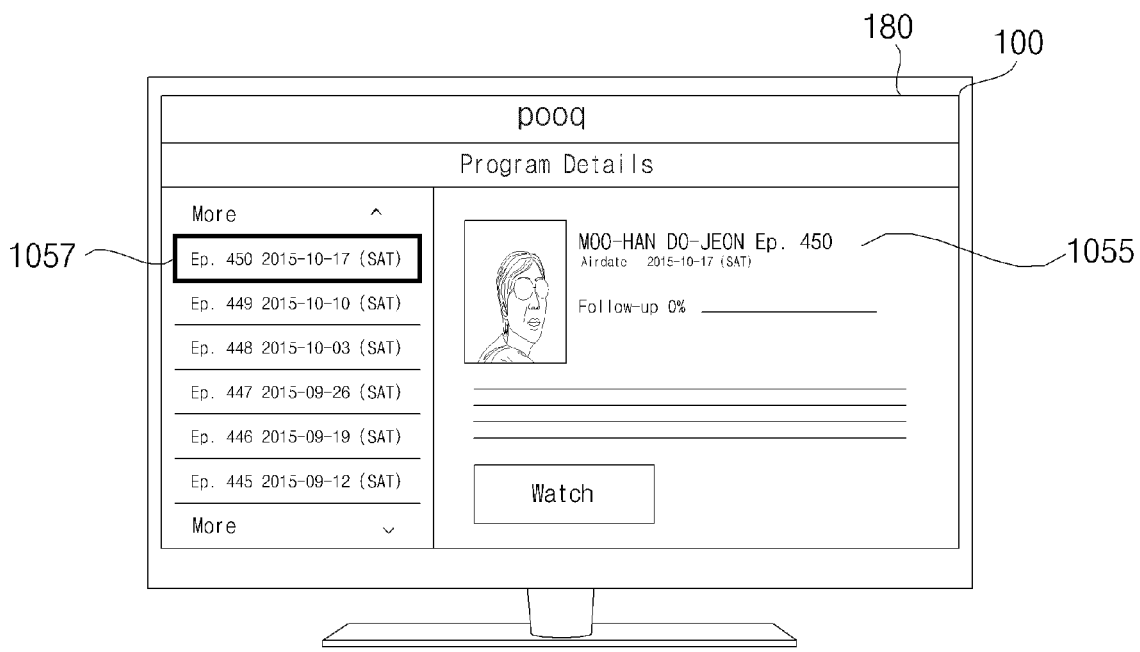
Figure 10J:
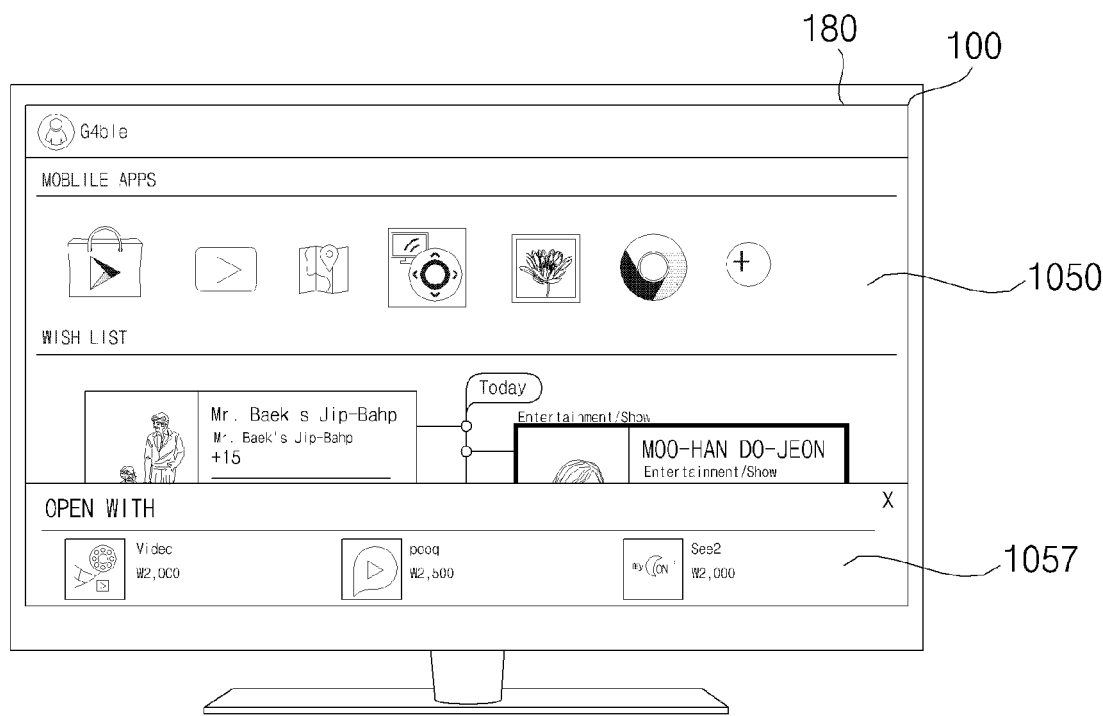

FIG. 10J illustrates display of a specific content-related screen 1040 on the mobile terminal 600.

When a favorite item 1042 is selected in the specific content-related screen 1040, it may be added as a content wish list in the mobile terminal 600.

When the mobile terminal 600 and the image display device 100 are paired, the wish list in the mobile terminal 600 may be transmitted to the image display device 100.

Specifically, the content information related to the favorite item 1042 may be transmitted to the image display device 100. The content information related to the favorite item 1042 may include url information, program information, program name information, program time information, and reproducible application information.

Thus, after pairing with the mobile terminal 600, the controller 170 of the image display device 100 may control an added application 1044 to be displayed in the wish list between the displayed application list and the wish list as shown in FIG. 10H.

When the added item 1044 is selected, the controller 170 of the image display device 100 may control a predetermined application screen 1055 or a predetermined web page screen to be displayed using the content information related to the added item 1044, as shown in FIG. 10I.

For example, the controller 170 of the image display device 100 may control the predetermined application screen 1055 or a predetermined web page screen to be displayed using the application information or url information in the content information, as shown in FIG. 10I.

When a predetermined episode item 1057 is selected in FIG. 10I, a corresponding content image may be immediately reproduced or a list 1057 including a plurality of application items necessary for reproducing the content may be displayed as shown in FIG. 10J.

Accordingly, the wish list easily added through the mobile terminal 600 may be easily shared in the image display device 100, and desired content may be viewed on the image display device 100, which has a larger screen.

Figure 11A:
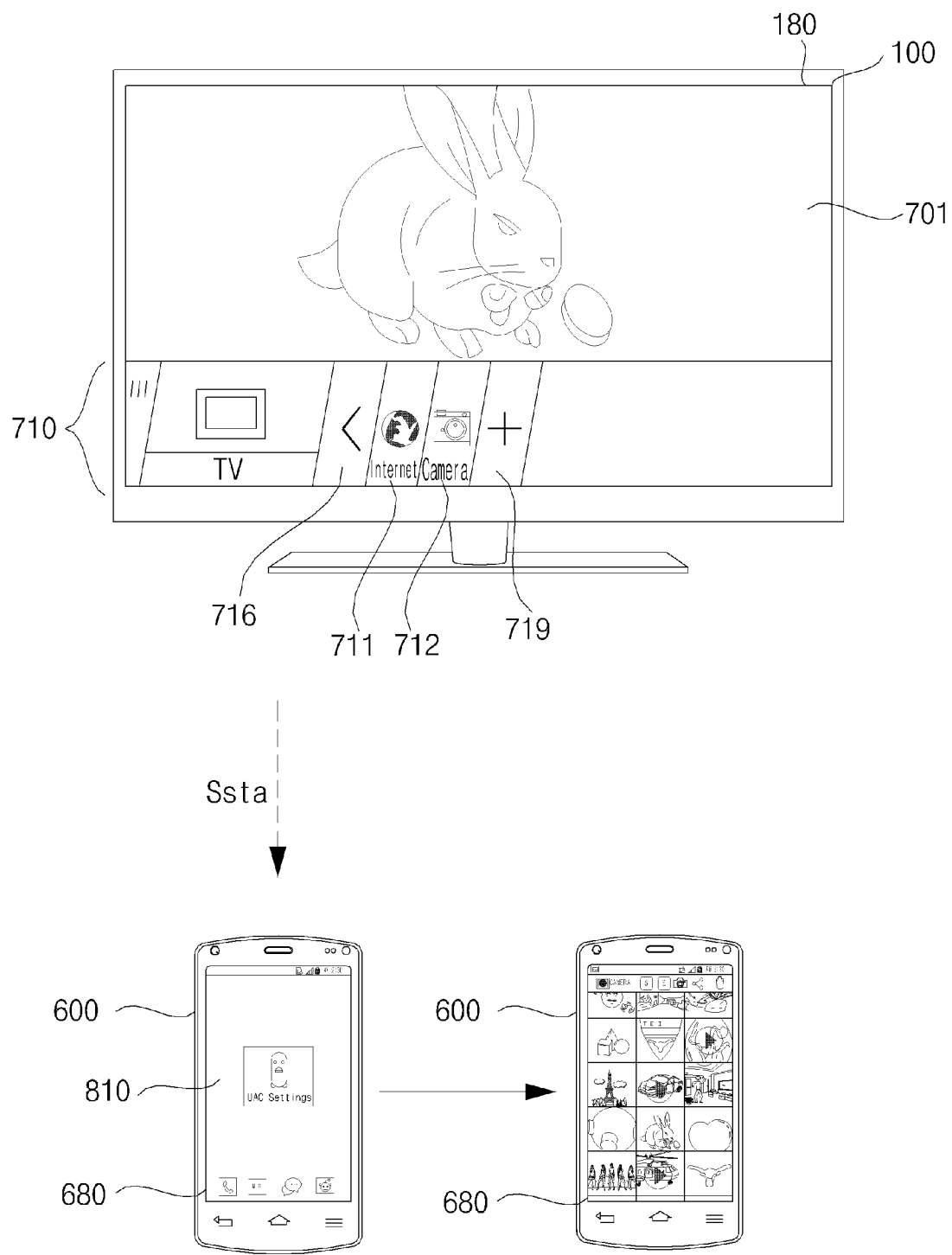

FIG. 11A illustrates a case where a camera application item 712 is selected between the mirroring application items 711 and 712 displayed in the mirroring-related menu 717 and thus camera application execution request information Ssta is transmitted from the image display device 100 to the mobile terminal 600.

Upon receiving the camera application execution request information Ssta, the controller 680 of the mobile terminal 600 may control the camera application so as to be executed as shown in FIG. 11A, and control the displayed home screen or idle-mode screen 810 so as to be switched to the camera application screen.

Figure 11B:
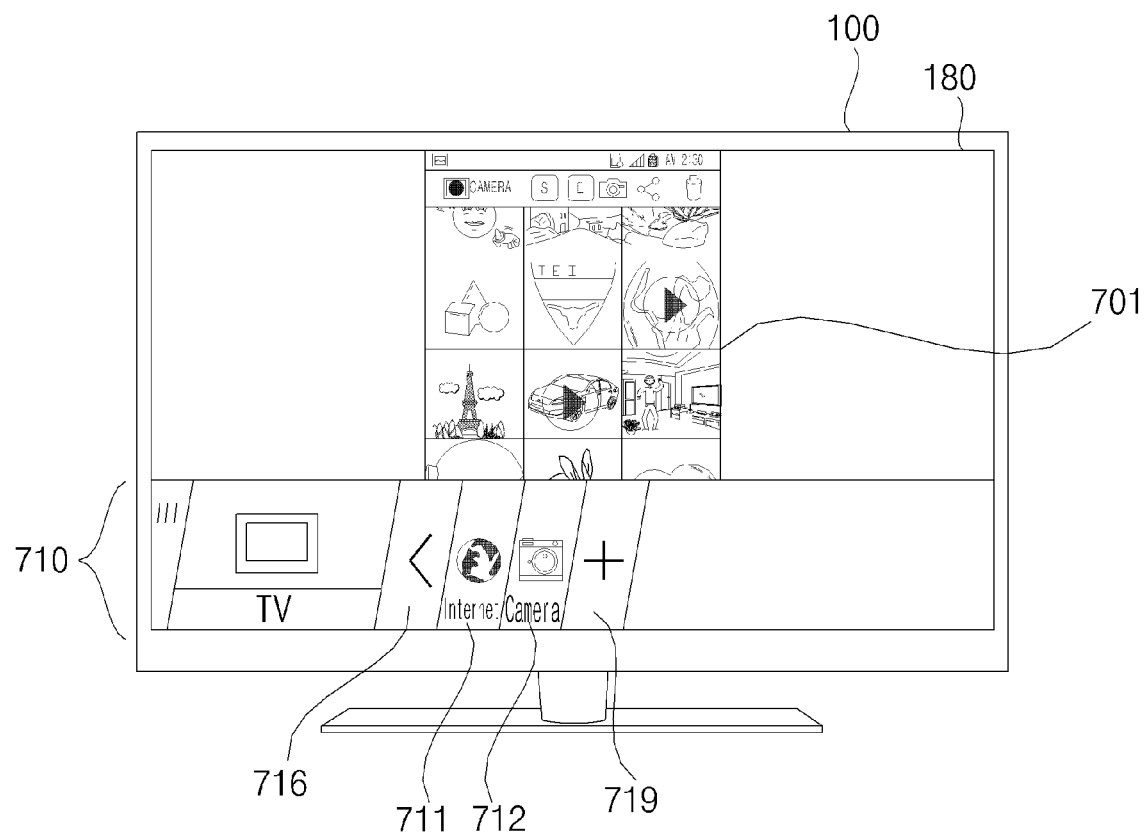

Then, the controller 680 of the mobile terminal 600 may enter the mirroring mode and control an image Saib corresponding to the camera application screen 840a so as to be transmitted to the image display device 100 as shown in FIG. 11B.

Thus, the controller 170 of the image display device 100 may receive the image Saib corresponding to the camera application screen 840a through the interface 130 or 135 and perform signal processing such as scaling to control an image 840b corresponding to the camera application screen 840a so as to be displayed on the display 180.

While it is illustrated in FIG. 11B that the mirrored camera application image 840b is displayed together with the application list 710, the application list 710 may disappear and only the mirrored camera application image 840b may be displayed on the display 180, as shown in FIG. 1.

In an embodiment, the controller 170 may control perform a control operation such that the communication scheme for a pairing request signal differs from the communication scheme for transmission of the mirroring application image.

For example, the controller 170 may control the pairing signal or the pairing request signal so as to be communicated as a Bluetooth-based BLE (Blooth Low Energy) signal, and may control a Wi-Fi communication scheme according to the Miracast having a wider bandwidth so as to be used in transmitting the mirroring application images.

Figure 11C:
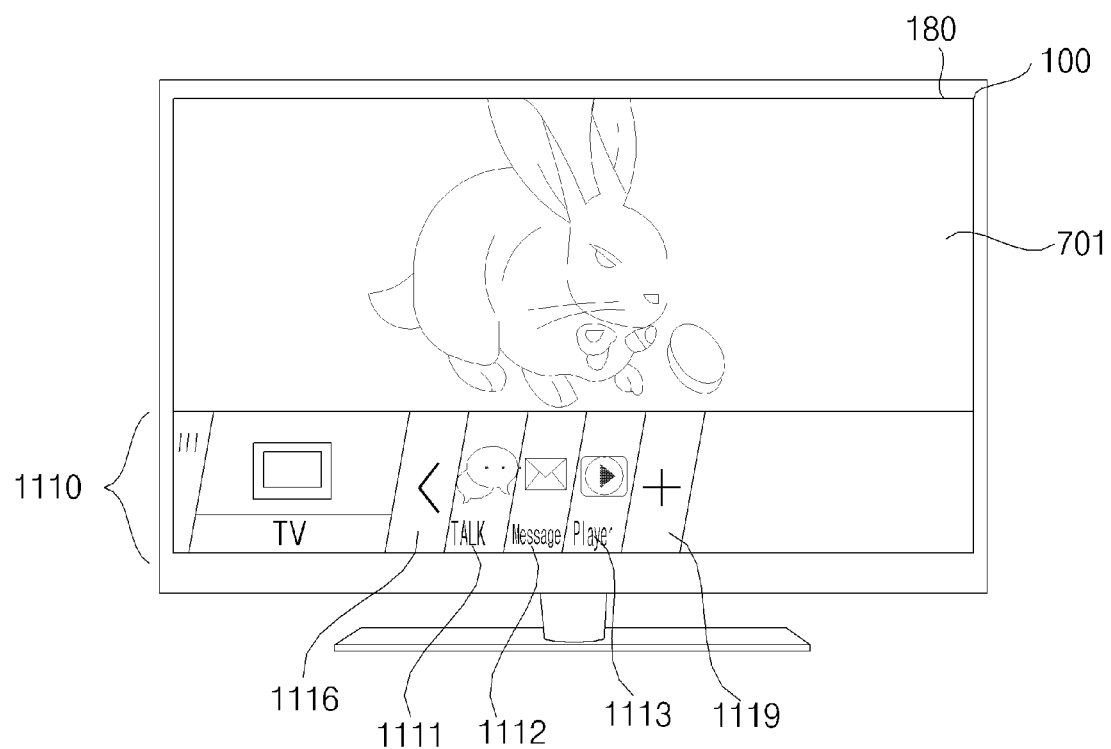

The controller 170 of the image display device 100 may control the received mirroring application item so as to be installed in the image display device 100, in particular, so as to be displayed in the mirroring-related menu in the application list 1110 as shown in FIG. 11C.

FIG. 11C illustrates a messenger application item 1111, a message application item 1112 and a player item 1113 for reproducing multimedia data, as mirroring applications transmitted from the mobile terminal 600.

The mirroring-related menu may further include a return item 1116 and an Add Application item 1119 for restoring the mirroring item.

In an embodiment, the controller 170 of the image display device 100 may select a predetermined application item from among the mirroring application items displayed in the mirroring-related menu, perform a control operation to transmit information about the selected application item to the mobile terminal 600 and receive an image of a corresponding application executed in the mobile terminal 600. Then, the controller may display the received application image on the display 180 in the mirroring mode.

Figure 11D:
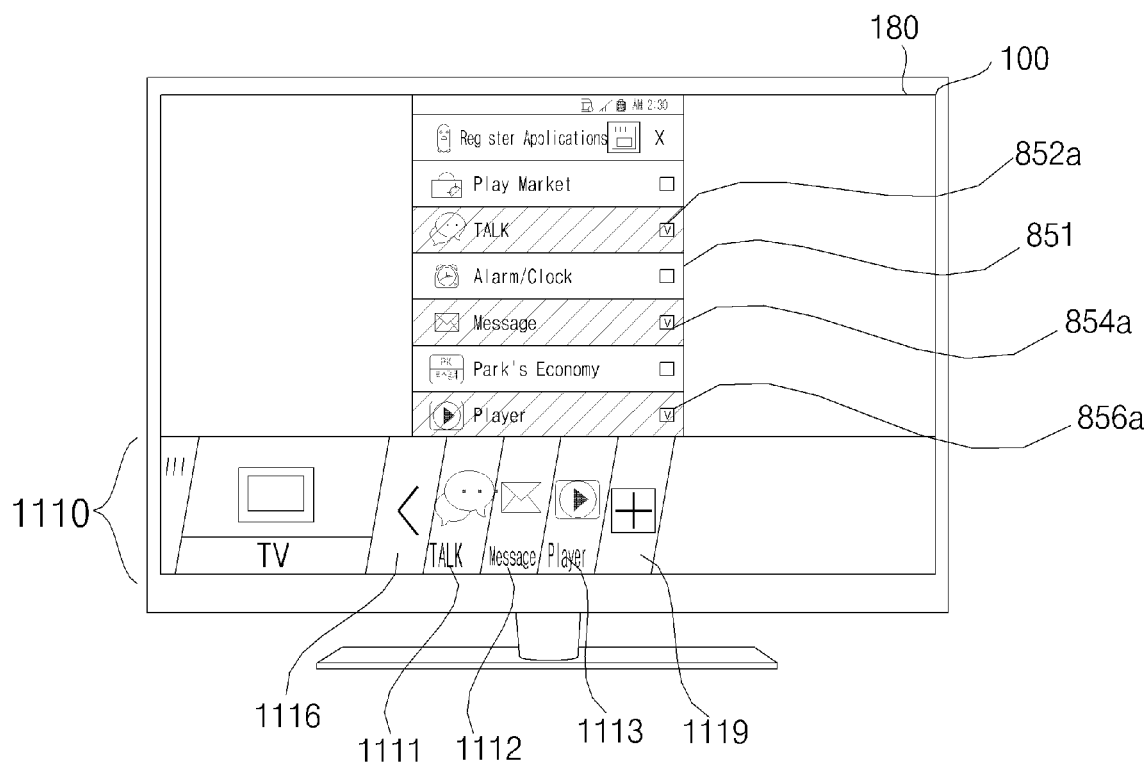
Figure 11D:
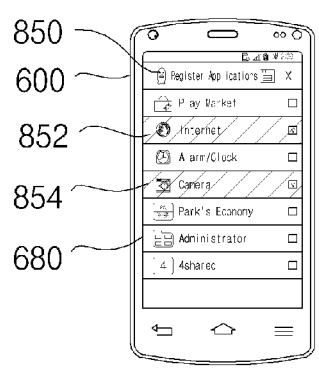
Figure 11E:
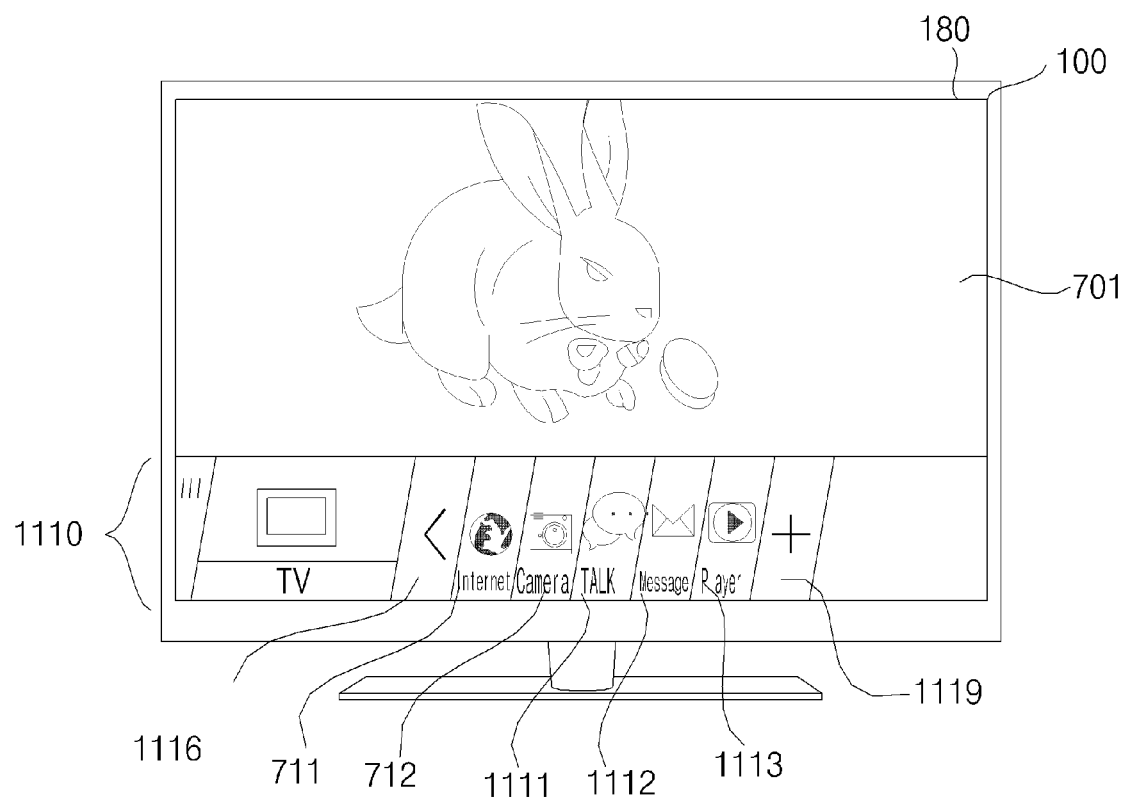
Figure 11E:
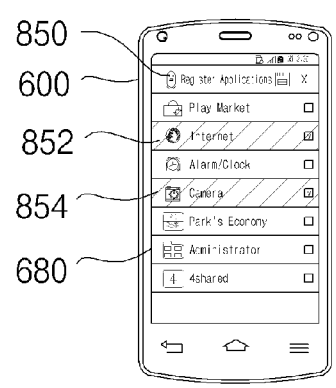

FIGS. 11D to 11E illustrate a method of adding another mirroring application while the three mirroring application items shown in FIG. 11C are being displayed.

For example, when the Add Application item 1119 of FIG. 11C is selected, the controller 170 of the image display device 100 may connect to the mobile terminal 600.

Then, the controller 680 of the mobile terminal 600 may receive Add Application information, control a mirroring application so as to be executed as shown in FIG. 11B, and control the mirroring setting application screen 820 so as to be displayed.

As another example, when the user executes the mirroring application in order to add a mirroring application to the image display device 100, the controller 680 of the mobile terminal 600 may control the mirroring application so as to be executed and the mirroring setting application screen 820 so as to be displayed, as shown in FIG. 11D.

The controller 680 of the mobile terminal 600 may control image data Saib corresponding to the mirroring setting application screen 820 so as to be transmitted to the image display device 100 as shown in FIG. 11D. In the figure, it is illustrated that an image 851 corresponding to the mirroring application execution screen is displayed on the display 180 of the image display device 100.

When a plurality of application items, for example, the Internet application item 852 and the camera application item 854, is selected in the application list 850, the controller 670 of the mobile terminal 600 may control the Internet application item 852 and the camera application item 854 so as to be highlighted as shown in FIG. 11D.

Next, when there is an additional input for the two selected application items, the controller 670 of the mobile terminal 600 may control the additional input to be transmitted to the image display device 100 as shown in FIG. 11E. At this time, the controller 670 of the mobile terminal 600 may control two pieces of application transmission information to be displayed on the display 680.

The image display device 100 may receive, via the interface 130 or 135, information related to two application items to be subjected to mirroring.

The controller 170 of the image display device 100 may perform a control operation to install the received mirroring application items on the image display device 100, particularly, may control the Internet application item 711 and the camera application item 712 so as to be displayed in the mirroring-related menu together with the messenger application item 1111, the message application item 1112 and the player item 1113 for reproduction of multimedia data, which have been already added, as shown in FIG. 11E. Thus, mirroring related applications may be easily added to the application list of the image display device 100, particularly, to the mirroring-related menu.

Figure 12:
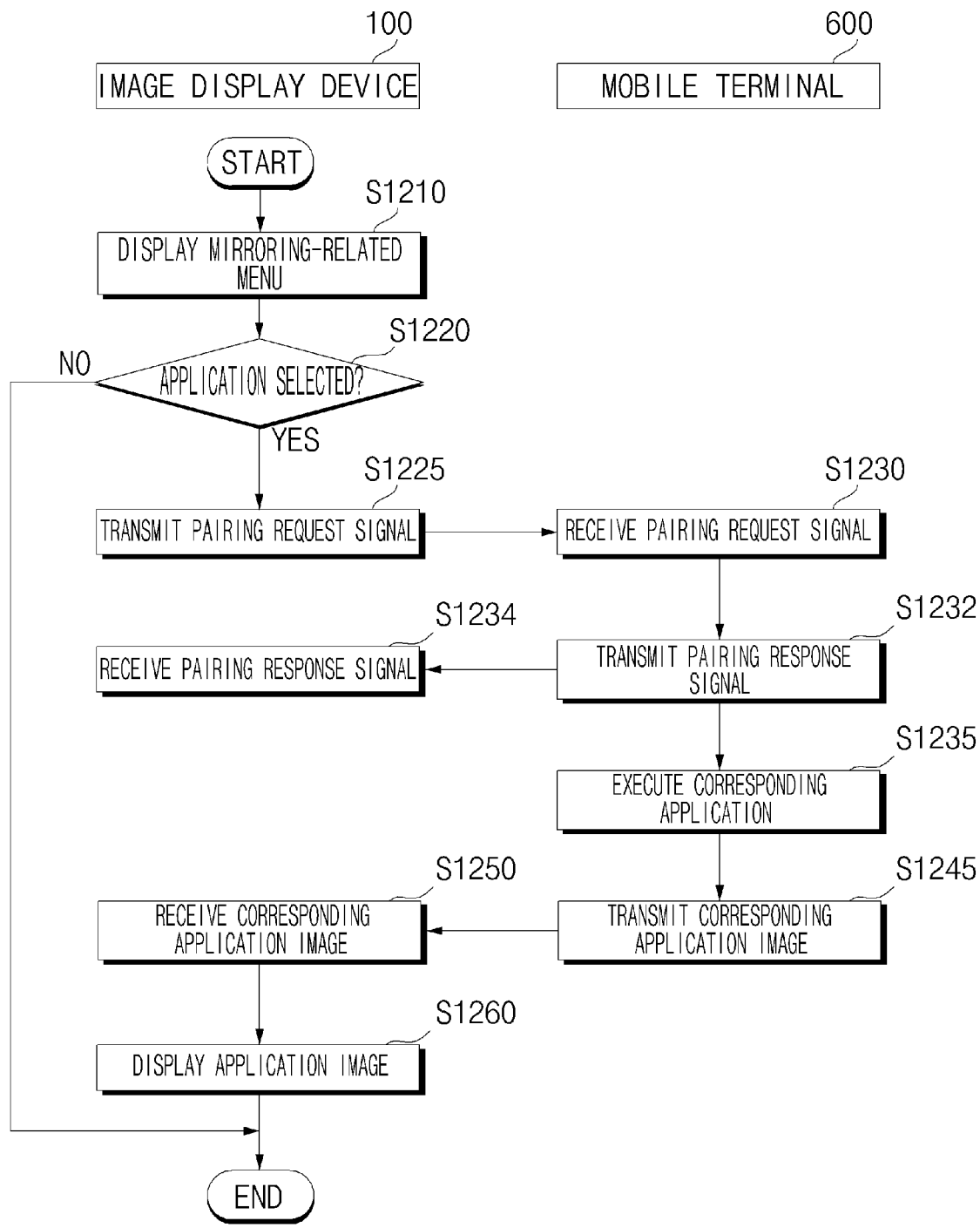
FIG. 12 is a flowchart illustrating operation of an image display device and mobile terminal according to another embodiment of the present invention.

FIG. 12 is a flowchart illustrating operation of an image display device and mobile terminal according to another embodiment of the present invention, and FIGS. 13A to 14C are views referred to in describing the operation method of FIG. 12.

Referring to FIG. 12, the controller 170 of the image display device 100 performs a control operation based on user input to display a mirroring-related menu (S1210).

For example, when a home key or an application execution key is operated with a broadcast image 700 displayed as shown in FIG. 7A, an application list 710 may be displayed at the bottom of the screen as shown in FIG. 7B. Here, the application list may have a plurality of application items, and may include a mirroring application item.

When the mirroring application item is selected by the pointer 205 based on the pointing signal of the remote controller 200, the mirroring-related menu 717 may be displayed by being unfolded to the right, similar to a pull down menu.

If an application related to mirroring is not added, the mirroring-related menu 717 may include a code image 720 for installation of a mirroring-related application, as shown in FIG. 7D. As shown in FIGS. 8A to 8K, if an application related to mirroring is added, the displayed code image 720 may disappear and the installed application items related to mirroring may be displayed.

Hereinafter, it is assumed that application items related to mirroring are installed in the mirroring-related menu.

Next, when any one of the application items is selected in the mirroring-related menu by the pointer 205 which is based on the pointing signal of the remote controller 200 (S1220), the controller 170 of the image display device 100 performs a control operation to transmit a pairing request signal to the mobile terminal 600 (S1225).

In response, the controller 670 of the mobile terminal 600 receives the pairing request signal (S1230) and controls a pairing response signal to be transmitted (S1232).

In response, the controller 170 of the image display device 100 receives the pairing response signal (S1234). Based on this signal, the controller 170 of the image display device 100 connects to the mobile terminal 600 and performs a control operation to maintain the connection with the mobile terminal 600.

The controller 170 of the image display device 100 may perform a control operation to transmit information about a selected application item to the mobile terminal 600, in addition to the pairing request signal.

Accordingly, the controller 670 of the mobile terminal 600 may receive the information about the selected application item, and control the mobile terminal 600 to execute the corresponding application, based on the received information about the application item (S1235).

Next, the controller 670 of the mobile terminal 600 may control an image of the executed application so as to be transmitted to the image display device 100 (S1245).

In response, the controller 170 of the image display device 100 may receive the image of the executed application via the interface 130 or 135 (S1250), and control the received image of the executed application to be displayed (S1260).

Figure 13A:
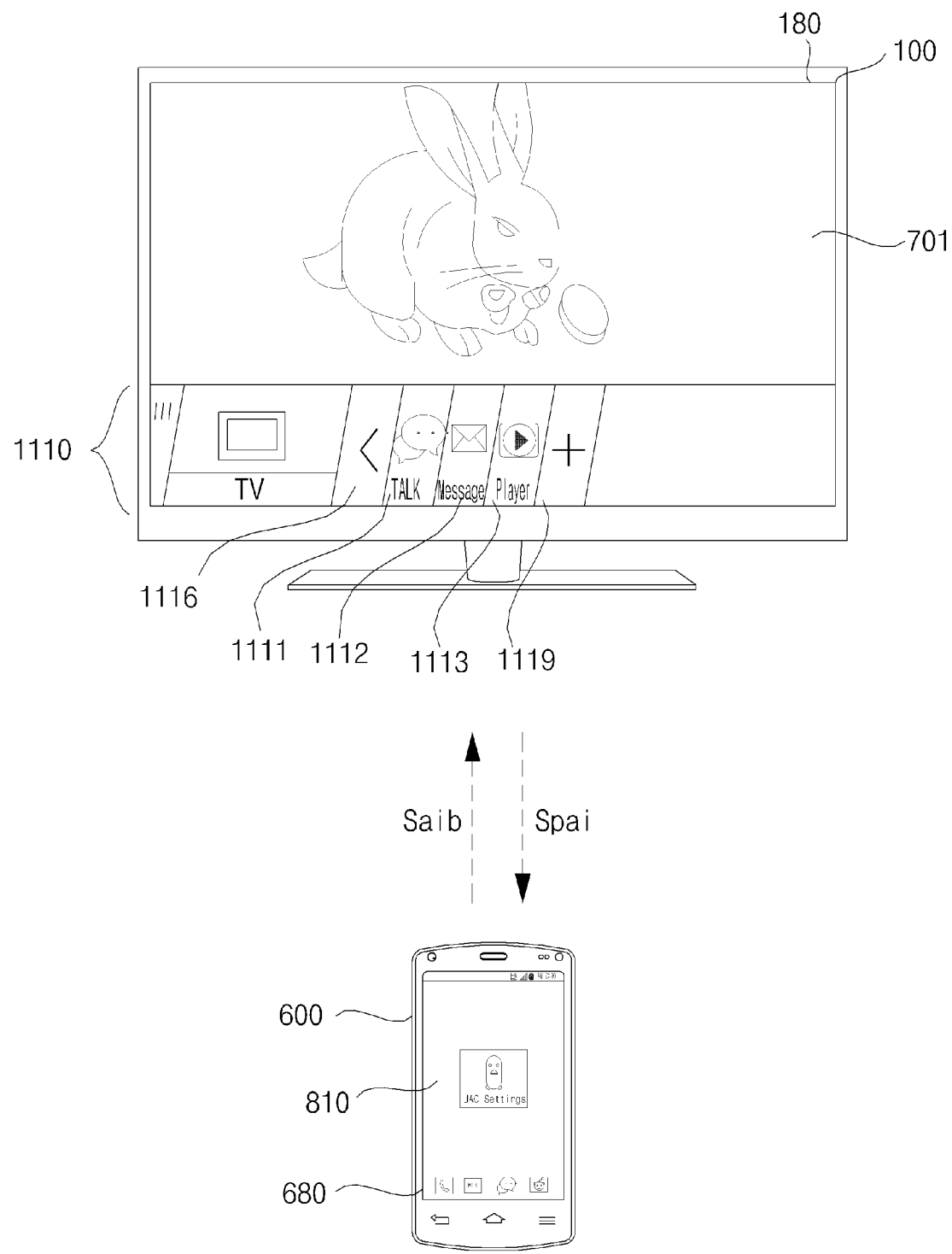
FIGS. 13A to 14C are views referred to in describing the operation method of FIG. 12.

FIG. 13A illustrates that a player application item 1113 is selected from among a plurality of mirroring application items in the application list 1110 on the display 180 of the image display device 100.

In this case, the controller 170 of the image display device 100 may transmit a pairing request signal Spai to the mobile terminal 600 displaying the home screen or the idle-mode screen 810 and receive a pairing response signal Spar from the mobile terminal 600.

Figure 13B:
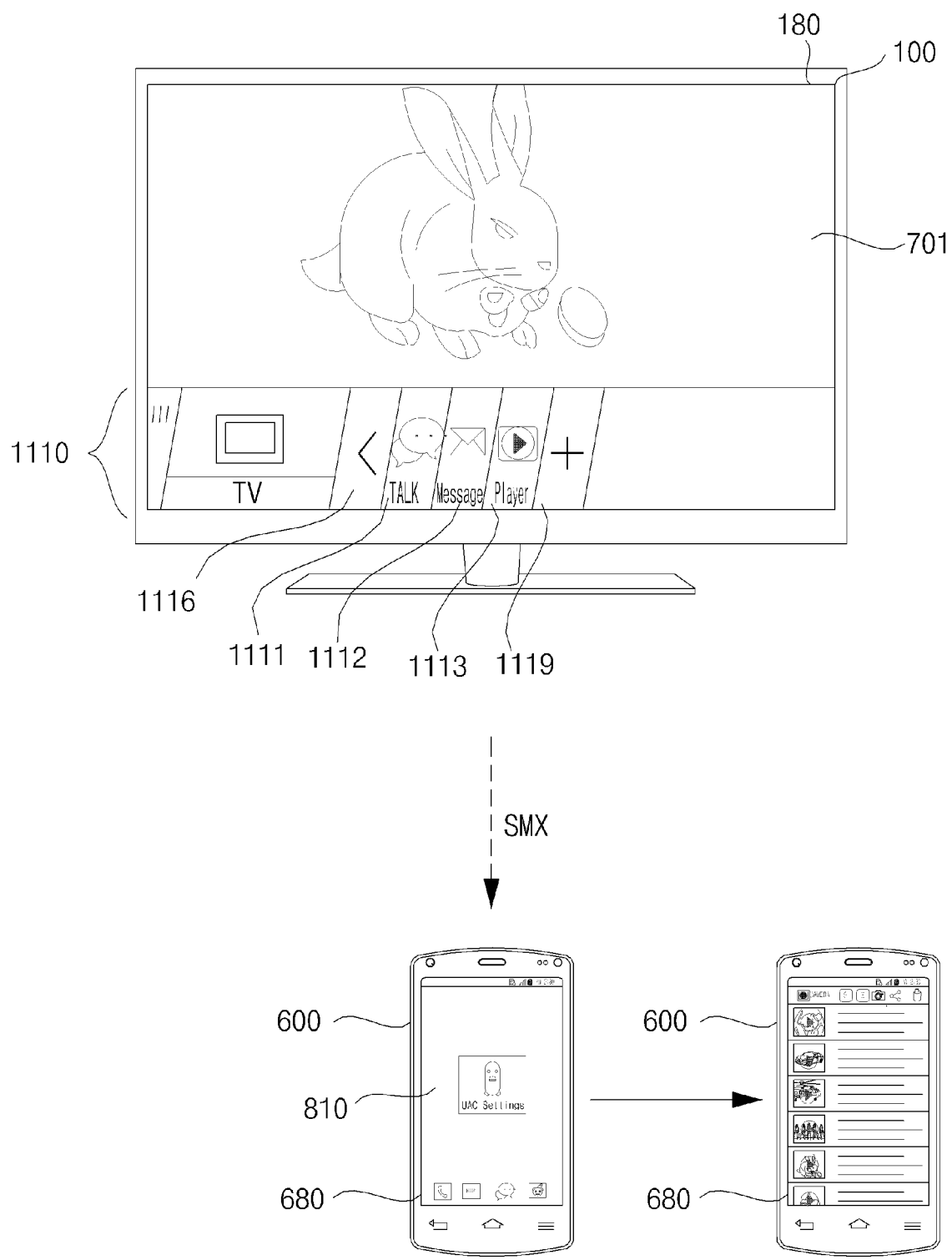

The controller 170 of the image display device 100 may perform a control operation to transmit, in addition to the pairing request signal Spai, information SMX about the selected application item to the mobile terminal 600 as shown in FIG. 13B.

The mobile terminal 600 displaying the home screen or the idle-mode screen 810 may execute the corresponding application in the mobile terminal 600 based on the received information SMX about the application item, and may display the image of the executed application on the display 680 as shown in FIG. 13B.

Figure 13C:
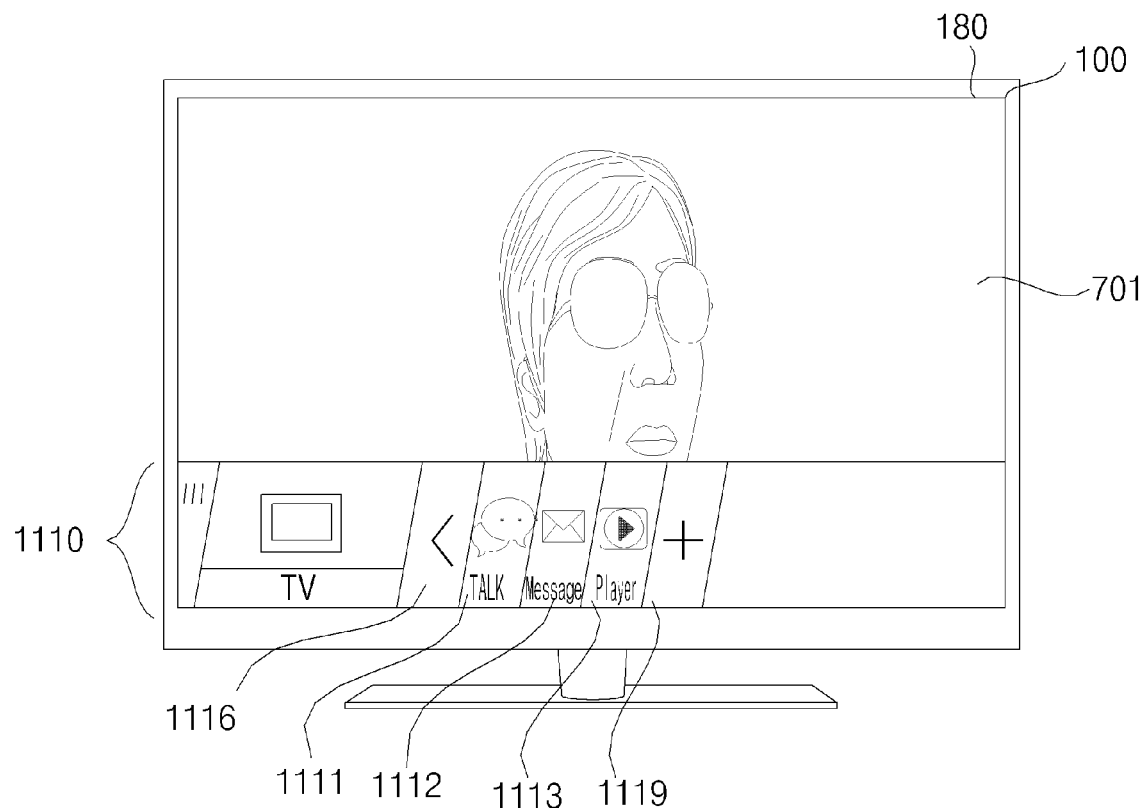
Figure 13C:
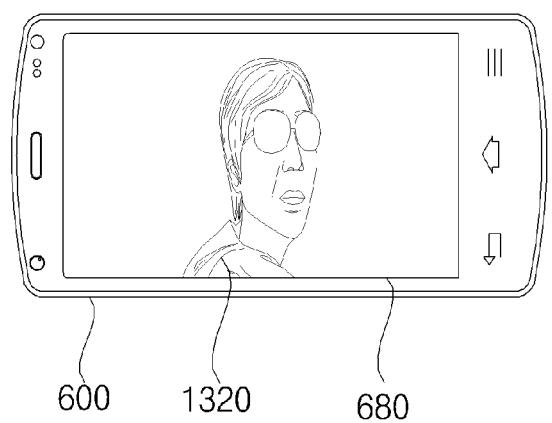

In particular, FIG. 13B illustrates a content list screen among the player application screens. When any one content item is selected in the list, a reproduced screen 1320 may be displayed on the display 680 of the mobile terminal 600, as shown in FIG. 13C.

Then, in accordance with the mirroring mode, an image corresponding to the reproduced screen 1320 may be transmitted to the image display device 100 and an image 1320a corresponding to the reproduced screen may be displayed on the display 180 of the image display device 100. Accordingly, mirroring between the image display device 100 and the mobile terminal 600 may be easily performed.

Unlike FIGS. 13A to 13C, FIGS. 14A to 14C illustrate that the messenger application is selected and subjected to mirroring.

Figure 14A:
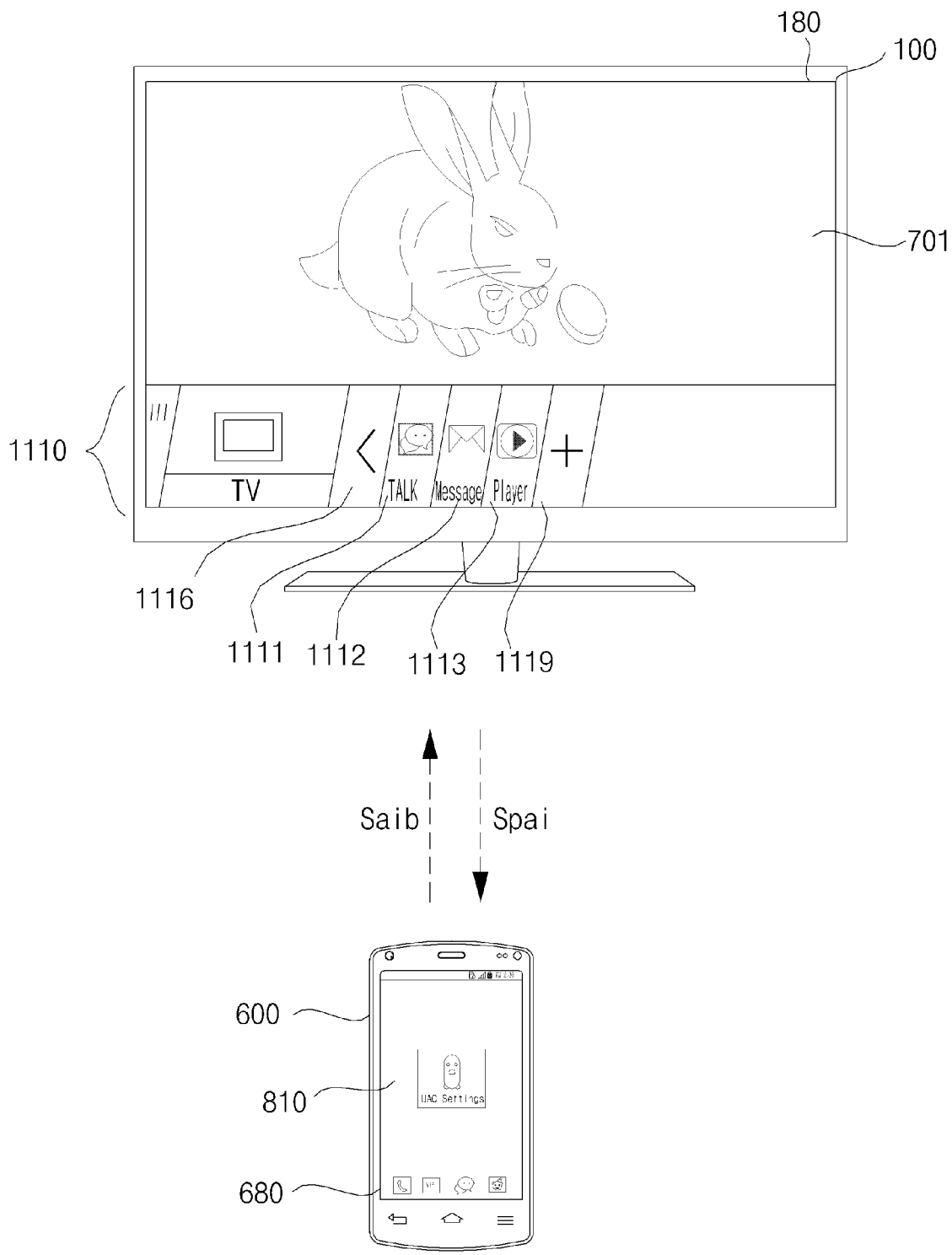

FIG. 14A illustrates that a messenger application item 1111 is selected from among a plurality of mirroring application items in the application list 1110 on the display 180 of the image display device 100.

In this case, the controller 170 of the image display device 100 may transmit a pairing request signal Spai to the mobile terminal 600 displaying the home screen or the idle-mode screen 810 and receive a pairing response signal Spar from the mobile terminal 600.

Figure 14B:
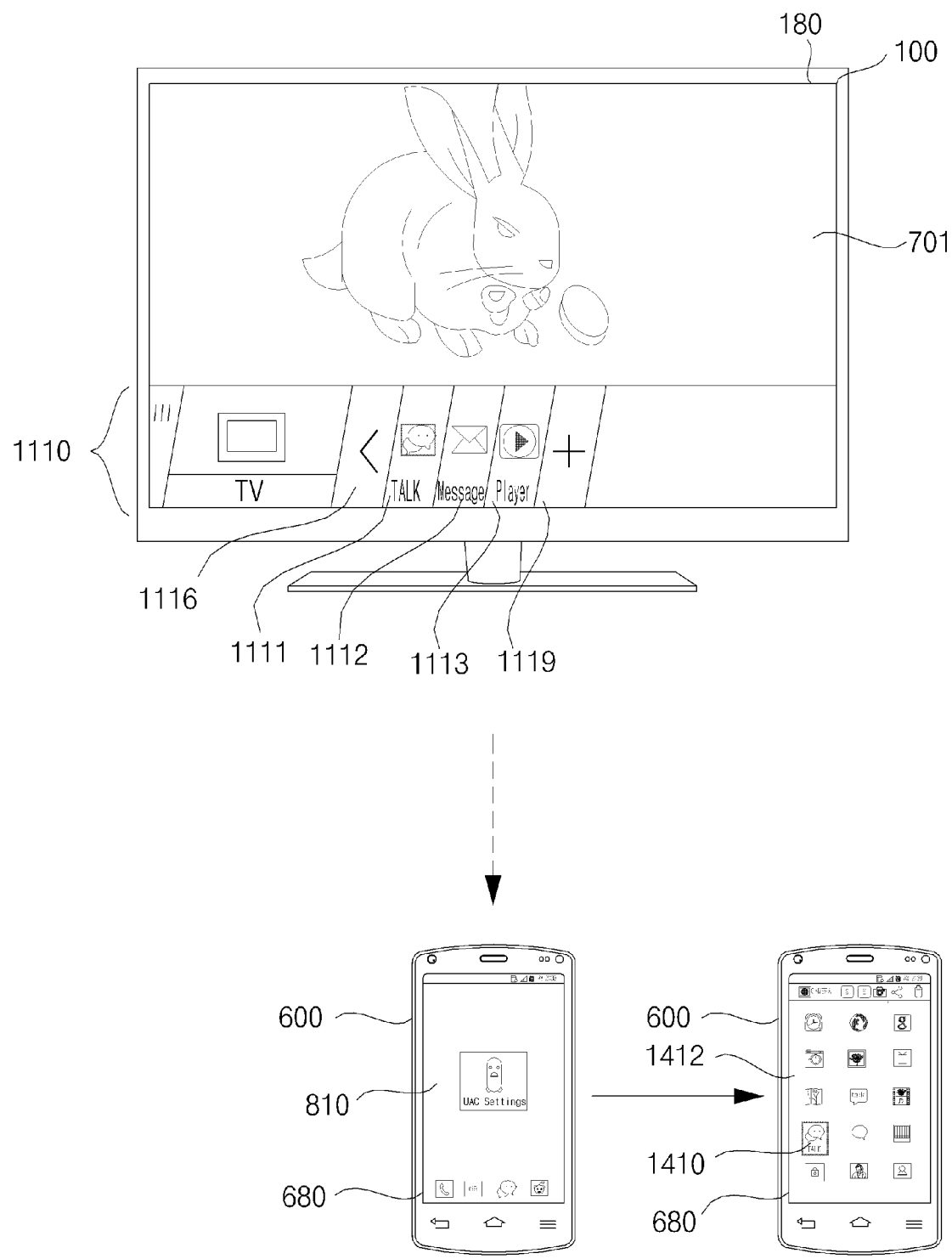

The controller 170 of the image display device 100 may perform a control operation to transmit, in addition to the pairing request signal Spai, information about the selected application item to the mobile terminal 600 as shown in FIG. 14B.

The mobile terminal 600 displaying the home screen or the idle-mode screen 810 may perform a control operation based on the received information about the application item to switch the idle-mode screen of the mobile terminal 600 to the home screen 1410 or to switch from a first home screen to a second home screen 1410 in which the selected application item is positioned.

Figure 14C:
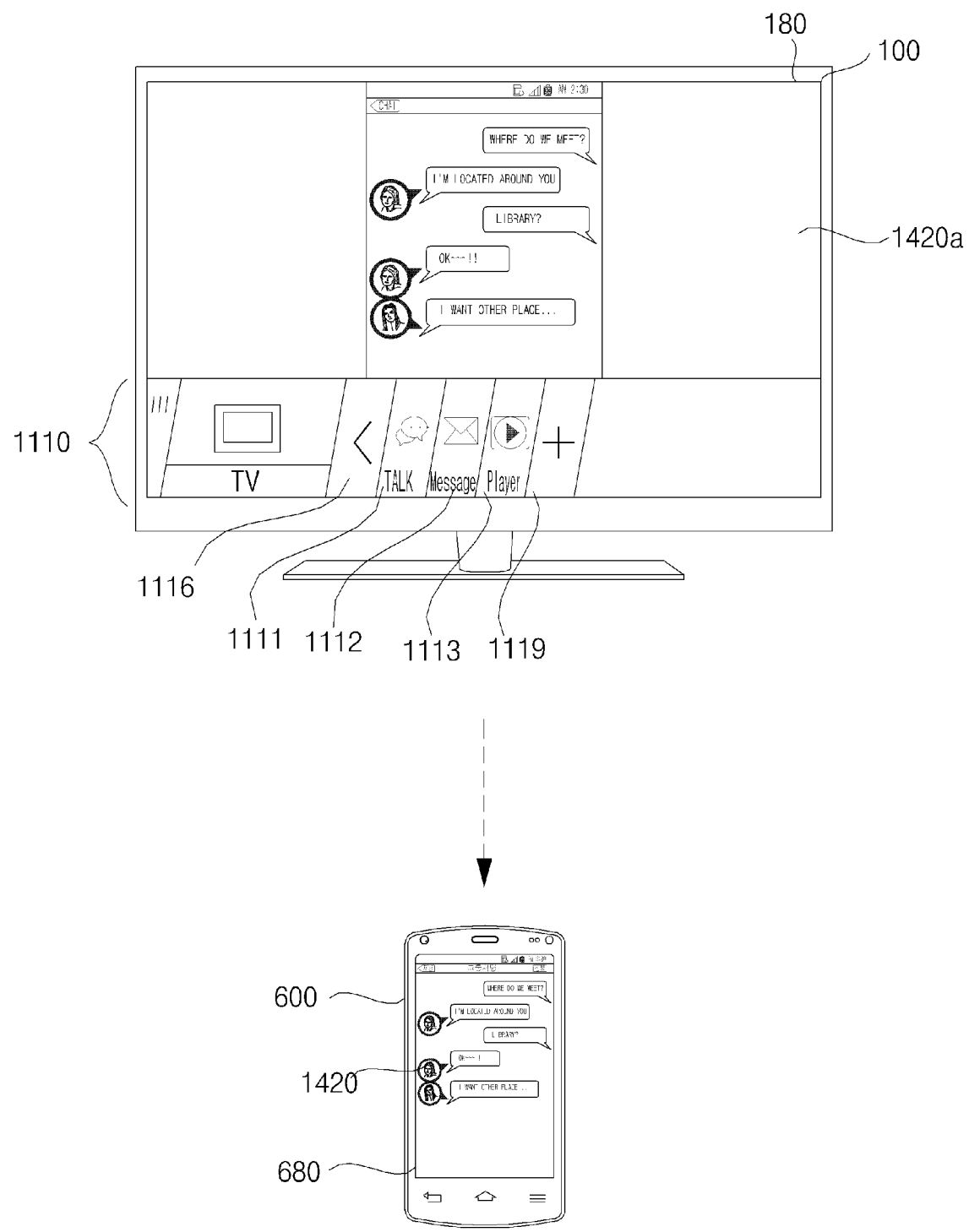

Next, when the messenger application item 1412 is selected in the home screen 1410 of FIG. 14B, the controller 670 of the mobile terminal 600 may execute the corresponding application, and display the image 1420 of the executed application on the display 680 as shown in FIG. 14C.

The controller 670 of the mobile terminal 600 controls the image corresponding to the image 1420 of the executed application so as to be transmitted to the image display device 100 according to the mirroring mode.

Thereby, an image 1420a corresponding to the executed application may be displayed on the display 180 of the image display device 100. Accordingly, mirroring between the image display device 100 and the mobile terminal 600 may be easily performed.

Figure 15:
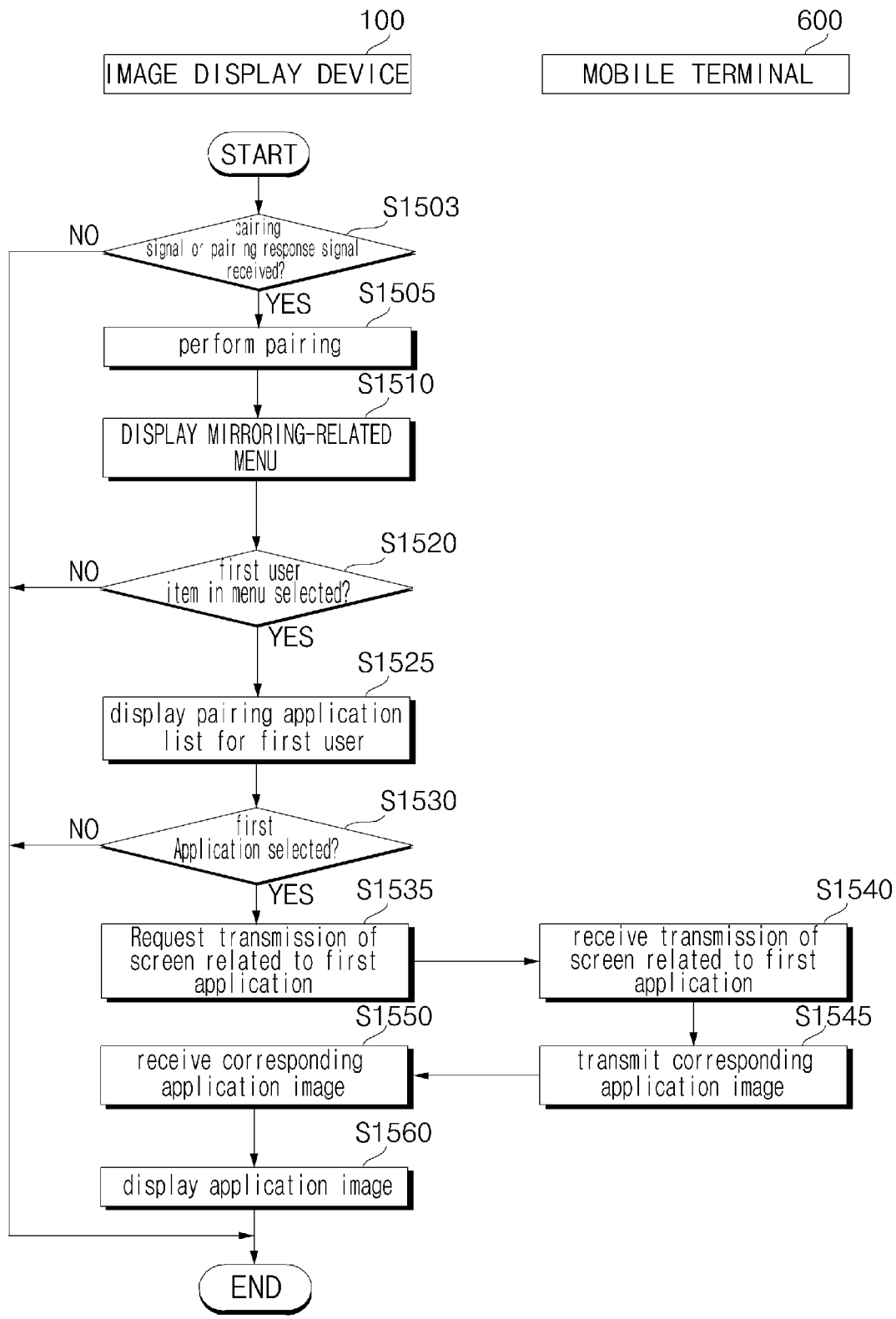
FIG. 15 is a flowchart illustrating an operation method of an image display device and mobile terminal according to another embodiment of the present invention.

FIG. 15 is a flowchart illustrating an operation method of the image display device 100 and a mobile terminal according to another embodiment of the present invention, and FIGS. 16A to 16H are views referred to in describing the operation method of FIG. 15.

Referring to FIG. 15, after being turned on, the controller 170 of the image display device 100 may periodically transmit a pairing signal.

If the mobile terminal 600 approaches the image display device 100 within a predetermined distance, the mobile terminal 600 may receive the pairing signal (S1503). Then, when the mobile terminal 600 is within the predetermined distance from the image display device 100, the mobile terminal 600 may transmit a pairing response signal in response to reception of the pairing signal.

Thereby, the image display device 100 may receive the pairing response signal and perform pairing based on the pairing response signal (S1505).

The pairing signal may include device information about the image display device 100, network information, and frequency channel information for wireless communication.

The pairing response signal may include device information about the mobile terminal 600, network information, and frequency channel information for wireless communication.

The controller 170 of the image display device 100 may perform a control operation to display a mirroring-related menu when pairing with the mobile terminal 600 is completed (S1510).

The mirroring-related menu may be the mirroring-related menu 717 shown in FIG. 8K.

In addition, the mirroring-related menu may be an object indicating the paired mobile terminal as shown in FIG. 9H. Hereinafter, description will be given focusing on the object 962 indicating the paired mobile terminal.

Figure 16A:
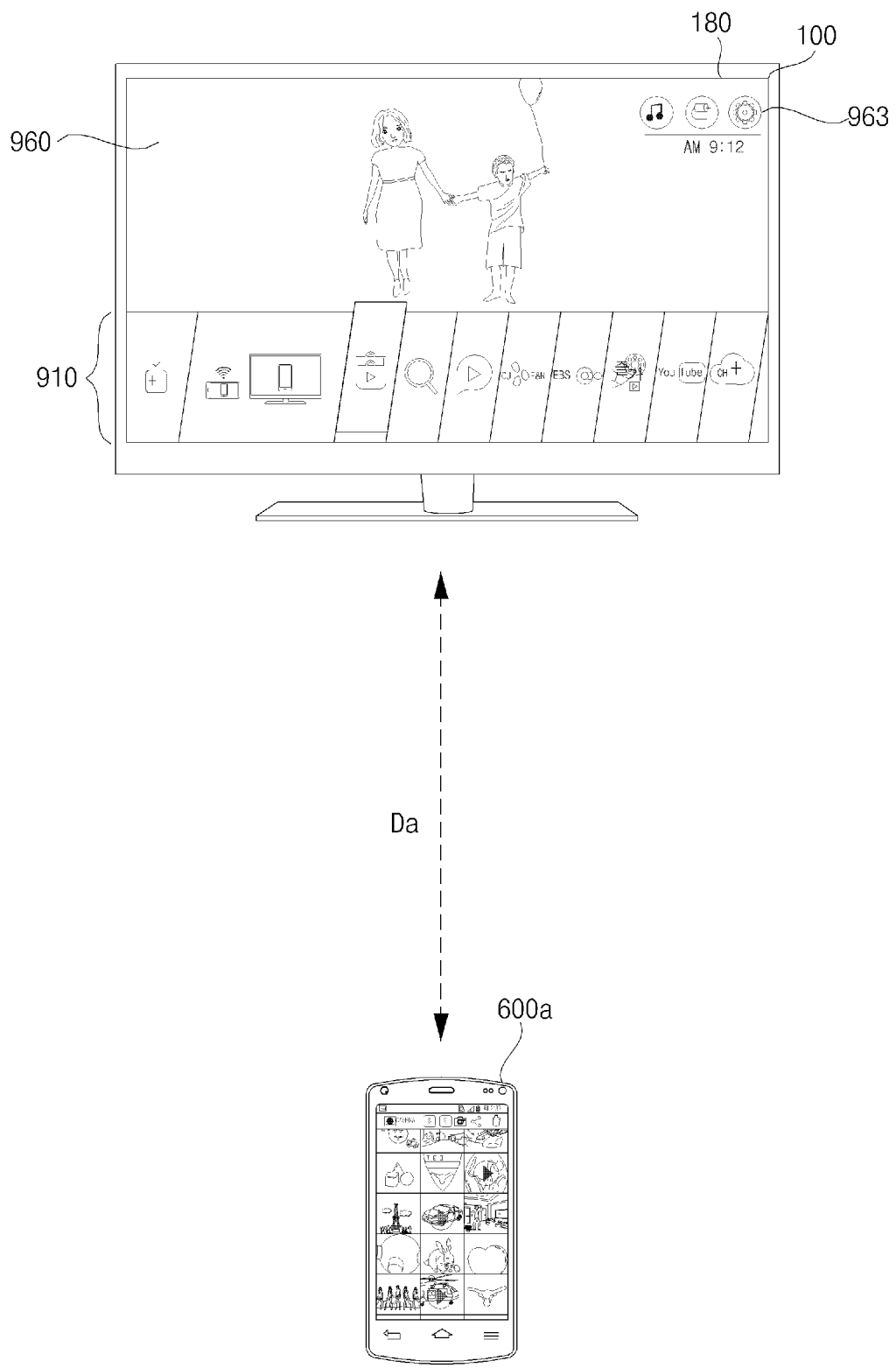
FIGS. 16A to 16H are views referred to in describing the operation method of FIG. 15.

FIG. 16A illustrates a case where the distance between the image display device 100 in the mobile terminal 600 is Da at which pairing cannot be performed.

In this case, the controller 170 of the image display device 100 controls a menu related to the mobile terminal not to be displayed. In FIG. 17A, only the image 960 and the application list 910 are displayed.

Figure 16B:
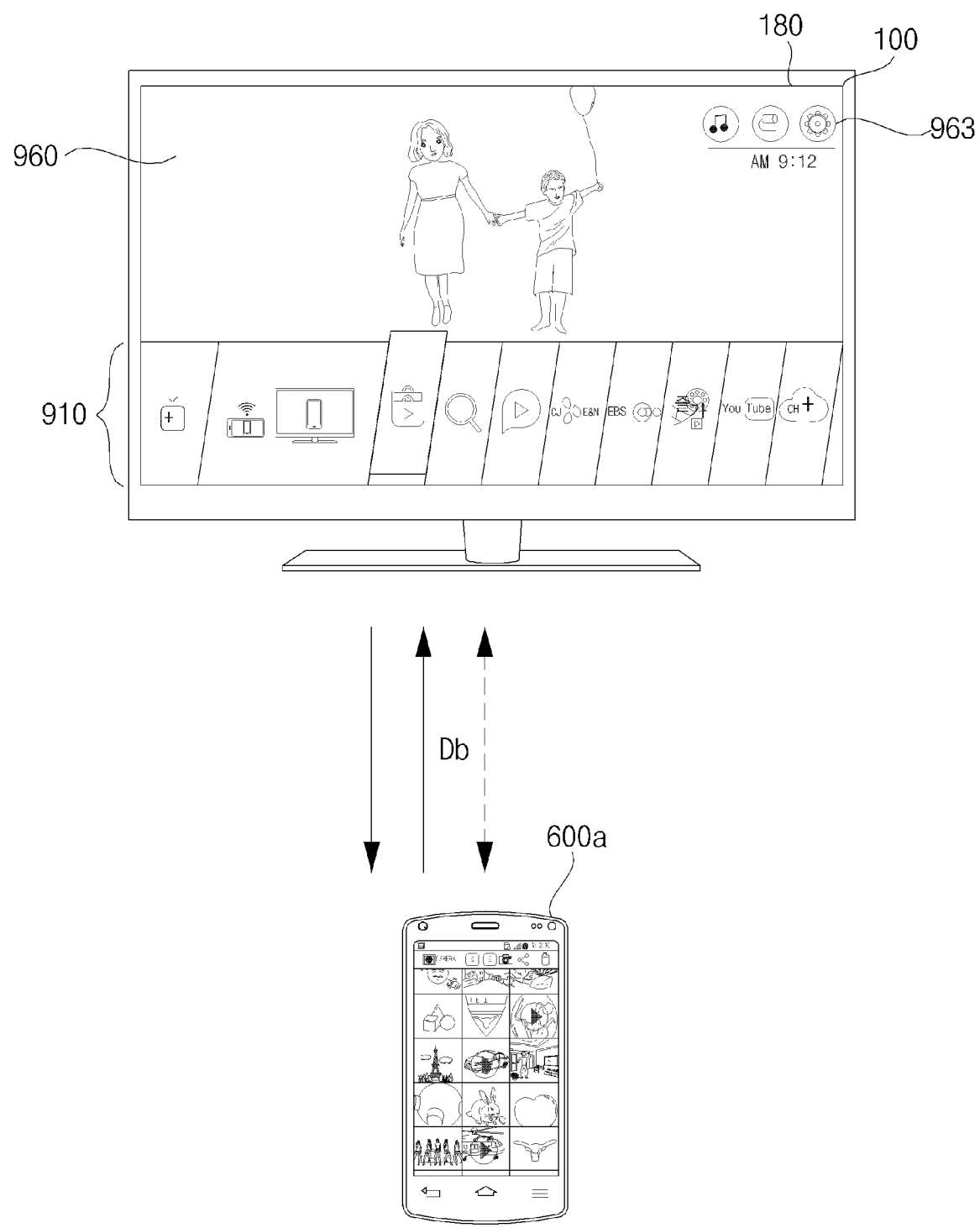
Figure 16C:
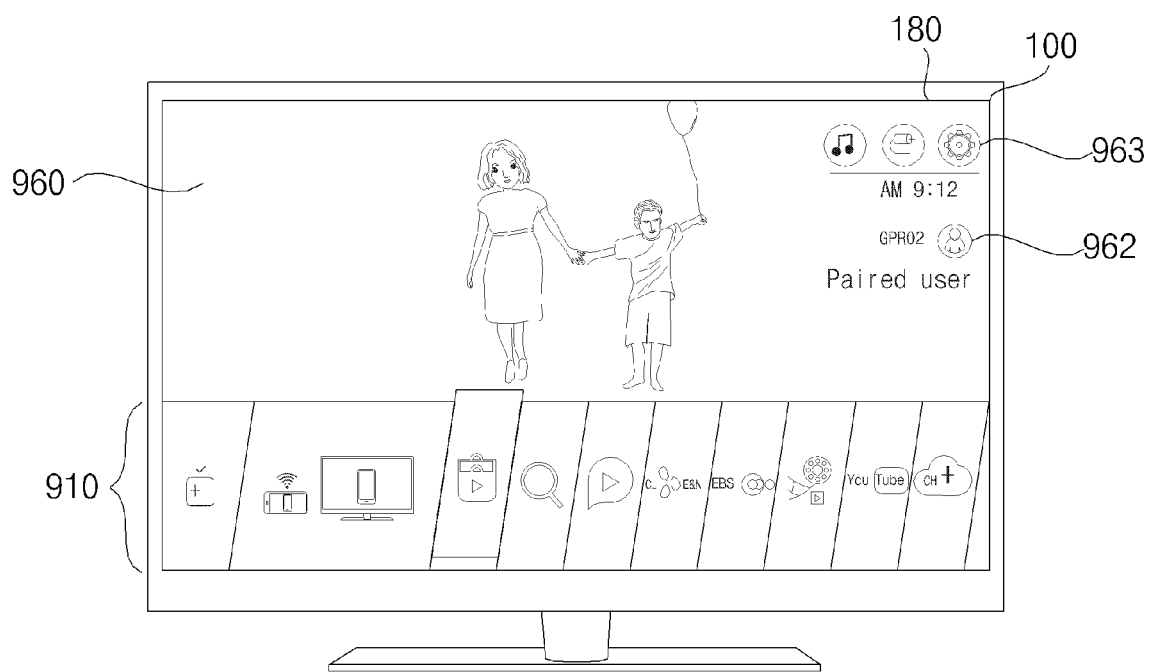

FIG. 16B illustrates a case where the distance between the image display device 100 and the mobile terminal 600 is Db at which pairing can be performed.

In this case, the controller 170 of the image display device 100 receives a pairing signal or a pairing response signal from the mobile terminal 600 as described above (S1503), and performs pairing based on the signal.

When pairing is completed, the controller 170 of the image display device 100 may perform a control operation to display an object 962 indicating the paired mobile terminal in addition to the image 960 and the application list 910, as shown in FIG. 17C. Thereby, it may be recognized that connection is being performed as pairing with the mobile terminal is completed.

Figure 16D:

When a first user item is selected in the menu (S1520), namely when the object 962 indicating the paired mobile terminal is selected, the controller 170 of the image display device 100 may perform a control operation to display an application list 970 related to the paired mobile terminal and a wish list 975 (S1525), as shown in FIG. 16D.

Next, when a first application is selected in the application list 970 related to the paired mobile terminal (S1525), the controller 170 of the image display device 100 may perform a control operation to transmit a request for transmission of a screen related to the first application to the mobile terminal 600 (S1535).

Thereby, the controller 670 of the mobile terminal 600 may receive the request for transmission of a screen window related to the first application through a communication unit (S1540), and perform a control operation to execute and display the first application on the display 680 and to transmit the screen window of the first application to the image display device 100 (S1545).

The controller 170 of the image display device 100 may receive the first application screen window via the network interface (S1550), and perform a control operation to display the moved mirroring image on the display 180 (S1560).

Figure 16E:
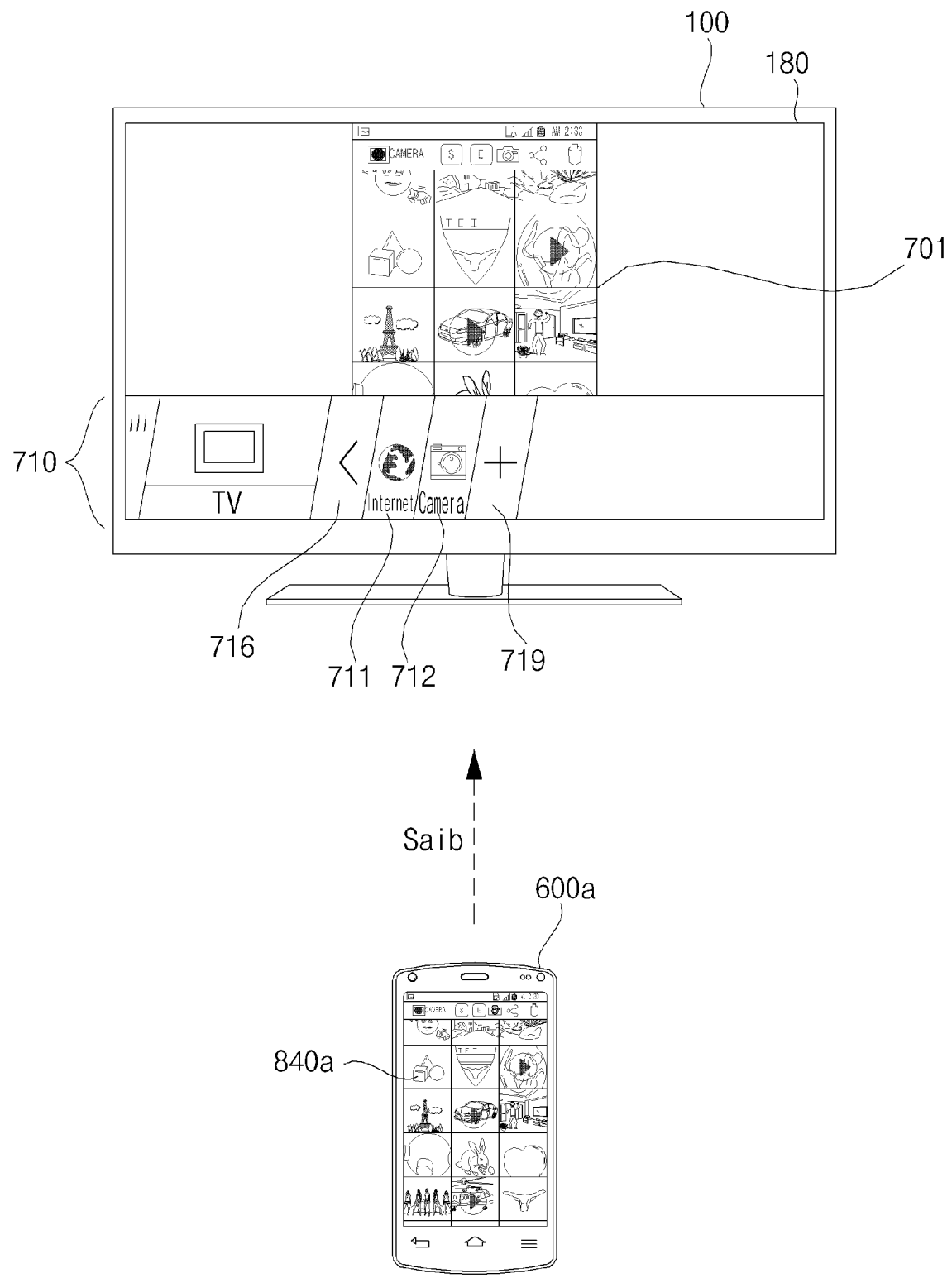

When the image viewer application is selected in the application list 970 related to the paired mobile terminal as shown in FIG. 16D, the controller 170 of the image display device 100 may perform a control operation to receive the image of the image viewer application from the paired mobile terminal 600 and to display the image 701 of the image viewer application, as shown in FIG. 16E.

While it is illustrated in the figure that the image viewer application image 701 and the application list 710 are displayed together, the image viewer application image 701 may be displayed alone.

If another mobile terminal approaches the image display device 100 within a predetermined distance with the paired mobile terminal 600 located within the predetermined distance, the controller 170 of the image display device 100 may perform a control operation to implement additional pairing.

Figure 16F:
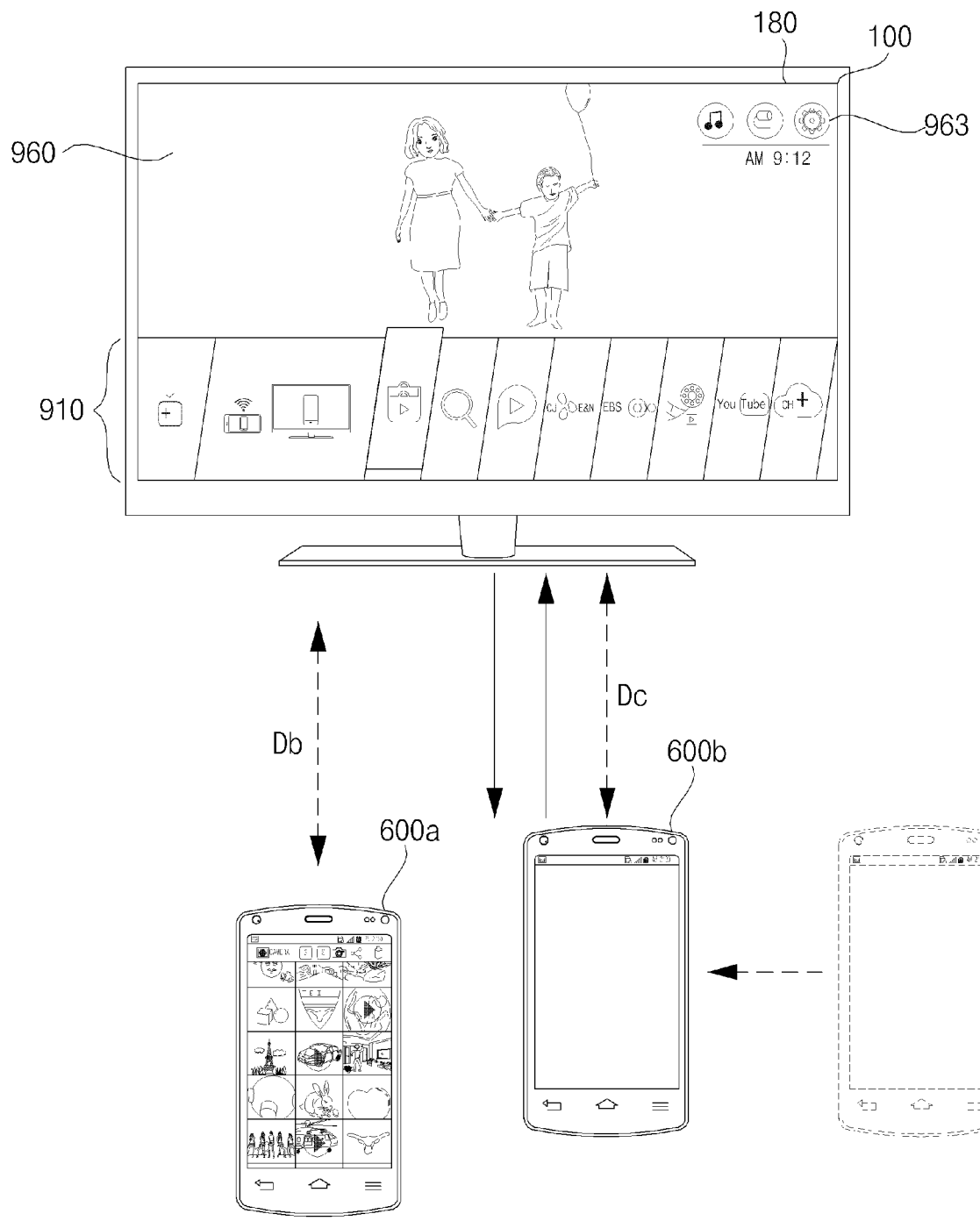

As shown in FIG. 16F, if a second mobile terminal 600b approaches the image display device 100 within the predetermined distance and is located at distance Dc from the image display device 100, the controller 170 of the image display device 100 may perform a control operation to receive a pairing response signal from the second mobile terminal 600b and implement additional pairing.

Figure 16G:
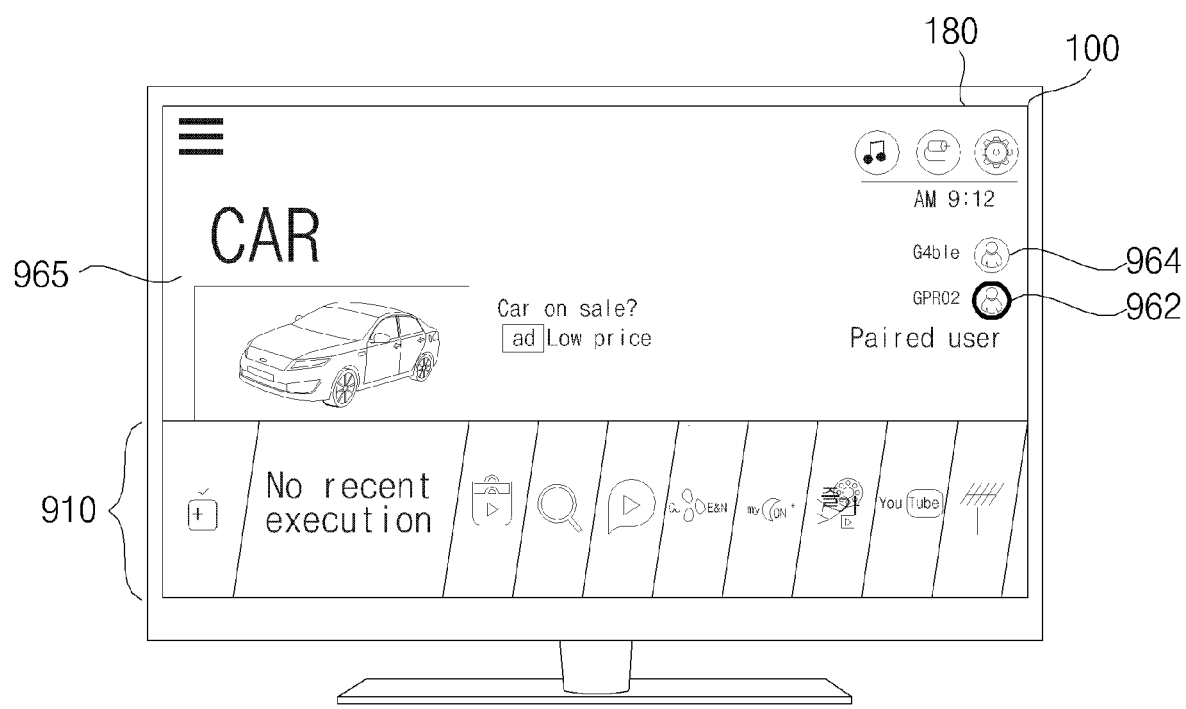

After the additional pairing is implemented, the controller 170 of the image display device 100 may perform a control operation to display objects 962 and 964 indicating the plurality of mobile terminals as shown in FIG. 16G.

FIG. 16G illustrates a case where the object 962 indicating the paired mobile terminal and a second object 964 indicating a paired second mobile terminal are displayed on an image 965.

Figure 16H:

When the second object 964 indicating the paired second mobile terminal is selected between the objects 962 and 964, the controller 170 of the image display device 100 may perform a control operation to display an application list 996 related to the paired mobile terminal and an application list 997 related to the paired second mobile terminal on the display 180 together as shown in FIG. 16H.

Alternatively, the controller 170 of the image display device 100 may perform a control operation to display only the application list related to the paired second mobile terminal.

An operation method for the image display device or mobile terminal according to the present invention is implementable by code which can be read by the processor on a recording medium which can be read by a processor provided to an autonomous driving apparatus or a vehicle. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image display device comprising:
a display;
an interface configured to exchange data with a mobile terminal; and
a controller electrically connected to the display and the interface, wherein the controller is configured to:
control the display to display a broadcast image and an application list including a device connection application item based on operation of a specific key of a remote controller;
control the display to display an image including server information based on selection of the device connection application item, wherein the image including server information is to be captured using the mobile terminal and is displayed in the displayed application list while the broadcast image is displayed; and
control the display to display an object indicating the paired mobile terminal when pairing with the mobile terminal is completed,
wherein the controller is further configured to control the display to display the application list to include the image including server information when no mirroring applications have been added to the image display device, and control the display to cease display of the image including server information based on an application to be mirrored being added to the image display device.

2. The image display device according to claim 1, wherein the controller is further configured to control the display to display the object indicating the paired mobile terminal on the image when pairing with the mobile terminal is performed while an image is being displayed on the display.

3. The image display device according to claim 1, further comprising:
a broadcast receiver configured to receive a broadcast signal,
wherein the controller is further configured to control the display to display the object indicating the paired mobile terminal on the image when the pairing with the mobile terminal is performed while the broadcast image based on the broadcast signal is being displayed on the display.

4. The image display device according to claim 1, wherein the controller is further configured to control the display to display an application list related to the paired mobile terminal when the object indicating the paired mobile terminal is selected.

5. The image display device according to claim 4, wherein the application list related to the paired mobile terminal comprises:

the application item to be mirrored between the mobile terminal and the image display device and an Add item for adding an application.

6. The image display device according to claim 4, wherein the controller is further configured to, when a first application item in the application list related to the paired mobile terminal is selected:
transmit via the interface a request for transmission of a screen related to the first application to the mobile terminal; and
control the display to display an image for execution of the first application based on information received from the mobile terminal.

7. The image display device according to claim 1, wherein the controller is further configured to control the display to display an application list related to the paired mobile terminal and a content wish list together when the object indicating the paired mobile terminal is selected.

8. The image display device according to claim 7, wherein the controller is further configured to receive, via the interface, wish list information stored in the mobile terminal and control the display to display the wish list information in the content wish list when paired with the mobile terminal.

9. The image display device according to claim 1, wherein the controller is further configured to perform pairing with the mobile terminal when the mobile terminal is positioned within a predetermined distance allowing the pairing.

10. The image display device according to claim 9, wherein the controller is further configured to:
transmit, via the interface, a pairing signal; receive, via the interface, a pairing response signal from the mobile terminal when the mobile terminal is positioned within the predetermined distance allowing the pairing; and
perform the pairing based on the pairing response signal.

11. The image display device according to claim 1, wherein the controller is further configured to control the display to display a second object indicating a paired second mobile terminal together with the first object when the image display device is additionally paired with the second mobile terminal while the object indicating the paired mobile terminal is displayed.

12. The image display device according to claim 11, wherein the controller is further configured to control the display to display a second application list related to the paired second mobile terminal when the second object indicating the paired second mobile terminal is selected.

13. The image display device according to claim 12, wherein the controller is further configured to control the display to display an application list related to the paired mobile terminal and a second application list related to the paired second mobile terminal when the second object indicating the paired second mobile terminal is selected after the object indicating the mobile terminal is selected.

14. The image display device according to claim 12, wherein the controller is further configured to control the display to display an application list related to the paired mobile terminal, and to display a user change object and a user add object when the second object indicating the paired second mobile terminal is selected after the object indicating the mobile terminal is selected,
wherein, when the user change object is selected, the second application list related to the paired second mobile terminal is displayed, and
wherein, when the user add object is selected, the application list related to the paired mobile terminal and the second application list related to the paired second mobile terminal are displayed.

15. The image display device according to claim 1, wherein the controller is further configured to control the display to display randomly generated code information after displaying the image including the server information,
wherein pairing is performed with the mobile terminal after the randomly generated code information is displayed.

16. An image display device comprising:
a display;
an interface to exchange data with a mobile terminal; and
a controller electrically connected to the display and the interface, wherein the controller is configured to:
control the display to display a broadcast image and an application list including a device connection application item based on operation of a specific key of a remote controller;
control the display to display an image including server information based on selection of the device connection application item, wherein the image including server information is to be captured using the mobile terminal and is displayed in the displayed application list while the broadcast image is displayed;
perform pairing with the mobile terminal when the mobile terminal is positioned within a predetermined distance; and
control the display to display an object indicating the paired mobile terminal when the pairing is completed,
wherein the controller is further configured to control the display to display the application list to include the image including server information when no mirroring applications have been added to the image display device, and control the display to cease display of the image including server information based on an application to be mirrored being added to the image display device.

17. The image display device according to claim 16, wherein the controller is further configured to control the display to display an application list related to the paired mobile terminal when the object indicating the paired mobile terminal is selected.

18. The image display device according to claim 17, wherein the controller is further configured to, when a first application item in the application list related to the paired mobile terminal is selected:
transmit, via the interface, a request for transmission of a screen related to the first application to the mobile terminal; and
control the display to display an image for execution of the first application on the display based on information received from the mobile terminal.

19. The image display device according to claim 17, wherein the controller is further configured to control the display to display a second object indicating a paired second mobile terminal together with the first object when the image display device is additionally paired with the second mobile terminal while the object indicating the paired mobile terminal is displayed.

20. The image display device according to claim 19, wherein, the controller is further configured to control the display to display a second application list related to the paired second mobile terminal when the second object indicating the paired second mobile terminal is selected.

* * * * *